United States Patent
Ohno et al.

(10) Patent No.: US 7,462,228 B2
(45) Date of Patent: Dec. 9, 2008

(54) WATER-BASE BLACK INK COMPOSITION AND COLORED PRODUCT

(75) Inventors: Hiroaki Ohno, Kita-ku (JP); Toru Yamaguchi, Saitama (JP); Takahiko Matsui, Kita-ku (JP); Takashi Yoneda, Kita-ku (JP); Yoshiaki Kawaida, Kita-ku (JP); Yasuo Shirasaki, Kita-ku (JP); Kazunobu Nagasaki, Adachi-ku (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 417 days.

(21) Appl. No.: 10/547,850

(22) PCT Filed: Mar. 4, 2004

(86) PCT No.: PCT/JP2004/002779

§ 371 (c)(1),
(2), (4) Date: Sep. 1, 2005

(87) PCT Pub. No.: WO2004/078860

PCT Pub. Date: Sep. 16, 2004

(65) Prior Publication Data

US 2006/0144288 A1   Jul. 6, 2006

(30) Foreign Application Priority Data

Mar. 5, 2003 (JP) .............................. 2003-058083
Jul. 2, 2003 (JP) .............................. 2003-270309
Aug. 7, 2003 (JP) .............................. 2003-289245

(51) Int. Cl.
*C09D 11/00* (2006.01)
*C09D 11/02* (2006.01)
*C09B 31/30* (2006.01)

(52) U.S. Cl. .................................. 106/31.52; 534/806

(58) Field of Classification Search .............. 106/31.27, 106/31.43, 31.52; 534/806
See application file for complete search history.

(56) References Cited

U.S. PATENT DOCUMENTS

| | | | | |
|---|---|---|---|---|
| 4,395,288 A | | 7/1983 | Eida et al. ................. 106/31.51 |
| 5,530,105 A | * | 6/1996 | Yamazaki et al. ........ 106/31.49 |
| 7,128,779 B2 | * | 10/2006 | Osumi et al. ............. 106/31.52 |
| 7,144,452 B2 | * | 12/2006 | Takayama et al. ........ 106/31.52 |
| 7,198,664 B2 | * | 4/2007 | Mafune et al. ........... 106/31.28 |
| 7,198,665 B2 | * | 4/2007 | Nakamura et al. ....... 106/31.52 |
| 7,247,196 B2 | * | 7/2007 | Sato et al. ................ 106/31.52 |
| 2006/0144288 A1 | | 7/2006 | Ohno et al. .............. 106/31.27 |
| 2007/0109376 A1 | * | 5/2007 | Tojo et al. ................... 347/100 |
| 2007/0227388 A1 | * | 10/2007 | Ohno et al. .............. 106/31.13 |

FOREIGN PATENT DOCUMENTS

| | | |
|---|---|---|
| JP | 55-007869 | 1/1980 |
| JP | 55-144069 | 11/1980 |
| JP | 61-18590 | 5/1986 |
| JP | 07-138492 | 5/1995 |
| JP | 08-302220 | 11/1996 |
| JP | 2005-036164 | 2/2005 |
| WO | 2004/078860 | 9/2004 |

OTHER PUBLICATIONS

RN 554433-03-3 Registry (on-line), Jul. 25, 2003 (retrieved on May 31, 2004 Retrieved from the file 'Registry'; (STN International).
RN 546079-42-9 Registry (on-line), Jul. 11, 2003 (retrieved on May 31, 2004 Retrieved from the file 'Registry' (STN International).
Yutaka Hosoda, "Riron Seizo Senryo Kagaku", Dai 4 Han, Kabushiki Kaisha Gihodo, Aug. 15, 1966, pp. 190 to 193.
International Search Report dated Jun. 22, 2004.
International Search Report dated Aug. 2, 2005.
Dialog Abstract of JP 2005/036164; Feb. 2005.

* cited by examiner

*Primary Examiner*—Helene Klemanski
(74) *Attorney, Agent, or Firm*—Nields & Lemack

(57) ABSTRACT

The present invention relates to a water-based black ink composition comprising a water-soluble black dye (A) exhibiting ozone fastness and a condensate compound (B) of 4,4'-dinitrostilbene-2,2'-disulfonic acid and aminobenzenes or a reduction product (C) thereof. Said ink composition is suitable for use in ink-jet recording, and realizes neutral hue and black color of high printing density. Further, a printed matter obtained is excellent in ozone gas fastness, light fastness, moisture fastness and color rendering properties. Still further, storage stability as a recording liquid is excellent.

15 Claims, No Drawings

WATER-BASE BLACK INK COMPOSITION AND COLORED PRODUCT

TECHNICAL FIELD

The present invention relates to a water-based ink composition for an inkjet printer and a colored product thereby.

BACKGROUND OF THE INVENTION

A method for recording by means of an ink-jet printer, a typical method among various color recording methods, comprises generating ink droplets and depositing them onto various recording materials (such as paper, film and cloth). This method has been rapidly prevailing lately and is expected to grow remarkably in the future because of such features as less noise generation due to no contact of a recording head with a recording material and easiness in downsizing and speedup. Conventionally, as an ink for a fountain pen or a felt pen and an ink for ink-jet recording, a water-based ink dissolving a water-soluble dye in a water-based medium has been used. Therefore, in these water-soluble inks, a water-soluble organic solvent is generally added to prevent ink from clogging at a pen tip or an ink-jet nozzle. These conventional inks are required to provide a recorded image of sufficient density, not to clog at a pen tip or an ink-jet nozzle, to dry quickly on a recording material, to bleed less, to have good storage stability and, in particular, to have high solubility in water and a water-soluble organic solvent to be added to the inks. Moreover, an image formed is required to have image fastness such as water fastness, light fastness, ozone gas fastness and moisture fastness.

Ozone gas fastness means durability against phenomenon that oxidizing ozone gas in the air reacts with a dye on a recording paper to incur discoloration or fading of a printed image. Although oxidizing gas having this kind of action includes $NO_x$ and $SO_x$ besides ozone gas, ozone gas is said to be a causative substance to promote the phenomenon of discoloration or fading of an ink-jet recorded image, further than these oxidizing gases.

Ozone gas is used for an accelerated test to measure degree of ozone gas fastness. As the phenomenon of discoloration or fading in color caused by these oxidizing gases is specific to an ink-jet image, improving ozone gas fastness has become an important subject. In particular, for an ink-receiving layer mounted at the surface of a paper for exclusive use for ink-jet photographic image, so as to dry the ink faster and decrease bleed on the paper of high image quality, porous materials of inorganic white pigments are often used. The phenomenon of discoloration or fading in color caused by ozone gas occurs noticeably on such recording papers.

Moisture fastness means resistance against phenomenon that a dye colorant on a recording material bleeds while the colored recording material is stored under high-humidity atmosphere. As bleed of a dye colorant significantly impairs the image quality particularly in an image requiring highly precise image quality like a photograph, it is important to make such bleed as little as possible. Therefore, moisture fastness as well as the above mentioned ozone gas fastness is also an important subject to be required in a colorant for ink-jet recording.

To extend application fields of a printing method using ink in the future, an ink composition to be used for ink-jet recording and a colored product thereby are strongly required to exhibit further improved water fastness, light fastness, moisture fastness and ozone gas fastness.

Among inks with various hues prepared from various dyes, a black ink is important for not only in application for printing written information, but also for a color image. However, in the development of a good black colorant having neutral hue in both deep and pale color regions, and high color density and less dependence of hue on a light source, there are technical barriers, and sufficient performance can hardly be found in spite of active research and development. By this reason, various plural colorants are generally mixed to form a black ink. An ink prepared by mixing plural colorants poses such a problem that its hue changes depending on a medium to be used and particularly much changes by decomposed colorant by light or ozone gas.

Black inks prepared by a black dye blended with a yellow to orange dye are proposed in patent literatures such as JP-B-7-122044, JP No. 3178200 and JP Laid-Open No. 255906/1997, however, a product sufficiently satisfying market needs has not yet been provided.

Non-patent literatures such as "Chemistry of Synthesized Dyes" (Kenzo Konishi and Nobuhiko Kuroki, published by Maki Shoten, Mar. 15, 1965, P. 143-145, P. 187-188) and "Theoretical Production, Dye Chemistry" (Yutaka Hosoda, published by Gihoudou Inc., Oct. 1, 1963, P. 190-193) describe a condensate compound (B) of 4,4'-dinitrostilbene-2,2'-disulfonic acid or a salt thereof and aminobenzenes, or reduction product (C) thereof used in the present invention (hereinafter, may be referred to as DNSDS-AB condensate compound for simplicity).

A conjugate azo compound has been proposed in, for example, JP Laid-Open No. 302221/1996, JP Laid-Open No. 12910/1997 and JP No. 2565531, however, a product sufficiently satisfying market needs has not yet been provided.

An object of the present invention is to provide a black ink composition that has stability even in long-term storage and that gives a black recorded image that has a toneless and neutral gray to black color, a printed image of high density and color independence on each medium and is superior in moisture fastness, light fastness and ozone gas fastness.

DISCLOSURE OF THE INVENTION

The inventors intensively studied a way to solve the above problems, and thus have completed the present invention. That is, the present invention relates to:

1. A water-based black ink composition comprising a water-soluble dye for black color (A) with ozone fastness and a condensed compound (B) of 4,4'-dinitrostilbene-2,2'-disulfonic acid or a salt thereof with aminobenzenes, or a reduced product (C) thereof.
2. The water-based black ink composition according to the above aspect 1, wherein composition ratio of a water-soluble dye for black color (A) and a condensed compound (B) of 4,4'-dinitrostilbene-2,2'-disulfonic acid or a salt thereof with aminobenzenes, or a reduced product (C) thereof, is 50 to 99.9% by weight of a water-soluble black colorant (A) and 0.1 to 50% by weight of the above-described condensed compound (B) or a reduced product (C) thereof, based on the total amount of both.
3. The water-based black ink composition according to the above aspect 1 or 2, wherein the water-soluble dye for black color (A) has the maximum absorption wavelength in the range of from 550 nm to 700 nm in water.
4. The water-based black ink composition according to any one of the above aspects 1 to 3, wherein the water-soluble dye for black color (A) is a dye for black color comprising at least one kind of a water-soluble azo compound having 5 or more sulfo groups and 4 or more azo groups in one molecule thereof.
5. The water-based black ink composition according to any one of the above aspects 1 to 4, wherein the water-soluble dye for black color (A) is a dye for black color comprising at least one selected from a group consisting of an azo compound represented by the general Formula (3) as shown below:

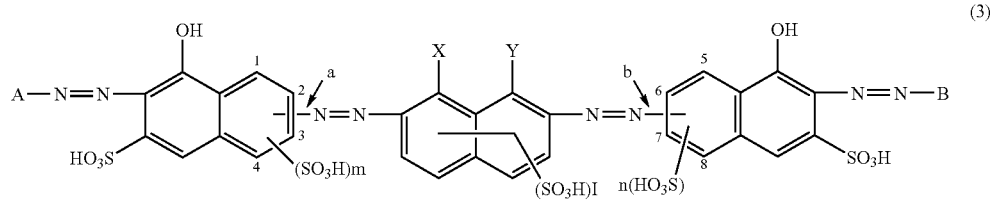

wherein, each of A and B independently represents a phenyl group or a naphthyl group which may be substituted, and each component of A and B contains at least one sulfo group; each of "a" and "b" represents a single bond, and bonded position of the "a" bond is at the 2-position or 3-position, and bonded position of the "b" bond is at the 6-position or 7-position; one of X and Y represents a hydroxyl group and the other an amino group; and "l" represents 1 or 2; each of m and n independently represents 0 or 1; and a counter ion of a sulfo group or a carboxyl group contained in a molecule is a hydrogen ion, an alkaline metal ion, a cation of an organic amine, or an ammonium ion, and an azo compound represented by the general Formula (4) as shown below:

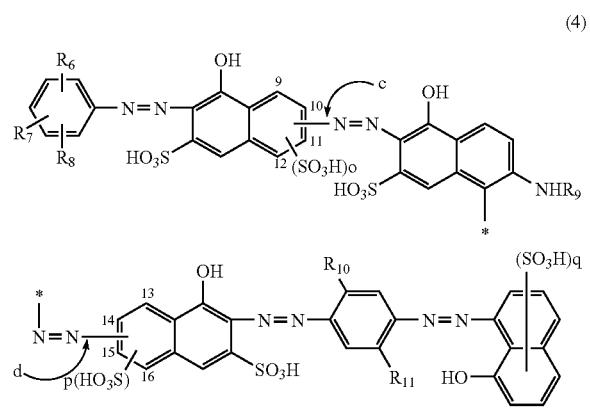

wherein, $R_6$ to $R_{11}$ represent substituents, and each of "c" and "d" represents a single bond, and a bonded position of the "c" bond is at the 10-position or 11-position, and a bonded position of the "d" bond is at the 14-position or 15-position; and "o" and "p" are 0 or 1; "q" is 1 or 2; and a counter ion of a sulfo group or a carboxyl group contained in a molecule is a hydrogen ion, an alkaline metal ion, a cation of an organic amine, or an ammonium ion.

6. The water-based black ink composition according to any one of the above aspects 1 to 5, wherein in the general Formula (3), each of substituents in A and B is a halogen atom; a hydroxyl group; an amino group; a carboxyl group; a sulfo group; a nitro group; a (C1 to C4) alkyl group; a (C1 to C4) alkoxyl group; an acyl group; a phenyl group; a ureide group; a (C1 to C4) alkyl group substituted with a hydroxyl group, a (C1 to C4) alkoxyl group, a sulfo group or a carboxyl group; a (C1 to C4) alkoxyl group substituted with a hydroxyl group, a (C1 to C4) alkoxyl group, a sulfo group or a carboxyl group; an amino group substituted with a phenyl group which may further be substituted with a carboxyl group or a sulfo group, a (C1 to C4) alkyl group or an acyl group, and in the general formula (4), $R_6$ to $R_8$ are a hydrogen atom; a halogen atom; a cyano group; a hydroxyl group; an amino group; a carboxyl group; a sulfo group; a sulfamoyl group which may be substituted with a (C1 to C4) alkyl group or a phenyl group; a phospho group; a nitro group; an acyl group; a phenyl group; a ureide group; a (C1 to C4) alkyl group which may be substituted with a hydroxyl group or a (C1 to C4) alkoxyl group; a (C1 to C4) alkoxyl group which may be substituted with a hydroxyl group, a (C1 to C4) alkoxyl group, a sulfo group or a carboxyl group; an amino group substituted with a phenyl group (the phenyl group may further be substituted with a carboxyl group or a sulfo group); and an amino group which is substituted with an alkyl group or an acyl group; $R_9$ is a hydrogen atom; a (C1 to C4) alkyl group which may be substituted with a hydroxyl group, a (C1 to C4) alkoxyl group, a sulfo group or a carboxyl group; and a phenyl group which may be substituted with an amino group, an alkyl group, an alkoxyl group, a carboxyl group, or a sulfo group; and $R_{10}$ and $R_{11}$ are a hydrogen atom; a sulfo group; an acetyl amino group; a (C1 to C4) alkyl group which may be substituted with a hydroxyl group or a (C1 to C4) alkoxyl group; and a (C1 to C4) alkoxyl group which may be substituted with a hydroxyl group, a (C1 to C4) alkoxyl group, a sulfo group or a carboxyl group.

7. The water-based black ink composition according to the above aspect 5 or 6, comprising an azo compound represented by Formula (3) and an azo compound represented by Formula (4) according to claim 5, as the water-soluble compound for black color (A).

8. The water-based black ink composition according to the above aspect 7, wherein use ratio of an azo compound represented by Formula (3) and an azo compound represented by Formula (4) according to claim 5, is 10 to 80% by weight of an azo compound represented by Formula (3) and 20 to 90% by weight of an azo compound represented by Formula (4), based on the total amount of both.

9. The water-based black ink composition according to any one of the above aspects 1 to 8, wherein aminobenzenes in a condensed compound of 4,4'-dinitrostilbene-2,2'-disulfonic acid with aminobenzenes or a salt thereof, is an azo compound represented by Formula (2) as shown below:

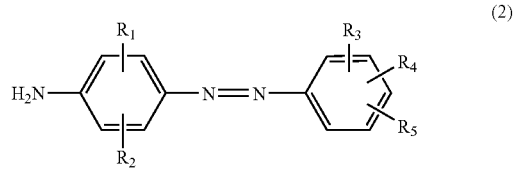

wherein, each of $R_1$ to $R_5$ independently represents a hydrogen atom, a halogen atom; a hydroxyl group; a sulfo group; a carboxyl group; a (C1 to C4) alkyl group; and a (C1 to C4) alkoxyl group.

10. An azo compound represented by Formula (3) as shown below or a salt thereof:

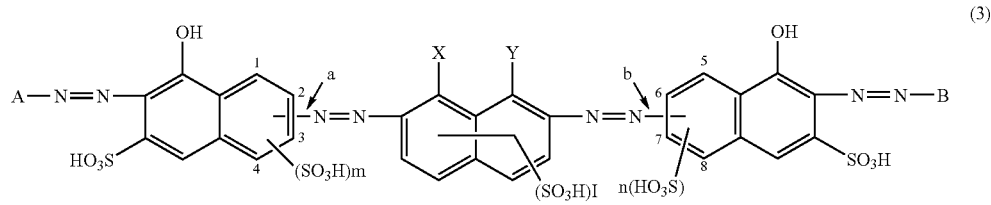

wherein, each of A and B independently represents a phenyl group or a naphthyl group which may be substituted, and each component of A or B comprises at least one sulfo group; each of "a" and "b" represents a single bond, and a bonded position of the "a" bond is at the 2-position or 3-position, and a bonded position of the "b" bond is at the 6-position or 7-position; one of X and Y represents a hydroxyl group and the other an amino group; and "l" represents 1 or 2; and each of m and n independently represents 0 or 1.

11. The azo compound or the salt thereof according to the above aspect 10, wherein in the general Formula (3), each of substituents in A and B is a halogen atom; a hydroxyl group; an amino group; a carboxyl group; a sulfo group; a nitro group; a (C1 to C4) alkyl group; a (C1 to C4) alkoxyl group; an acyl group; a phenyl group; a ureide group; a (C1 to C4) alkyl group substituted with a hydroxyl group, a (C1 to C4) alkoxyl group, a sulfo group or a carboxyl group; a (C1 to C4) alkoxyl group substituted with a hydroxyl group, a (C1 to C4) alkoxyl group, a sulfo group or a carboxyl group; or an amino group substituted with a phenyl group which may be substituted with a carboxyl group or a sulfo group, a (C1 to C4) alkyl group or an acyl group.

12. The azo compound or the salt thereof according to the above aspect 10 or 11, wherein in the general Formula (3), a bonded position of the "a" bond is at the 3-position and "m" is 0; a bonded position of the "b" bond is at the 7-position and "n" is 1; or a bonded position of the "a" bond is at the 2-position and n is 0.

13. An azo compound represented by Formula (4) as shown below or a salt thereof:

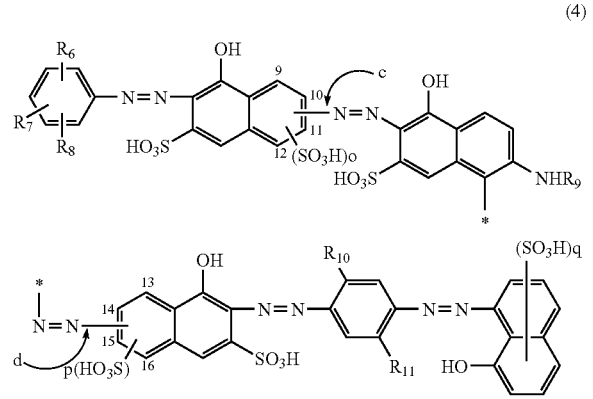

wherein, $R_6$ to $R_8$ are a hydrogen atom; a halogen atom; a cyano group; a hydroxyl group; an amino group; a carboxyl group; a sulfo group; a sulfamoyl group which may be substituted with a (C1 to C4) alkyl group or a phenyl group; a phospho group; a nitro group; an acyl group; a phenyl group; a ureide group; a (C1 to C4) alkyl group which may be substituted with a hydroxyl group, or a (C1 to C4) alkoxyl group; a (C1 to C4) alkoxyl group which may be substituted with a hydroxyl group, a (C1 to C4) alkoxyl group, a sulfo group or a carboxyl group; an amino group substituted with a phenyl group (the phenyl group may be further substituted with a carboxyl group or a sulfo group); an amino group substituted with an alkyl group or an acyl group; $R_9$ is a hydrogen atom; a (C1 to C4) alkyl group which may be substituted with a hydroxyl group, a (C1 to C4) alkoxyl group, a sulfo group or a carboxyl group; and a phenyl group which may be substituted with an amino group, an alkyl group, an alkoxyl group, a carboxyl group, or a sulfo group; $R_{10}$ and $R_{11}$ are a hydrogen atom; a sulfo group; an acetyl amino group; a (C1 to C4) alkyl group which may be substituted with a hydroxyl group or a (C1 to C4) alkoxyl group; a (C1 to C4) alkoxyl group which may be substituted with a hydroxyl group, a (C1 to C4) alkoxyl group, a sulfo group or a carboxyl group; each of "c" and "d" represents a single bond, and a bonded position of the "c" bond is at the 10-position or 11-position, and a bonded position of the "d" bond is at the 14-position or 15-position; "o" and "p" are 0 or 1; and "q" is 1 or 2.

14. The azo compound or the salt thereof according to the above aspect 13, wherein in Formula (4), a bonded position of "c" is at the 10- or 11-position; a bonded position of "d" is at the 14-position or 15-position; q is 1 or 2; each of "o" and "p" is independently 0 or 1; a substituted position of $(SO_3H)_o$ is at the 11- or 12-position; and a substituted position of $(SO_3H)_p$ is at the 15-position or 16-position.

15. An ink-jet printer loaded with the water-based black ink composition according to any one of the above aspects 1 to 9.

16. A colored product colored by an ink-jet printer according to the above aspect 15.

17. A water-based black ink composition, which comprises at least one kind of a water-soluble compound for black color (A) having the maximum absorption wavelength in the range of from 550 nm to 700 nm in water and at least one kind of a condensed compound (B) of 4,4'-dinitrostilbene-2,2'-disulfonic acid or an alkali metal salt thereof with the azo compound represented by Formula (2) as shown below:

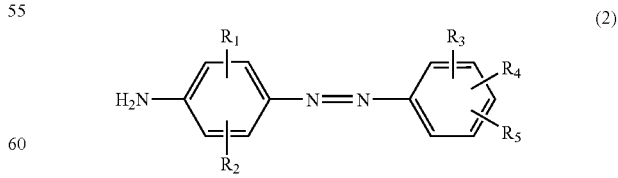

wherein, each of $R_1$ to $R_5$ independently represents a hydrogen atom; a halogen atom; a hydroxyl group; a sulfo group; a carboxyl group; a (C1 to C4) alkyl group; and a (C1 to C4) alkoxyl group, or a reduced product (C) thereof, wherein a counter ion of the compound after the condensation or the reduction is a hydrogen ion, an alkaline metal ion, a cation of an organic amine, or an ammonium ion.

BEST MODE FOR CARRYING OUT THE INVENTION

The present invention will be described in detail, hereinafter.

In the present description, the alkyl group or the alkoxyl group includes an alkyl group or alkoxyl group of usually about 1 to 20 carbon atoms, preferably about 1 to 6 carbon atoms and more preferably a (C1 to C4) alkyl group or a (C1 to C4) alkoxyl group. The (C1 to C4) alkyl group includes, for example, a methyl group, an ethyl group, a n-propyl group, an isopropyl group, a n-butyl group, an isobutyl group, a sec-butyl group and a tert-butyl group. The (C1 to C4) alkoxyl group includes, for example, a methoxy group, an ethoxy group, a n-propoxy group, an isopropoxy group, a n-butoxy group, a sec-butoxy group and a tert-butoxy group.

The acyl group may be either an aliphatic acyl group or an aromatic acyl group. The aliphatic acyl group includes a (C1 to C20) alkanoyl group, preferably a (C1 to C6) alkanoyl group, which includes usually a (C1 to C4) alkanoyl group such as an acetyl group, a propionyl group, a butylyl group and a valeryl group. Among these groups, an acetyl group is most common. The aromatic acyl group includes a benzoyl group, and the like. These acyl groups may have a substituent.

In the present description, these groups have similar meanings hereinafter unless otherwise specified.

A water-soluble black dye (A) having ozone fastness, to be used in the present invention, means such a dye that provides a recorded image with superior ozone fastness, colored by an ink containing said colorant. Usually, the dye has preferably color difference of less than 15 and residual colorant ratio of 80% or more between before and after an ozone fastness test of the recorded image using the method shown later in Examples. Further, said water-soluble black dye is preferably a water-soluble compound having the maximum absorption wavelength in the range of 550 nm to 700 nm in the visible light zone in water.

Any water-soluble black dye (A) having the maximum absorption wavelength in the range of 550 nm to 700 nm in the visible light zone in water can be used in the present invention, however, a dye containing a compound represented by the general Formula (3) and/or the general Formula (4) is preferably used.

Each of A and B in the general Formula (3) represents independently a phenyl group or a naphthyl group that may be substituted and each component contains at least one or more sulfo groups. Said sulfo group may either substitute directly on the phenyl group or the naphthyl group or be contained in a substituent of the phenyl group or the naphthyl group. Each of A and B may further be substituted. A substituent in A and B includes a halogen atom; a hydroxyl group; an unsubstituted amino group; a carboxyl group; a sulfo group; a nitro group; an unsubstituted (C1 to C4) alkyl group; an unsubstituted (C1 to C4) alkoxyl group; an acyl group; a phenyl group; a ureido group; a substituentd (C1 to C4) alkyl group such as a (C1 to C4) alkyl group substituted with a hydroxyl group, a (C1 to C4) alkoxyl group, a sulfo group or a carboxyl group; a substituentd (C1 to C4) alkoxyl group such as a (C1 to C4) alkoxyl group substituted with a hydroxyl group, a (C1 to C4) alkoxyl group, a sulfo group or a carboxyl group; a substituentd amino group such as an amino group substituted with a phenyl group, a (C1 to C4) alkyl group or an acyl group. These phenyl group, (C1 to C4) alkyl group or acyl group may further be substituted with a carboxyl group or a sulfo group. These substituents include, for example, the following groups:

The unsubstituted (C1 to C4) alkyl group includes, for example, a methyl group, an ethyl, a n-propyl group, an isopropyl group, a n-butyl group, an isobutyl group, a sec-butyl group and a tert-butyl group.

The unsubstituted (C1 to C4) alkoxyl group includes, for example, a methoxy group, an ethoxy group, a n-propoxy group, an isopropoxy group, a n-butoxy group, a sec-butoxy group and a tert-butoxy group.

The acyl group includes, for example, a (C1 to C4) alkanoyl group such as an acetyl group, a propionyl group, a butylyl group and a valeryl group and a benzoyl group that may have a substituent. Among these groups, an acetyl group is preferable.

The substituted (C1 to C4) alkyl group includes, for example, a 2-hydroxyethyl group, a 2-hydroxypropyl group, a 3-hydroxypropyl group, a methoxyethyl group, a 2-ethoxyethyl group, a n-propoxyethyl group, an isopropoxyethyl group, a n-butoxyethyl group, a methoxypropyl group, an ethoxypropyl group, a n-propoxypropyl group, an isopropoxybutyl group, a n-propoxybutyl group, a sulfomethyl group, a sulfoethyl group, a 2-sulfopropyl group, a 3-sulfopropyl group, a sulfo-n-butyl group, a carboxymethyl group, a 2-carboxyethyl group, a 3-carboxypropyl group and a 4-carboxy-n-butyl group.

The substituted (C1 to C4) alkoxyl group includes, for example, a 2-hydroxyethoxy group, a 2-hydroxypropoxy group, a 3-hydroxypropoxy group, a 2-methoxyethoxy group, a 2-ethoxyethoxy group, a 2-n-propoxyethoxy group, a 2-isopropoxyethoxy group, a 2-n-butoxyethoxy group, a 3-methoxypropoxy group, a 3-ethoxypropoxy group, a 3-n-propoxypropoxy group, a 4-isopropoxybutoxy group, a 4-n-propoxybutoxy group, a sulfomethoxy group, a 2-sulfoethoxy group, a 2-sulfopropoxy group, a 3-sulfopropoxy group, a 4-sulfo-n-butoxy group, a carboxymethoxy group, a 2-carboxyethoxy group, a 3-carboxypropoxy group and a 4-carboxy-n-butoxy group.

The substituted amino group includes, for example, a phenylamino group, a carboxyphenylamino group, a dicarboxyphenylamino group, a sulfophenylamino group, a disulfophenylamino group, a carboxyethylamino group, a carboxypropylamino group, a carboxy-n-butylamino group, a sulfoethylamino group, a 2-sulfopropylamino group, a 3-sulfopropylamino group, a sulfo n-butylamino group, an acetylamino group and a benzoylamino group.

A preferable substituent in A and B in the general Formula (3) includes a sulfo group; a carboxyl group; a (C1 to C4) acylamino group such as an acetylamino group; a hydroxyl group; a nitro group; a halogen atom such as chlorine atom; a (C1 to C4) alkyl group such as a methyl group; a (C1 to C4) alkoxy group such as a methoxy group; a (C1 to C4) sulfoalkoxy group such as a 3-sulfopropoxy group; a phenylamino group; a sulfophenylamino group; and a mono- or a dicarboxyphenylamino group. A more preferable substituent includes a sulfo group, a carboxyl group, a methyl group, a methoxy group, a 3-sulfopropoxy group, a hydroxyl group and an acetylamino group.

Preferable A in the general Formula (3) includes a phenyl group having at least one sulfo group directly or as a (C1 to C4) sulfoalkoxyl group at the ortho or para position, preferably at the ortho position to the azo group or a naphthyl group having 1 to 3 sulfo groups and the above phenyl group is preferable. Said phenyl group may further have one or two groups, preferably one group of the above-described groups, as a preferable substituent in A and B. When the above phenyl group has two substituents including a sulfo group, the preferable substitution position is at the 2-and 4-positions, 2- and 5-positions and 3- and 4-positions of the phenyl group.

Preferable B in the general Formula (3) includes, independently from A, the same group as the above preferable A.

The preferable compound represented by the general Formula (3) is a compound having the above preferable A and B, wherein m and n are each independently 0 or 1; I is 1 or 2, preferably 2; bond a is at the 2- or 3-position; bond b is at the 6- or 7-position; and one of X and Y is a hydroxyl group and the other is an amino group.

Substituents represented by $R_6$ to $R_{11}$ in the general Formula (4) include the following groups:

$R_6$ to $R_8$ include each independently a hydrogen atom; a halogen atom; a cyano group; a hydroxyl group; an amino group; a carboxyl group; a sulfo group; a sulfamoyl group that may be substituted with a (C1 to C4) alkyl group or a phenyl group; a phospho group; a nitro group; an acyl group; a phenyl group; a ureido group; a (C1 to C4) alkyl group that may be substituted with a hydroxyl group or a (C1 to C4) alkoxyl group; a (C1 to C4) alkoxyl group that may be substituted with a hydroxyl group, a (C1 to C4) alkoxyl group, a sulfo group or a carboxyl group; a phenyl-substituted amino group (the phenyl group may be substituted with a carboxyl group or a sulfo group); and an amino group substituted with an alkyl group or an acyl group.

$R_9$ includes a hydrogen atom; a (C1 to C4) alkyl group that may be substituted with a hydroxyl group, a (C1 to C4) alkoxyl group, a sulfo group or a carboxyl group; a phenyl group that may be substituted with an amino group, an alkyl group, an alkoxyl group, a carboxyl group or a sulfo group; and the like.

$R_{10}$ and $R_{11}$ include a hydrogen atom; a sulfo group; an acetylamino group; a (C1 to C4) alkyl group that may be substituted with a hydroxyl group or a (C1 to C4) alkoxyl group; a (C1 to C4) alkoxyl group that may be substituted with a hydroxyl group, a (C1 to C4) alkoxyl group, a sulfo group or a carboxyl group; and the like.

In $R_6$ to $R_8$, the sulfamoyl group that may be substituted with an alkyl group or a phenyl group includes, for example, a sulfamoyl group, an N-methylsulfamoyl group, an N-ethylsulfamoyl group, an N-(n-butyl)sulfamoyl group, an N,N-dimethylsulfamoyl group, an N,N-di(n-propyl)sulfamoyl group and an N-phenylsulfamoyl group and preferably a sulfamoyl group.

In $R_6$ to $R_8$, $R_{10}$ and $R_{11}$ in the general Formula (4), the (C1 to C4) alkyl group that may be substituted with a hydroxyl group or a (C1 to C4) alkoxyl group includes, for example, a methyl group, an ethyl group, a n-propyl group, an isopropyl group, a n-butyl group, an isobutyl group, a sec-butyl group, a tert-butyl group, a 2-hydroxyethyl group, a 2-hydroxypropyl group, a 3-hydroxypropyl group, a 2-methoxyethyl group, a 2-ethoxyethyl group, a 2-n-propoxyethyl group, a 2-isopropoxyethyl group, a 2-n-butoxyethyl group, a 3-methoxypropyl group, a 3-ethoxypropyl group, a 3-n-propoxypropyl group, a 4-isopropoxybutyl group and a 4-n-propoxybutyl group.

In $R_6$ to $R_8$, and $R_{10}$ and $R_{11}$ in the general Formula (4), the (C1 to C4) alkoxyl group that may be substituted with a hydroxyl group, a (C1 to C4) alkoxyl group, a sulfo group or a carboxyl group includes, for example, a methoxy group, an ethoxy group, a n-propoxy group, an isopropoxy group, a n-butoxy group, a sec-butoxy group, a tert-butoxy group, a 2-hydroxyethoxy group, a 2-hydroxypropoxy group, a 3-hydroxypropoxy group, a 2-methoxyethoxy group, a 2-ethoxyethoxy group, a 2-n-propoxyethoxy group, a 2-isopropoxyethoxy group, a 2-n-butoxyethoxy group, a 3-methoxypropoxy group, a 3-ethoxypropoxy group, a 3-n-propoxypropoxy group, a 4-isopropoxybutoxy group, a 4-n-propoxybutoxy group, a 2-(2-hydroxyethoxy)ethoxy group, a carboxymethoxy group, a 2-carboxyethoxy group, a 3-carboxypropoxy group, a 2-sulfopropoxy group and a 4-sulfobutoxy group.

In $R_9$ in the general Formula (4), the (C1 to C4) alkyl group that may be substituted with a hydroxyl group, a (C1 to C4) alkoxyl group, a sulfo group or a carboxyl group includes, for example, a methyl group, an ethyl group, a n-propyl group, an isopropyl group, a n-butyl group, an isobutyl group, a sec-butyl group, a tert-butyl group, a 2-hydroxyethyl group, a 2-hydroxypropyl group, a 3-hydroxypropyl group, a 2-methoxyethyl group, a 2-ethoxyethyl group, a 2-n-propoxyethyl group, a 2-isopropoxyethyl group, a 2-n-butoxyethyl group, a 3-methoxypropyl group, a 3-ethoxypropyl group, a 3-n-propoxypropyl group, a 4-isopropoxybutyl group, a 4-n-propoxybutyl group, a 2-(2-hydroxyethoxy)ethyl group, a carboxymethyl group, a 2-carboxyethyl group, a 3-carboxypropyl group, a 2-sulfoethyl group, a 3-sulfopropyl group and a 4-sulfobutyl group.

In $R_9$, the phenyl group that may be substituted with an amino group, an alkyl group, an alkoxyl group, a carboxyl group or a sulfo group includes, for example, a phenyl group, a methylphenyl group, a methoxyphenyl group, an aminophenyl group, a sulfophenyl group, a sulfamoyl group, a methlsulfonylphenyl group, a methoxysulfonylphenyl group, a bissulfophenyl group, a carboxyphenyl group and a biscarboxyphenyl group.

In $R_6$ to $R_8$ in the general Formula (4), the amino group substituted with a phenyl group (the phenyl group may be substituted further by a carboxyl group or a sulfo group) includes, for example, a phenylamino group, a sulfophenylamino group, a bissulfophenylamino group, a carboxyphenylamino group and a biscarboxyphenylamino group. The amino group substituted with an alkyl group or an acyl group includes, for example, a methylamino group, an ethylamino group, a n-propylamino group, an isopropylamino group, a n-butylamino group, an isobutylamino group, an N,N-dimethylamino group, an N,N-diethylamino group, an N-ethyl-N-methylamino group, an acetylamino group, a propionylamino group, a butylylamino group and a benzoylamino group.

Preferable $R_6$ to $R_8$ in Formula (4) are a hydrogen atom, a methyl group, a methoxy group, an ethyl group, an ethoxy group, a propyl group, a propoxy group, a 2-hydroxyethoxy group, a 2-methoxyethoxy group, a 2-ethoxyethoxy group, a 3-sulfopropoxy group, a 4-sulfobutoxy group, a carboxymethoxy group, a 2-carboxyethoxy group, a chlorine atom, a bromine atom, a cyano group, a nitro group, an acetyl group, a benzoyl group, a carboxyl group, a sulfo group, a sulfamoyl group, an N-ethylsulfamoyl group, a phospho group, a hydroxy group, an amino group, a carboxymethylamino group, a carboxypropylamino group, a biscarboxymethylamino group, an acetylamino group, a benzoylamino group, a ureido group, a phenylamino group, a sulfophenylamino group, a carboxyphenylamino group, a dicarboxyphenylamino group and the like, and more preferably includes a hydrogen atom, a methyl group, a methoxy group, an ethoxy group, a 2-hydroxyethoxy group, a 3-sulfopropoxy group, a nitro group, a carboxyl group, a sulfo group, a phospho group and an acetylamino group. A more preferable combination of $R_6$ to $R_8$ is a case where at least one of these is a group selected from a group consisting of a sulfo group, a carboxyl group and a phenyl-substituted amino group having a carboxyl group or a sulfo group as a substituent, and the other groups may be any group, however, preferably the other two groups are each independently a group selected from a group consisting of a hydrogen atom, a (C1 to C4) alkylamino group, a (C1 to C4) alkyl group, a halogen atom, preferably a chlorine atom, a hydroxyl group and a sulfamoyl group. A more preferable combination of $R_6$ to $R_8$ is a case where one of these is a sulfo group and the other two are hydrogen atoms.

Preferably, $R_9$ in the general Formula (4) is a hydrogen atom; an unsubstituted (C1 to C4) alkyl group such as a methyl group, an ethyl group and a propyl group; a (C1 to C4) alkyl group having any one of a hydroxyl group, a methoxy group and a sulfo group as a substituent such as a 2-hydroxyethyl group, a 2-methoxyethyl group, a 2-sulfoethyl group, a 3-sulfopropyl group, a 4-sulfobutyl group or a carboxymethyl group; and a phenyl group that may have one or two groups selected from a group consisting of an amino group, a sulfo group, a (C1 to C4) alkoxyl group and a carboxyl group, such as a phenyl group, an aminosulfophenyl group, a methoxysulfophenyl group and a carboxyphenyl group, and more preferably a hydrogen atom, a methyl group, a 2-hydroxyethyl group, a 3-sulfopropyl group and a phenyl group, and a phenyl group is most preferable among these groups.

Preferable $R_{10}$ and $R_{11}$ in the general Formula (4) are a hydrogen atom; an unsubstituted (C1 to C4) alkyl group, an unsubstituted or substituted (C1 to C4) alkoxyl group having any one of a hydroxyl group, a methoxy group, a sulfo group and a carboxyl group as a substituent, such as a methyl group, a methoxy group, an ethyl group, an ethoxy group, a propyl group, a propoxy group, a 2-hydroxyethoxy group, a 2-methoxyethoxy group, a 3-sulfopropoxy group, a 4-sulfobutoxy group, a carboxymethoxy group and a 2-carboxyethoxy group; a sulfo group; an acetyl amino group, and the like and more preferably a methyl group, a methoxy group, an ethoxy group, a 2-hydroxyethoxy group and a 3-sulfopropoxy group. At least any one of $R_{10}$ and $R_{11}$ is preferably an unsubstituted or substituted (C1 to C4) alkoxyl group having any one of a hydroxyl group, a methoxy group, a sulfo group and a carboxyl group as a substituent, and in this case, the other is independently a (C1 to C4) alkoxyl group having any one of a hydroxy group, a methoxy group, a sulfo group and a carboxyl group as a substituent, for example, a 3-sulfopropoxy group or a 2-hydroxyethoxy group, or an unsubstituted alkyl group (C1 to C4) such as a methyl group.

A preferable combination of substituents represented by $R_6$ to $R_{11}$ is a combination of the above preferable groups included in each item of $R_6$ to $R_{11}$, and more preferable combination of substituents represented by $R_6$ to $R_{11}$ is obtained by combination of the above more preferable groups in each item. In this case, the bond c may be either at the 10-position or 11-position, but is preferably at the 10-position. The bond d is preferably at the 15-position. The o, p and q may be either 0 or 1, but are preferably 0, 1 and 1, respectively.

Counter ions to the compounds represented by the general Formulae (3) and (4) are each independently a hydrogen ion, an alkali metal ion, a cation of an organic amine or an ammonium ion. The alkali metal ion includes, for example, sodium, potassium and lithium. The organic amine includes methylamine, ethylamine, monoethanolamine, diethanolamine, triethanolamine, monoisopropanolamine, diisopropanolamine, triisopropanolamine, and the like.

Preferable counter ions to the compounds represented by the general Formulae (3) and (4) include a hydrogen ion, an alkali metal ion such as a sodium ion, a potassium ion and a lithium ion, an ammonium ion; an alkanolamine ion such as a monoethanolamine ion, a diethanolamine ion, a triethanolamine ion, a monoisopropanolamine ion, a diisopropanolamine ion, a triisopropanolamine ion; and the like.

Compounds (azo compounds) represented by the general Formula (3) and general formula (4) that have the maximum absorption wavelength in the range of 550 nm to 700 nm in water are both suitable compounds for a black dye and give a good black color at high printing density. However, at low printing density, the compounds represented by the general Formula (3) give a little bluish tone, while the compounds represented by the general Formula (4) give a little purplish tone. These azo compounds are new compounds, and by using at least one compound selected from a group consisting of the azo compounds represented by the general Formulae (3) and (4), to prepare a water-based ink by an ordinary method, a water-based black ink composition suitable for ink-jet printing can be obtained. An image printed by said ink composition is excellent in image fastness such as water fastness, light fastness, ozone gas fastness and moisture fastness.

Moreover, these azo compounds are suitable as a water-soluble black dye to be used for a water-based black ink composition of the present invention. In other words, by formulation of an azo compound of the general Formula (3) and/or an azo compound of the general Formula (4) with a condensate compound (B) of 4,4'-dinitrostilbene-2,2'-disulfonic acid and aminobenzenes or a reduction product (C) thereof, a water-based black ink composition of the present invention can be obtained, where hue can be adjusted to a neutral gray to black color, and the image fastness such as water fastness, light fastness, ozone gas fastness and moisture fastness of the azo compounds of the general Formula (3) and/or general formula (4) is not impaired, and also the printing density is not lowered.

A water-soluble black dye (A) to be used in the present invention such as an azo compound of the above general Formula (3) or the general Formula (4) can be used in free acid form or a salt form thereof. The salt including an alkali metal salt, an alkylamine salt, an alkanolamine salt and an ammonium salt thereof can be used. The preferable salt includes an alkali metal salt such as a sodium salt, a potassium salt and a lithium salt; an ammonium salt; and an alkanolamine salt such as monoethanolamine salt, a diethanolamine salt, a triethanolamine salt, a monoisopropanolamine salt, a diisopropanolamine salt and a triisopropanolamine salt.

Even such an 2 component ink can give a good black color as consisting of, as a water-soluble black dye (A), one kind of an azo compound of the above general Formula (3) or the general Formula (4), and one kind of a condensate compound (B) of 4,4'-dinitrostilbene-2,2'-disulfonic acid and aminobenzenes or a reduction product (C) thereof. However, to obtain a black color with less tone, a neutral gray to black color even in low printing density and with better color rendering properties, it is preferable to use an azo compound of the general Formula (3) and an azo compound of the general Formula (4) together, as a water-soluble black dye (A). When these azo compounds are used together, it is preferable to formulate in such ratio as 0.2 to 5 parts (by mass, the same hereinafter), preferably 0.5 to 4 parts of an azo compound of the general Formula (4) based on 1 parts of an azo compound of the general Formula (3).

A condensate compound (B) of 4,4'-dinitrostilbene-2,2'-disulfonic acid or a salt thereof and aminobenzenes, or a reduction product (C) thereof will be described hereinafter.

4,4'-Dinitrostilbene-2,2'-disulfonic acid to be used for the condensation may be used in either a free acid form as it is or a salt form thereof. Any salt can be used unless it interferes the condensation and includes an alkali metal salt of 4,4'-dinitrostilbene-2,2'-disulfonic acid, and salts such as a sodium salt and a potassium salt are preferable.

The aminobenzenes to be used for the condensation include, for example, an azo compound represented by the following Formula (2):

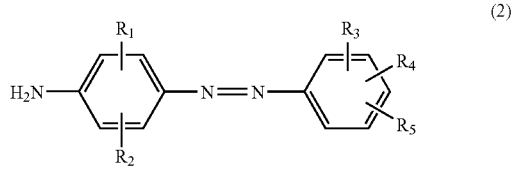
(2)

(wherein, $R_1$ to $R_5$ are each independently a hydrogen atom; a halogen atom; a hydroxyl group; a sulfo group; a carboxyl group; a (C1 to C4) alkyl group and a (C1 to C4) alkoxyl group).

In $R_1$ to $R_5$ in the general Formula (2), an example of a (C1 to C4) alkyl group includes such as a methyl group, an ethyl group, a n-propyl group, an isopropyl group, a n-butyl group, an isobutyl group, a sec-butyl group and a tert-butyl group. A (C1 to C4) alkoxyl group includes, for example, a methoxy group, an ethoxy group, a n-propoxy group, an isopropoxy group, a n-butoxy group, a sec-butoxy group and a tert-butoxy group.

Preferable examples of $R_1$ to $R_5$ in the general Formula (2) include such as a hydrogen atom, a hydroxyl group, a sulfo group, a carboxyl group, a methyl group, an ethyl group, a methoxy group and an ethoxy group, and more preferably a hydrogen atom, a hydroxyl group, a sulfo group, a carboxyl group, a methyl group and a methoxy group. Usually a compound having such a combination is used as $R_1$ and $R_2$ are hydrogen atoms, any one of $R_3$ to $R_5$ is a carboxyl group or a sulfo group and others are hydrogen atoms, or a compound having such a combination as either one or both of $R_1$ and $R_2$ are methyl groups, any one of $R_3$ to $R_5$ is a carboxyl group or a sulfo group and others are hydrogen atoms.

A counter ion of a DNSDS-AB condensate compound (B) and a reduction product thereof can be replaced with not only a hydrogen ion and an alkali metal ion, but also a cation of an organic amine or an ammonium ion after condensation or after subsequent reduction. The alkali metal includes, for example, sodium, potassium and lithium. The organic amine includes methylamine, ethylamine, monoethanolamine, diethanolamine, triethanolamine, monoisopropanolamine, diisopropanolamine, triisopropanolamine, and the like.

Suitable examples of compounds of the present invention represented by the general Formula (2) are not especially limited, however, typical compounds having the following structures are included:

TABLE 1

| Compound No. | Structural Formula |
|---|---|
| No. 1-1 | H$_2$N—⌬—N=N—⌬—COOH |

TABLE 1-continued

| Compound No. | Structural Formula |
|---|---|
| No. 1-2 | H$_2$N—⌬—N=N—⌬—SO$_3$H |
| No. 1-3 | H$_2$N—⌬—N=N—⌬—SO$_3$H |
| No. 1-4 | (CH$_3$) H$_2$N—⌬—N=N—⌬—SO$_3$H |
| No. 1-5 | (CH$_3$) H$_2$N—⌬—N=N—⌬—SO$_3$H; H$_3$C |
| No. 1-6 | (CH$_3$) H$_2$N—⌬—N=N—⌬—SO$_3$H; H$_3$C |
| No. 1-7 | (CH$_3$, SO$_3$H) H$_2$N—⌬—N=N—⌬—OCH$_3$; H$_3$C |

TABLE 2

| Compound No. | Structural Formula |
|---|---|
| No. 1-8 | (CH$_3$, COOH) H$_2$N—⌬—N=N—⌬—OCH$_3$; H$_3$C, SO$_3$H |
| No. 1-9 | (H$_3$CO, SO$_3$H) H$_2$N—⌬—N=N—⌬ |

TABLE 2-continued

| Compound No. | Structural Formula |
|---|---|
| No. 1-10 | ![structure] H$_3$CO, H$_2$N, CH$_3$, N=N, SO$_3$H |
| No. 1-11 | H$_3$CO, H$_2$N, CH$_3$, N=N, SO$_3$H |
| No. 1-12 | H$_3$CO, H$_2$N, CH$_3$, N=N, SO$_3$H, OCH$_3$ |
| No. 1-13 | H$_3$CO, H$_2$N, CH$_3$, N=N, COOH, OH, SO$_3$H |

A condensate compound (B) of 4,4'-dinitrostilbene-2,2'-disulfonic acid and aminobenzenes or a reduction product (C) thereof can be synthesized by the methods described in "Chemistry of Synthesized Dyes" (Kenzo Konishi and Nobuhiko Kuroki, published by Maki Shoten, Mar. 15, 1965, P. 143-145, P. 187-188) and "Theoretical Production, Dye Chemistry" (Yutaka Hosoda, published by Gihoudou Inc., Oct. 1, 1963, P. 190-193).

For example, a condensate compound (B) of 4,4'-dinitrostilbene-2,2'-disulfonic acid and aminobenzenes is obtained by reaction of usually 1 to 2.5 mol, preferably 1.3 to 1.8 mol of a compound represented by the general Formula (2), based on 1 mol of the 4,4'-dinitrostilbene-2,2'-disulfonic acid, using usually a caustic alkali, preferably sodium hydroxide, usually at 85 to 100° C., usually for 3 to 15 hours. Thus obtained condensate compound is known not to be a single substance, and is considered that a compound having the following structure is the main component (See the above literature).

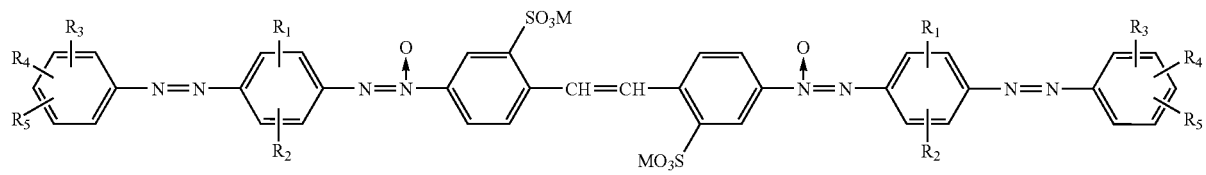

(B-1)

As a reducing agent used for reduction of the condensate compound (B), sodium sulfide or glucose is preferably used in the amount of usually 0.1 to 0.4 mol, based on 1 mol of the 4,4'-dinitrostilbene-2,2'-disulfonic acid, usually at 80 to 95° C., usually for 0.5 to 2 hours. The product (C) obtained by reducing (B) is known not to be a single substance, and is considered that a compound having the following structure is the main component (See the above literature).

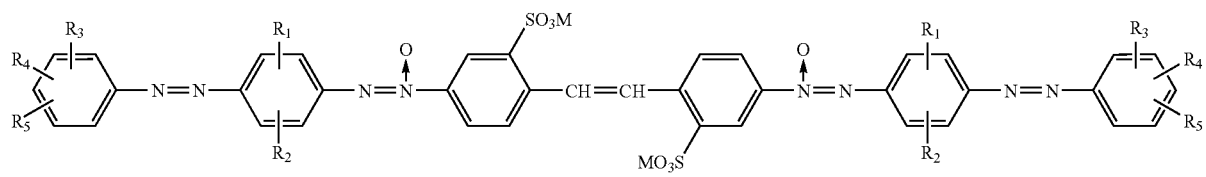

(B-1)

A reduction product (C) of a condensate compound (B) is used as a mixture of reaction products obtained in the above reaction as it is in the present invention, however, it may be used after purification of the main component. In an ink composition of the present invention, the condensate compound (B) may be used, however, it is more preferable to use a reduction product (C) of the above condensate compound (B).

An azo compound represented by the general Formula (3) and general formula (4) that is preferable as a water-soluble black dye (A) will be described more specifically.

Suitable examples of a compound of the present invention represented by the general Formula (3) are not especially limited, however, include compounds specifically shown by following Tables (3) to (6).

TABLE 3

| Comp. No. | Structural Formula |
|---|---|
| No. 2-1 | |
| No. 2-2 | |
| No. 2-3 | |
| No. 2-4 | |
| No. 2-5 | |
| No. 2-6 | |
| No. 2-7 | |

TABLE 4

| Comp. No | Structural Formula |
| --- | --- |
| No. 2-8 | |
| No. 2-9 | |
| No. 2-10 | |
| No. 2-11 | |
| No. 2-12 | |
| No. 2-13 | |
| No. 2-14 | |
| No. 2-15 | |

TABLE 4-continued
| Comp. No | Structural Formula |
|---|---|
| No. 2-16 | 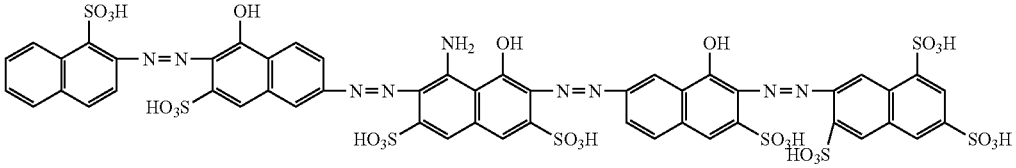 |
TABLE 5
| Comp. No | Structural Formula |
|---|---|
| No. 2-17 | 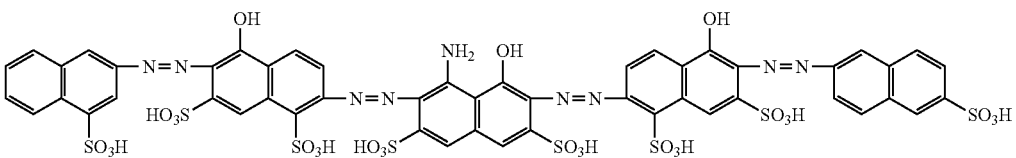 |
| No. 2-18 | 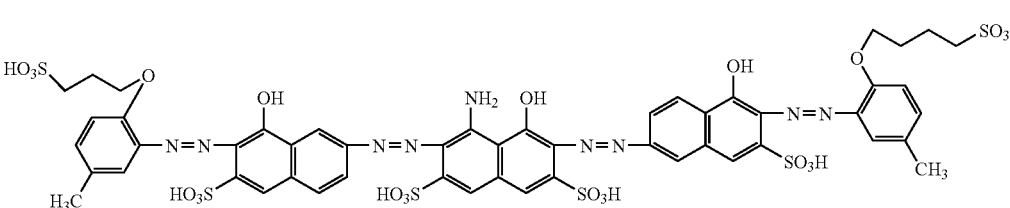 |
| No. 2-19 | 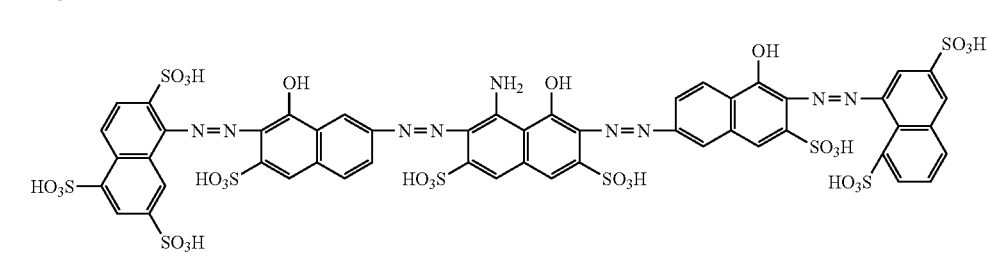 |
| No. 2-20 | 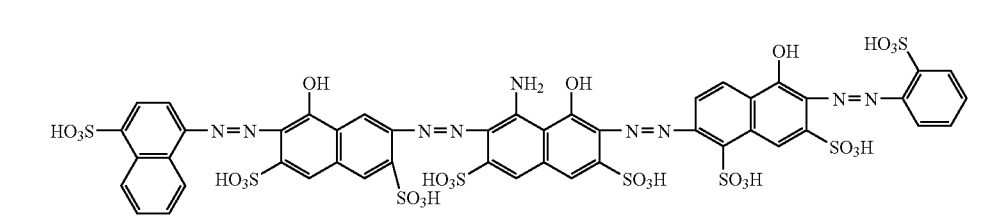 |
| No. 2-21 | 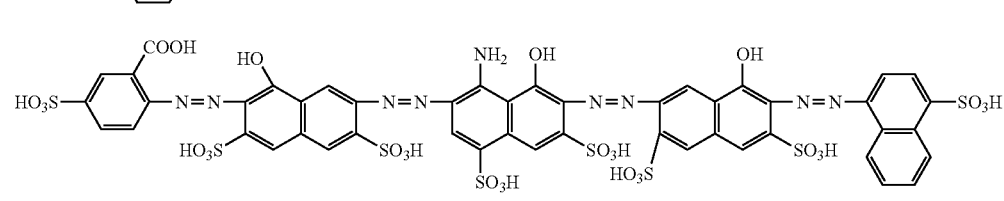 |
| No. 2-22 | 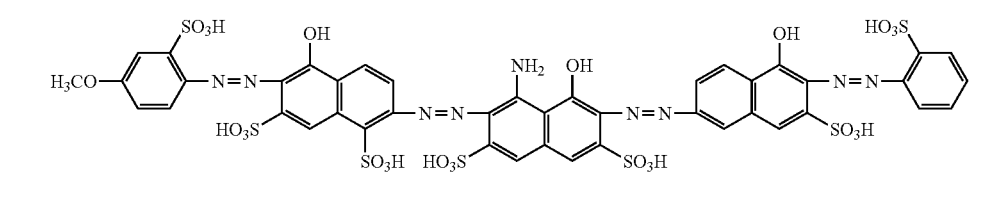 |

TABLE 5-continued

| Comp. No | Structural Formula |
|---|---|
| No. 2-23 | |
| No. 2-24 | |

TABLE 6

| Comp. No. | Structural Formula |
|---|---|
| No. 2-25 | |
| No. 2-26 | |
| No. 2-27 | |
| No. 2-28 | |
| No. 2-29 | |

TABLE 6-continued
| Comp. No. | Structural Formula |
|---|---|
| No. 2-30 | 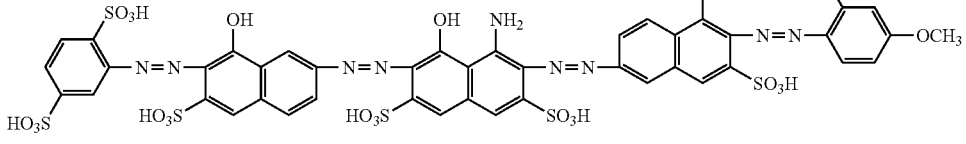 |
Suitable examples of a compound of the present invention represented by the general Formula (3) are not especially limited, however, include compounds specifically shown by following Tables (7) to (9).
TABLE 7
| Compound No. | Structural Formula |
|---|---|
| No. 3-1 | 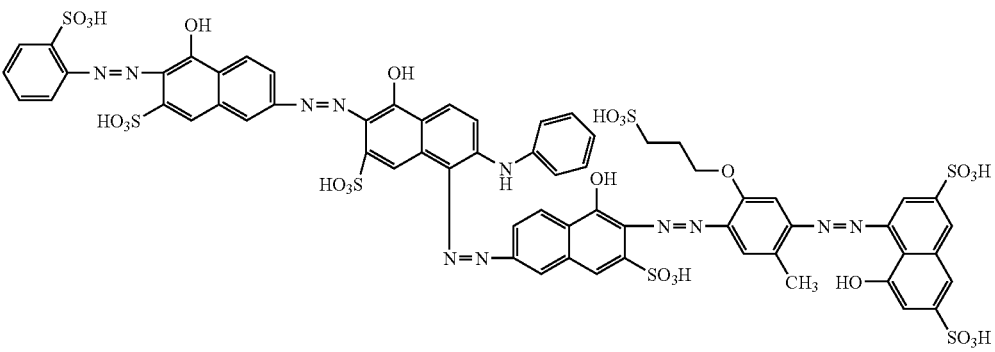 |
| No. 3-2 | 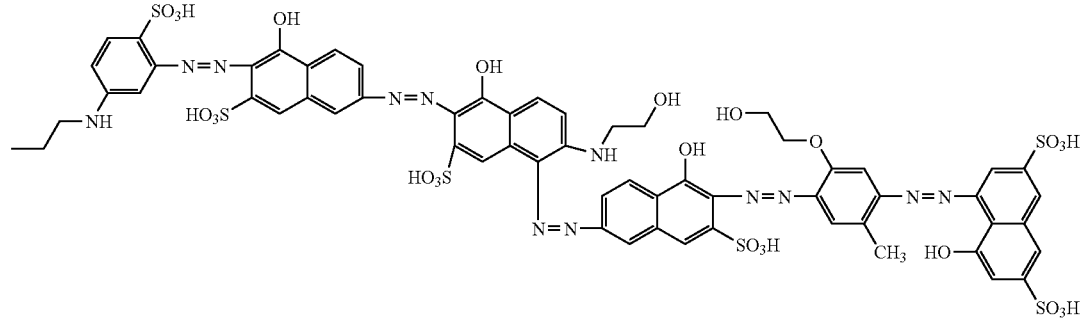 |
| No. 3-3 | 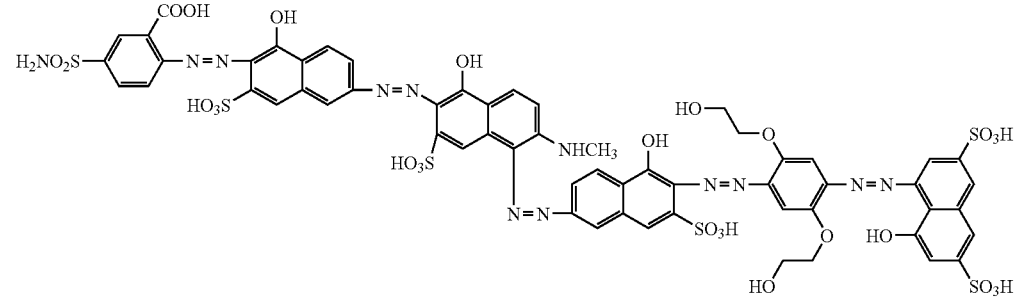 |

TABLE 7-continued
| Compound No. | Structural Formula |
|---|---|
| No. 3-4 | 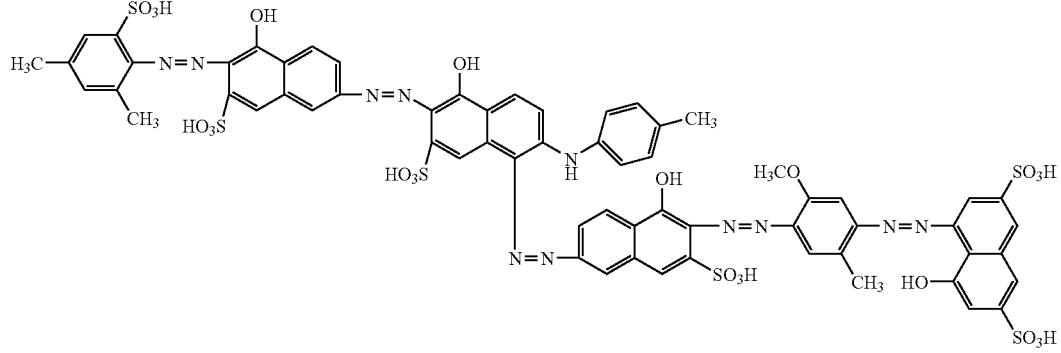 |
| No. 3-5 | 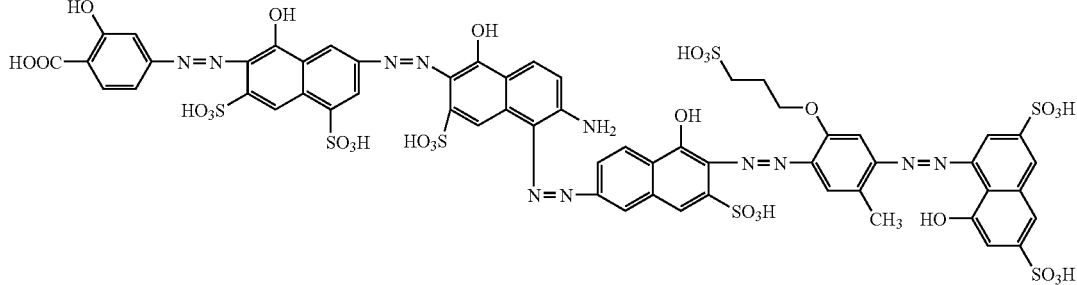 |
| No. 3-6 | 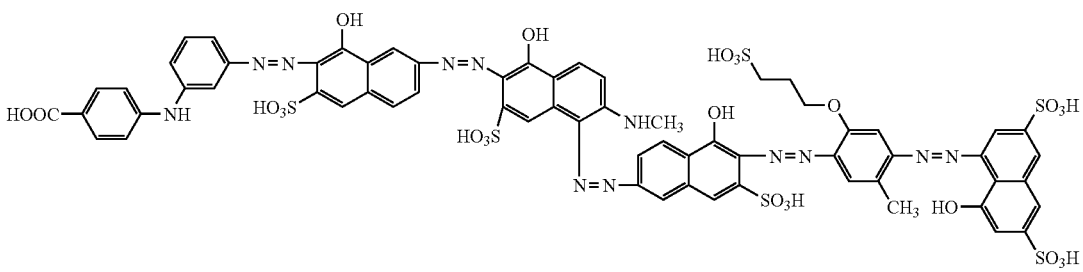 |
| No. 3-7 | 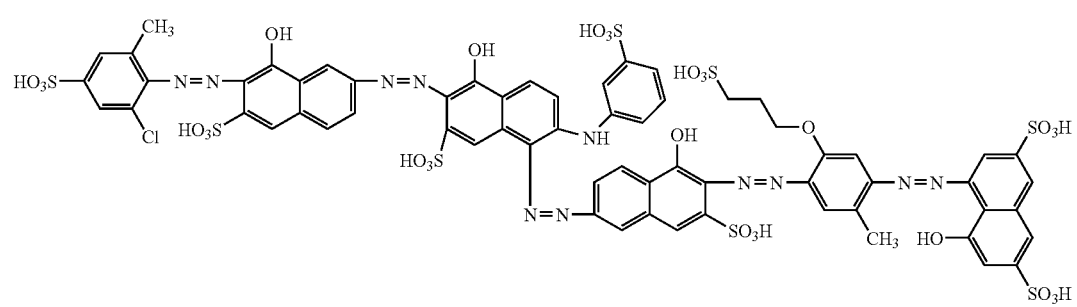 |

TABLE 8

| Compound No. | Structural Formula |
|---|---|
| No. 3-8 | |
| No. 3-9 | |
| No. 3-10 | |
| No. 3-11 | |

TABLE 8-continued
| Compound No. | Structural Formula |
|---|---|
| No. 3-12 | 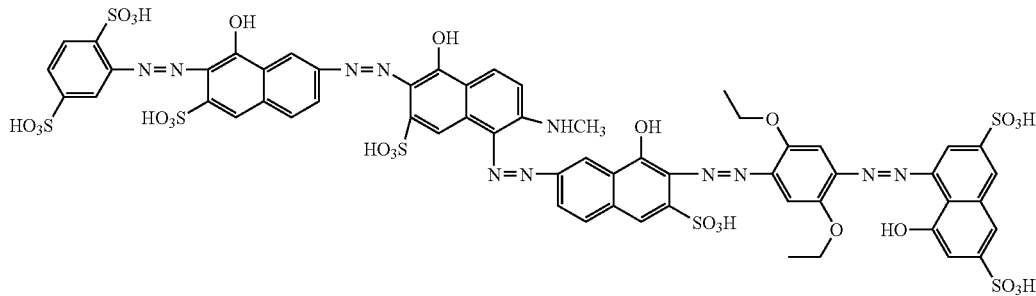 |
| No. 3-13 | 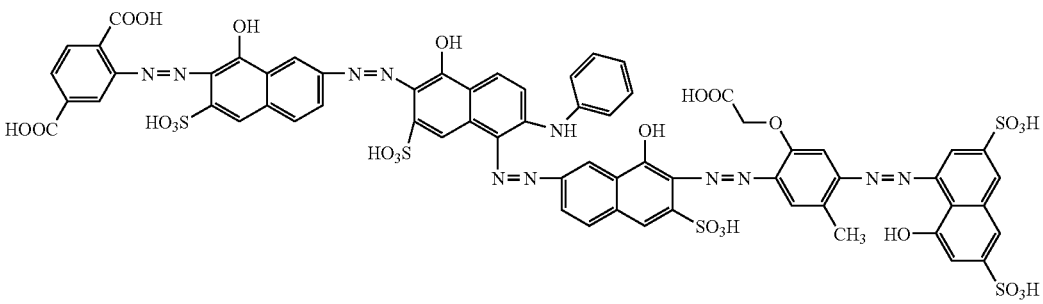 |
TABLE 9
| Compound No. | Structural Formula |
|---|---|
| No. 3-14 | 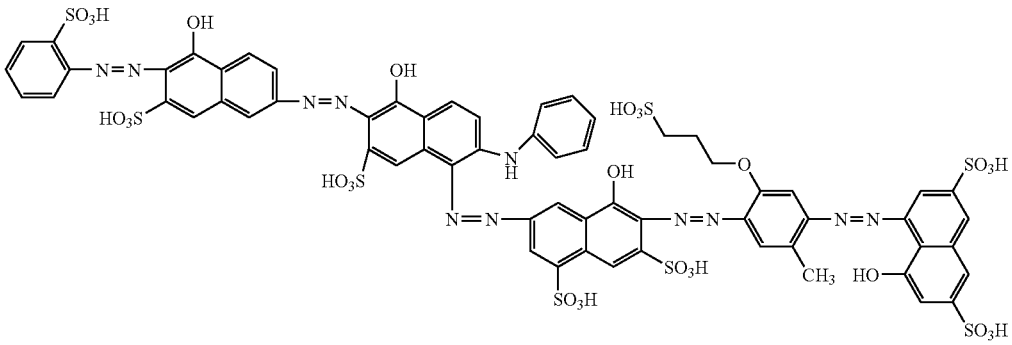 |
| No. 3-15 | 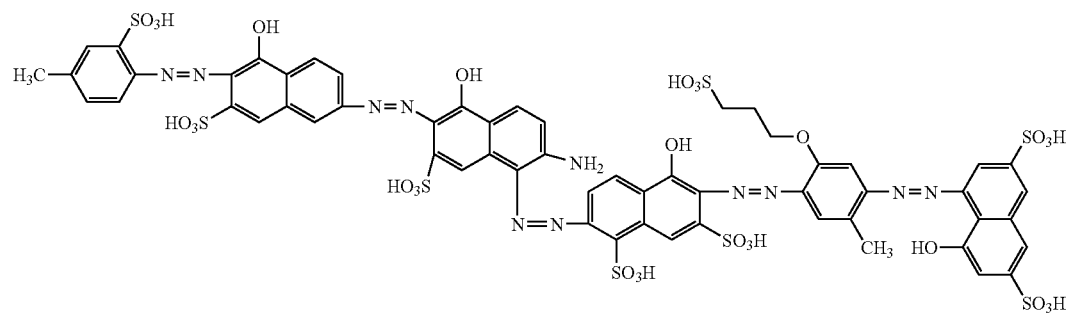 |

TABLE 9-continued
| Compound No. | Structural Formula |
|---|---|
| No. 3-16 | 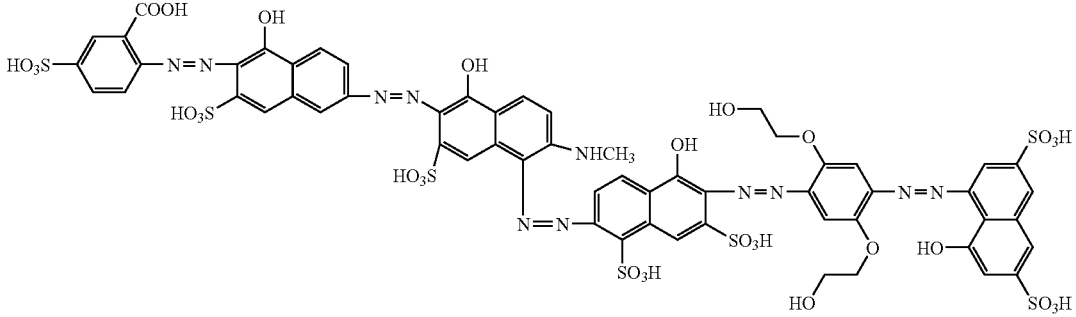 |
| No. 3-17 | 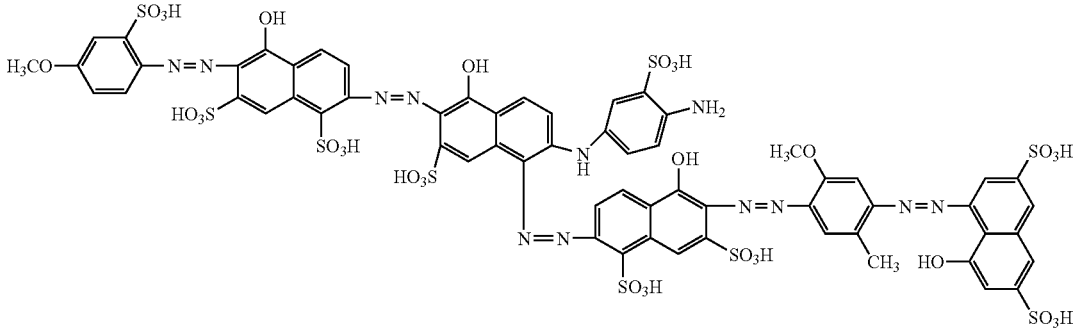 |
| No. 3-18 | 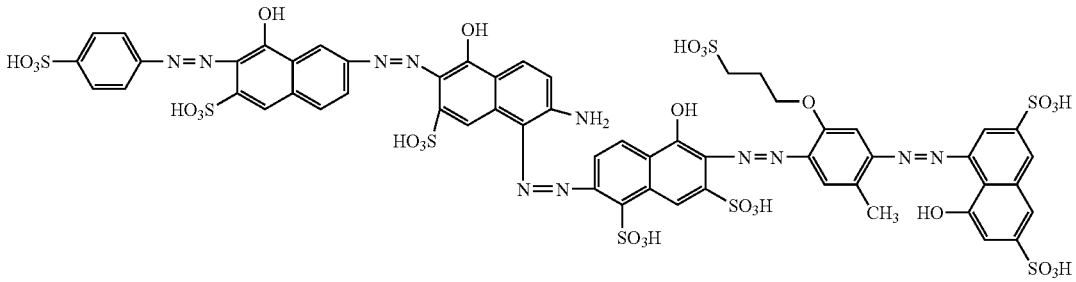 |
| No. 3-19 | 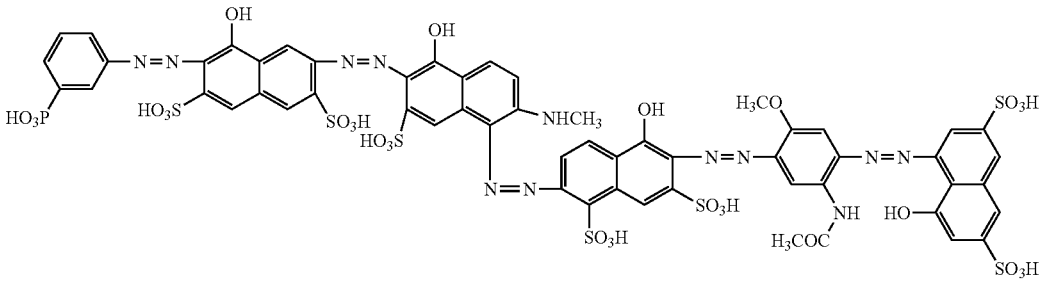 |

A tetraazo compound represented by the general Formula (3) can be synthesized by, for example, the following method (the structural formula of a compound in each step is shown in a free acid form).

That is, a compound represented by the general Formula (5):

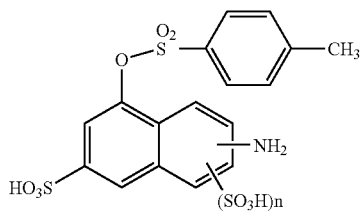
(5)

(wherein, n has the same meaning as n in the general Formula (3)), is subjected to an ordinary diazo reaction and then subjected to a coupling reaction with a compound represented by the general Formula (6):

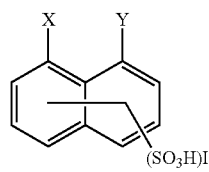
(6)

(wherein, I, X and Y have each the same meaning as I, X and Y in the general Formula (3), respectively), to obtain a compound represented by following general formula (7):

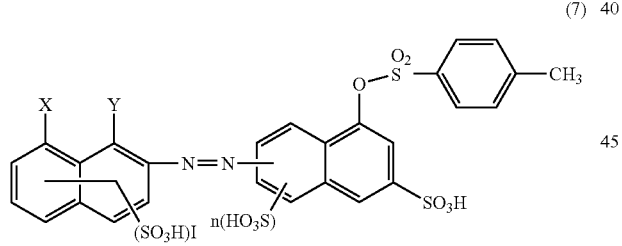
(7)

Aside from this, a compound represented by the following general formula (8) or (9):

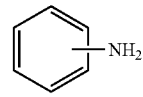
(8)

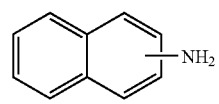
(9)

(wherein, a phenyl group and a naphthyl group may have the same substituent as that of A or B in the general Formula (3)), is subjected to a diazo reaction and then subjected to a coupling reaction with a compound represented by the general Formula (10):

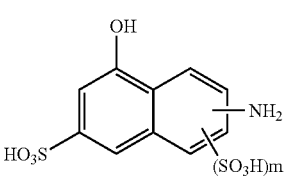
(10)

(wherein, m has the same meaning as m in the general Formula (3)), to obtain a compound represented by the following general formula (11) or (12):

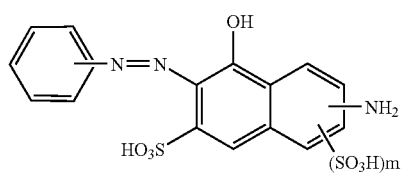
(11)

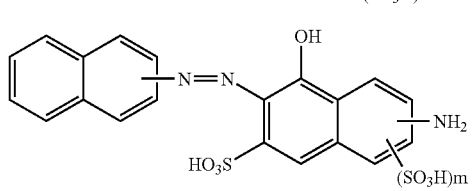
(12)

Thus obtained compound is subjected to a further diazo reaction and then subjected to a coupling reaction with the compound represented by the general Formula (7) to obtain a compound represented by the following general formula (13) or (14):

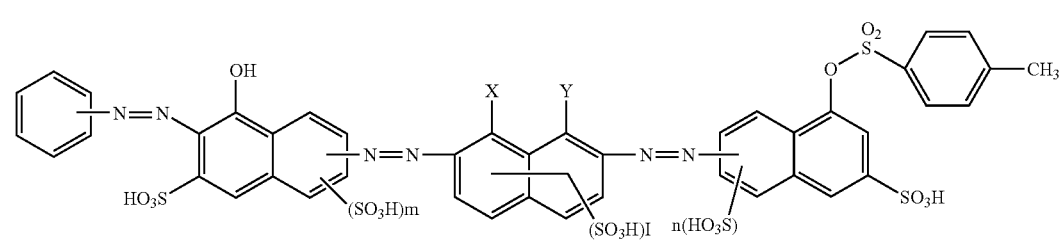
(13)

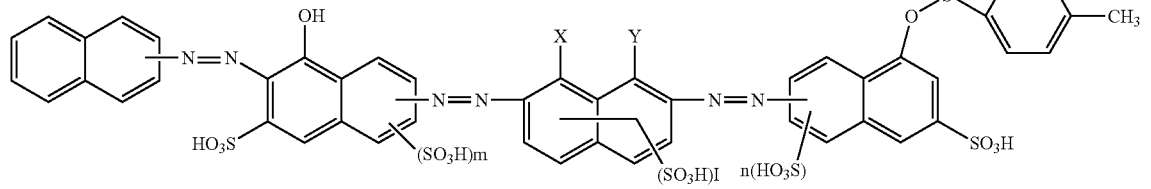
(14)
which is then subjected to alkali treatment to obtain a compound represented by the general Formula (15) or (16):
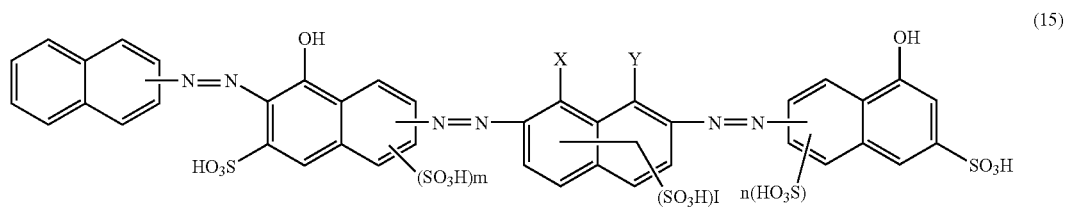
(15)
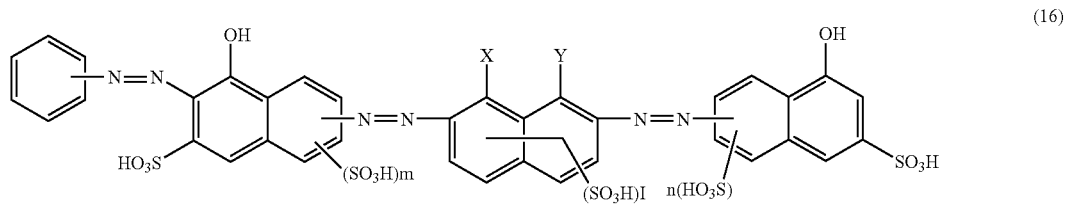
(16)
Thus obtained compound is subjected to a coupling reaction with a diazotized compound of a compound represented by the general Formula (8) or (9) to obtain a compound represented by the following general Formulae (17), (18), (19) or (20):
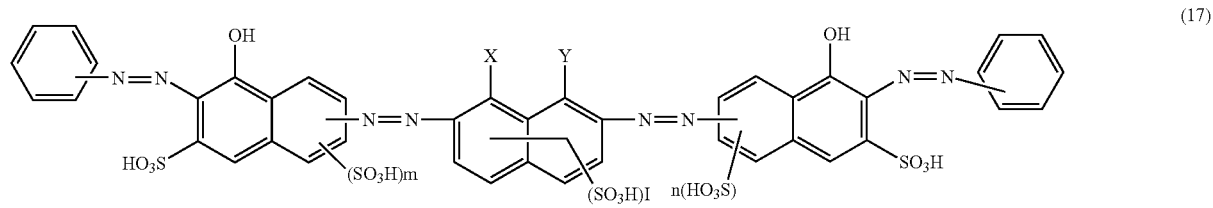
(17)
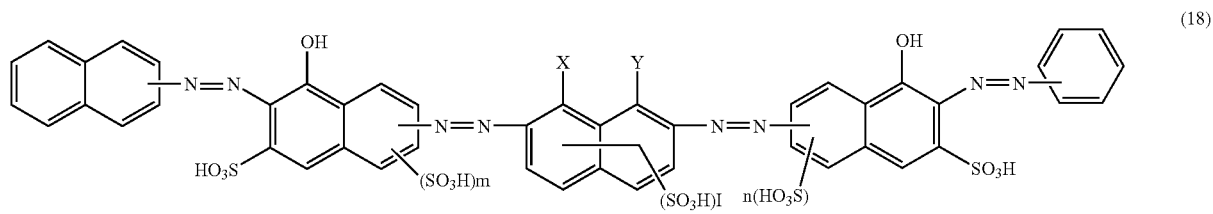
(18)

-continued

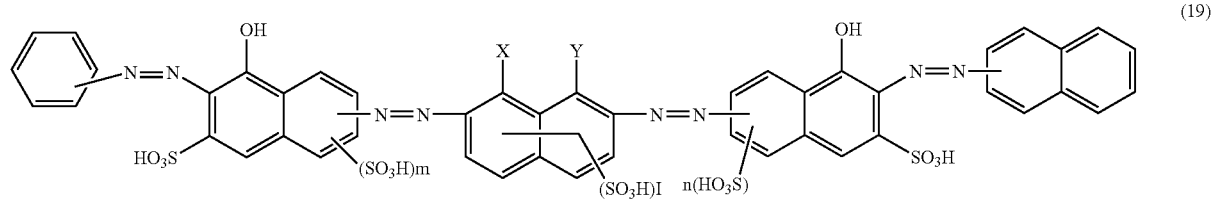
(19)

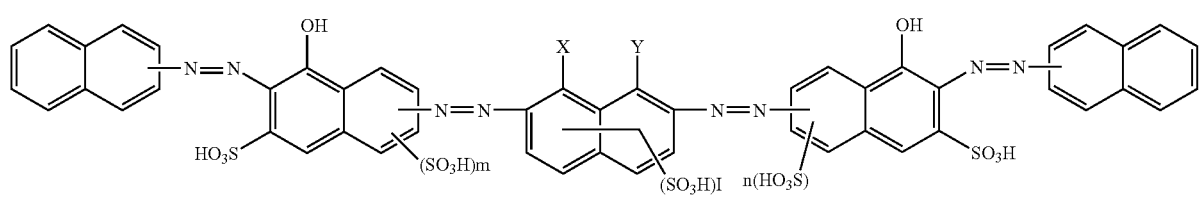
(20)

(wherein, m, l and n have each the same meaning as in the general Formula (3); a phenyl group or a naphthyl group present at the both ends may have the same substituent as that of A or B in the general Formula (3)).

A compound represented by the general Formula (11) or (12) is also subjected to a diazo reaction and then subjected to a coupling reaction with a compound represented by the general Formula (6) to obtain a compound represented by the general Formula (21) or (22):

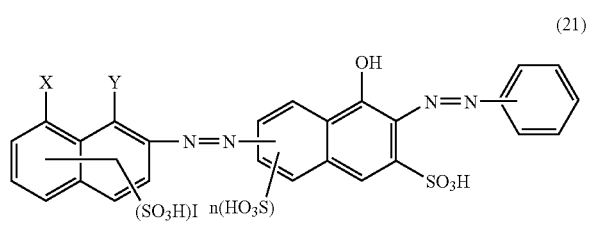
(21)

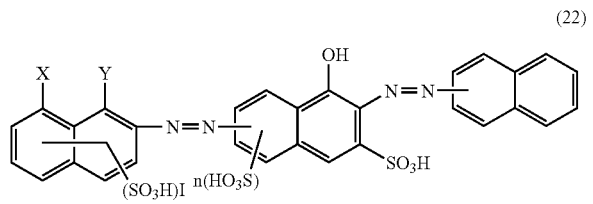
(22)

which is then subjected to a coupling reaction with a diazotized compound of a compound represented by the general Formula (11) or (12), to obtain the above compounds represented by above general Formulae (17), (18), (19) or (20), which are tetraazo compounds represented by the general Formula (3).

A diazo reaction of a compound represented by the general Formula (5) is carried out by a known method per se. The reaction is carried out, for example, in an inorganic acid medium, at, for example, −5 to 30° C., preferably 0 to 10° C., using a nitrite, for example, a nitrite of an alkali metal such as sodium nitrite. A coupling of a diazotized compound of a compound of the general Formula (5) with a compound of the general Formula (6) is also carried out under known conditions per se. It is advantageous to carry out the reaction in an aqueous medium or an aqueous organic medium, at, for example, −5 to 30° C., preferably 10 to 25° C., and at weakly acidic to weakly basic pH value. It is preferably carried out at weakly acidic to neutral pH value, for example, pH 2 to 7, which is controlled by the addition of a base. As the base, for example, a hydroxide of an alkali metal, such as lithium hydroxide and sodium hydroxide, a carbonate of an alkali metal, such as lithium carbonate, sodium carbonate and potassium carbonate, an acetate such as sodium acetate, ammonia or an organic amine can be used. A compound of the general Formula (5) and a compound of the general Formula (6) are used in nearly stoichiometric amounts.

A diazo reaction of a compound of the general Formula (8) or (9) is also carried out by a known method per se. The reaction is carried out, for example, in an inorganic acid medium, at, for example, −5 to 30° C., preferably 0 to 20° C., using a nitrite, for example, a nitrite of an alkali metal such as sodium nitrite. A coupling of a diazotized compound of a compound of the general Formula (8) or (9) with a compound of the general Formula (10) is also carried out under known conditions per se. It is advantageous to carry out the reaction in an aqueous medium or an aqueous organic medium, at, for example, −5 to 30° C., preferably 10 to 25° C., and at weakly acidic to basic pH value. It is preferably carried out at neutral to basic pH value, for example, pH 7 to 11, which is controlled by the addition of a base. As the base, a hydroxide of an alkali metal such as lithium hydroxide and sodium hydroxide, a carbonate of an alkali metal such as lithium carbonate, sodium carbonate and potassium carbonate, an acetate such as sodium acetate, ammonia or an organic amine can be used. A compound of the general Formula (8) or (9) and a compound of the general Formula (10) are used in nearly stoichiometric amounts.

Production of a compound of the general Formula (15) or (16) by hydrolysis of a compound of the general Formula (13) or (14) is also carried out by a known method per se. Such a method is advantageous as heating the reactants in an aqueous alkaline medium, for example, by adjusting pH value at 9.5 or more by the addition of sodium hydroxide or potassium hydroxide to a reaction solution containing a compound of the general Formula (13) or (14), followed by heating up to, for example, 20 to 150° C., preferably 30 to 100° C. The pH value of the reaction solution at this time is preferably kept at 9.5 to 11.5, which is controlled by the addition of a base. The above-mentioned base can be used.

A coupling of a diazotized compound of a compound of the general Formula (8) or (9) with a compound of the general Formula (15) or (16) is also carried out under known conditions per se. It is advantageous to carry out the reaction in an aqueous medium or an aqueous organic medium, at, for example, −5 to 30° C., preferably 0 to 10° C., and at weakly acidic to weakly basic pH value. It is preferably carried out at weekly acidic to neutral pH value, for example, pH 3 to 7, which is controlled by the addition of a base. As the base, a hydroxide of an alkali metal such as lithium hydroxide and sodium hydroxide, a carbonate of an alkali metal such as lithium carbonate, sodium carbonate and potassium carbonate, an acetate such as sodium acetate, ammonia or an organic amine can be used. A compound of the general Formula (8) or (9) and a compound of the general Formula (15) or (16) are used in nearly stoichiometric amounts.

A pentaazo compound represented by the general Formula (4) can be synthesized by, for example, the following methods (the position of each substituent is illustrated in an abbreviated form; and the structural formula of a compound in each step is shown in a free acid form). A compound represented by the general Formula (23):

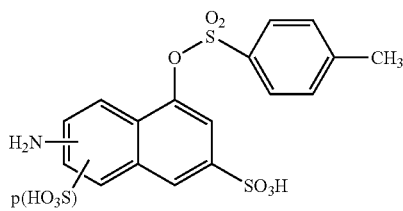

(23)

(wherein, p has the same meaning as p in the general Formula (4)), is diazotized by an ordinary method and then subjected to a coupling reaction with a compound represented by the following general formula (24):

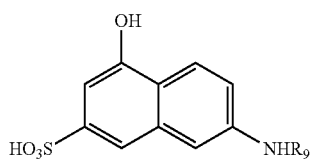

(24)

(wherein, $R_9$ has the same meaning as $R_9$ in the general Formula (4)), to obtain a compound represented by the general Formula (25).

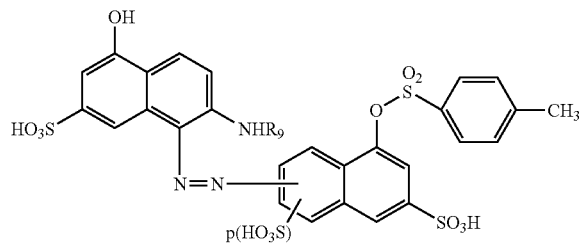

(25)

Aside from this, a compound represented by the general Formula (26):

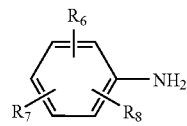

(26)

(wherein, $R_6$, $R_7$ and $R_8$ have each the same meanings as $R_6$, $R_7$ and $R_8$ in the general Formula (4) respectively); is subjected to an ordinary diazo reaction and then subjected to a coupling reaction with a compound represented by the following general formula (27):

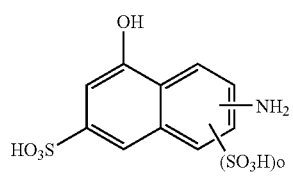

(27)

(wherein, o has the same meaning as o in the general Formula (4)), to obtain a compound represented by the general Formula (28).

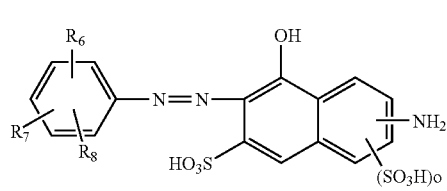

(28)

Thus obtained compound is subjected to a further diazo reaction and then subjected to a coupling reaction with the above compound represented by the general Formula (25) to obtain a compound represented by the general Formula (29):

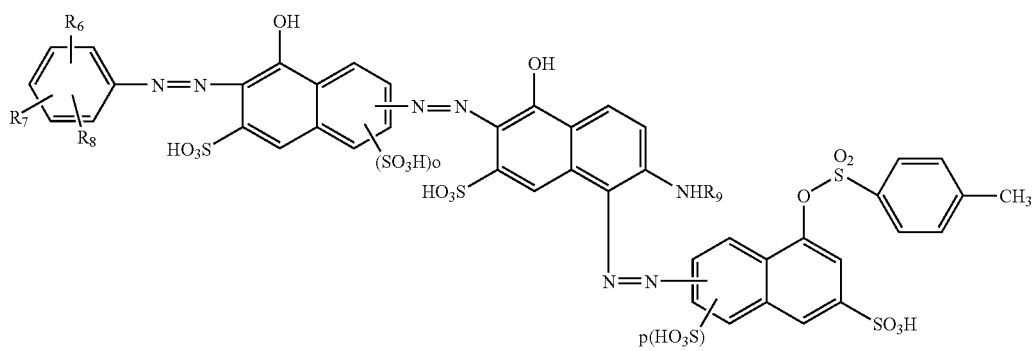

(29)

which is then subjected to hydrolysis to obtain a compound represented by the general Formula (30):

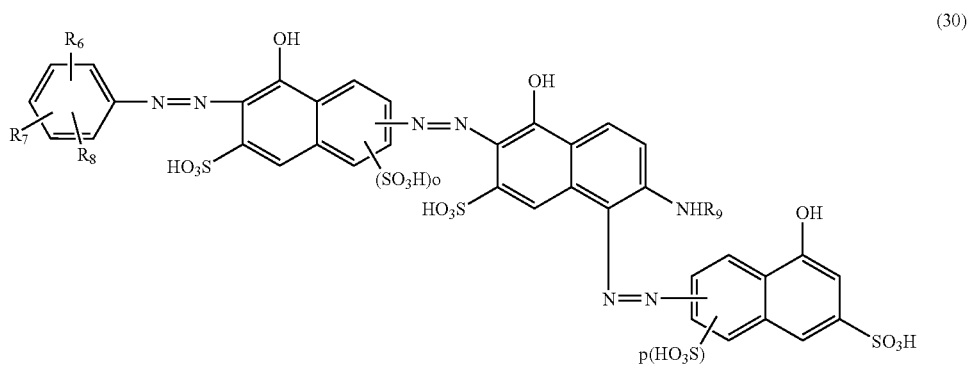

(30)

Aside from this, a compound represented by the general Formula (31):

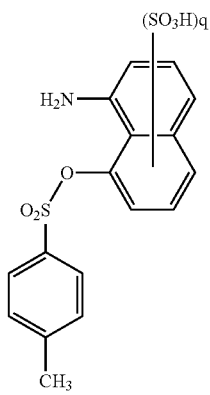

(31)

(wherein, q has the same meaning as q in the general Formula (4)); is subjected to an ordinary diazo reaction and then subjected to a coupling reaction with a compound represented by the following general formula (32):

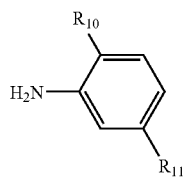

(32)

(wherein, $R_{10}$ and $R_{11}$ have each the same meanings as $R_{10}$ and $R_{11}$ in the general Formula (4), respectively), to obtain a compound represented by the general Formula (33):

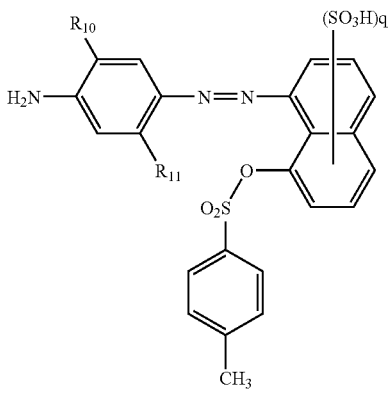

(33)

Thus obtained compound is subjected to a diazo reaction and then subjected to a coupling reaction with the above compound represented by the general Formula (30) to obtain a compound represented by the general Formula (34):

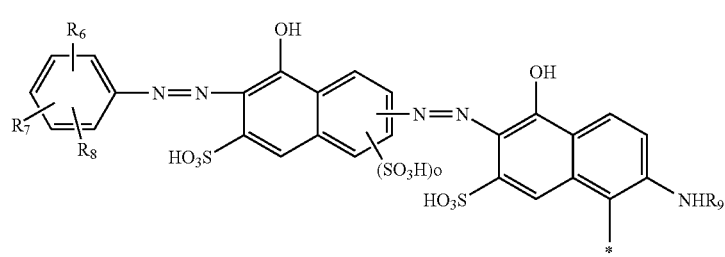
(34)
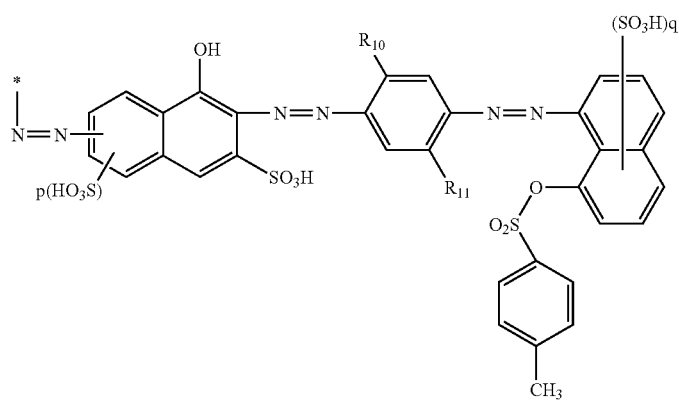
which is then subjected to hydrolysis to obtain the compound represented by the general Formula (4).
A diazotized compound of a compound of the general Formula (33) by an ordinary method is subjected to a coupling reaction with a compound represented by the following general Formula (35):
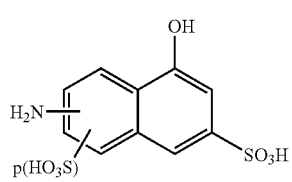
(35)
to obtain a compound represented by the general Formula (36):
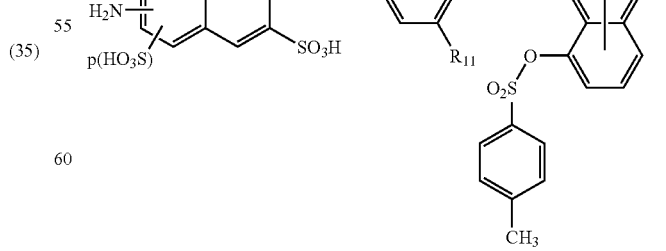
(36)

which is then subjected to hydrolysis to obtain a compound represented by the general Formula (37):

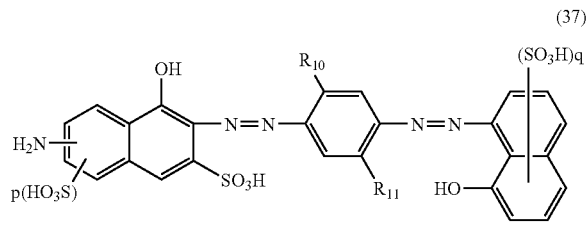

(37)

Thus obtained compound is subjected to an ordinary diazo reaction and then subjected to a coupling reaction with the compound represented by the general Formula (24), to obtain the compound represented by the general Formula (38):

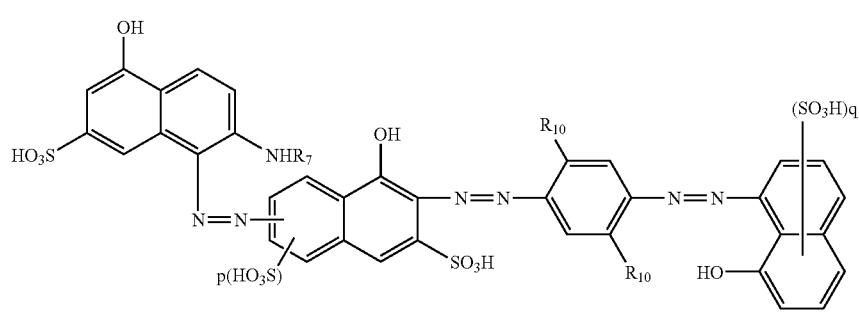

(38)

Thus obtained compound also can be subjected to a coupling reaction with a diazotized compound of the compound represented by the general Formula (28) by an ordinary method, to obtain the compound represented by the general Formula (4).

A diazo reaction of a compound of the general Formula (23) is carried out by a known method per se. The reaction is carried out, for example, in an inorganic acid medium, at, for example, −5 to 30° C., preferably 5 to 15° C., using a nitrite, for example, a nitrite of an alkali metal such as sodium nitrite. A coupling of a diazotized compound of a compound of the general Formula (23) with a compound of the general Formula (24) is also carried out under known conditions per se. It is advantageous to carry out the reaction in an aqueous medium or an aqueous organic medium, at, for example, −5 to 30° C., preferably 5 to 20° C., and at acidic to neutral pH value. It is preferably carried out at weakly acidic to neutral pH value, for example, pH 2 to 6, which is controlled by the addition of a base. As the base, a hydroxide of an alkali metal such as lithium hydroxide and sodium hydroxide, a carbonate of an alkali metal such as lithium carbonate, sodium carbonate and potassium carbonate, an acetate such as sodium acetate, ammonia or an organic amine can be used. A compound of the general Formula (23) and a compound of the general Formula (24) are used in nearly stoichiometric amounts.

A diazo reaction of a compound of the general Formula (26) is also carried out by a known method per se. The reaction is carried out, for example, in an inorganic acid medium, at, for example, −5 to 30° C., preferably 0 to 15° C., using a nitrite, for example, a nitrite of an alkali metal such as sodium nitrite. A coupling of a diazotized compound of a compound of the general Formula (26) with a compound of the general Formula (27) is also carried out under known conditions per se. It is advantageous to carry out the reaction in an aqueous medium or an aqueous organic medium, at, for example, −5 to 30° C., preferably 10 to 25° C., and at weakly acidic to weakly basic pH value. It is preferably carried out at weakly acidic to weakly basic pH value, for example, pH 5 to 10, which is controlled by the addition of a base. As the base, a hydroxide of an alkali metal such as lithium hydroxide and sodium hydroxide, a carbonate of an alkali metal such as lithium carbonate, sodium carbonate and potassium carbonate, an acetate such as sodium acetate, ammonia or an organic amine can be used. A compound of the general Formula (26) and a compound of the general Formula (27) are used in nearly stoichiometric amounts.

A diazo reaction of a compound of the general Formula (28) is also carried out by a known method per se. The reaction is carried out, for example, in an inorganic acid medium, at, for example, −5 to 30° C., preferably 5 to 20° C., using a nitrite, for example, a nitrite of an alkali metal such as sodium nitrite. A coupling of a diazotized compound of a compound of the general Formula (28) with a compound of the general Formula (25) is also carried out under known conditions per se. It is advantageous to carry out the reaction in an aqueous medium or an aqueous organic medium, at, for example, −5 to 30° C., preferably 10 to 25° C., and at weakly acidic to basic pH value. It is preferably carried out at weakly acidic to weakly basic pH value, for example, pH 5 to 10, which is controlled by the addition of a base. As the base, a hydroxide of an alkali metal such as lithium hydroxide and sodium hydroxide, a carbonate of an alkali metal such as lithium carbonate, sodium carbonate and potassium carbonate, an acetate such as sodium acetate, ammonia or an organic amine can be used. A compound of the general Formula (28) and a compound of the general Formula (25) are used in nearly stoichiometric amounts.

Production of a compound of the general Formula (30) by hydrolysis of a compound of the general Formula (29) is also carried out by a known method per se. Such a method is advantageous as heating the reactants in an aqueous alkaline medium, for example, by adjusting pH value at 9.5 or more by the addition of sodium hydroxide or potassium hydroxide to a reaction solution containing a compound of the general Formula (29), followed by heating up to, for example, 20 to 150° C., preferably 30 to 100° C. The pH value of the reaction solution at this time is preferably kept at 9.5 to 11.5, which is controlled by the addition of a base. The above mentioned base can be used.

A diazo reaction of a compound of the general Formula (31) is also carried out by a known method per se. The reaction is carried out, for example, in an inorganic acid medium, at, for example, −5 to 30° C., preferably 0 to 15° C., using a nitrite, for example, a nitrite of an alkali metal such as sodium nitrite. A coupling of a diazotized compound of a compound of the general Formula (31) with a compound of the general Formula (32) is also carried out under known conditions per se. It is advantageous to carry out the reaction in an aqueous medium or an aqueous organic medium, at, for example, −5 to 30° C., preferably 5 to 20° C., and at acidic to weakly basic pH value. It is preferably carried out at acidic to neutral pH value, for example, pH 2 to 6, which is controlled by the addition of a base. As the base, a hydroxide of an alkali metal such as lithium hydroxide and sodium hydroxide, a carbonate of an alkali metal such as lithium carbonate, sodium carbonate and potassium carbonate, an acetate such as sodium acetate, ammonia or an organic amine can be used. A compound of the general Formula (31) and a compound of the general Formula (32) are used in nearly stoichiometric amounts.

A diazo reaction of a compound of the general Formula (33) is also carried out by a known method per se. The reaction is carried out, for example, in an inorganic acid medium, at, for example, −5 to 30° C., preferably 5 to 20° C., using a nitrite, for example, a nitrite of an alkali metal such as sodium nitrite. A coupling of a diazotized compound of a compound of the general Formula (33) with a compound of the general Formula (30) is also carried out under known conditions per se. It is advantageous to carry out the reaction in an aqueous medium or an aqueous organic medium, at, for example, −5 to 30° C., preferably 10 to 25° C., and at weakly acidic to basic pH value. It is preferably carried out at weakly acidic to weakly basic pH value, for example, pH 5 to 10, which is controlled by the addition of a base. As the base, a hydroxide of an alkali metal such as lithium hydroxide and sodium hydroxide, a carbonate of an alkali metal such as lithium carbonate, sodium carbonate and potassium carbonate, an acetate such as sodium acetate, ammonia or an organic amine can be used. A compound of the general Formula (33) and a compound of the general Formula (30) are used in nearly stoichiometric amounts.

Production of a compound of the general Formula (4) by hydrolysis of a compound of the general Formula (34) is also carried out by a known method per se. Such a method is advantageous as heating the reactants in an aqueous alkaline medium, for example, by adjusting pH value at 9.5 or more by the addition of sodium hydroxide or potassium hydroxide to a reaction solution containing a compound of the general Formula (34), followed by heating up to, for example, 20 to 150° C., preferably 30 to 100° C. The pH value of the reaction solution at this time is preferably kept at 9.5 to 11.5, which is controlled by the addition of a base. The above mentioned base can be used.

A water-soluble black dye (A) to be used for a water-based black ink composition of the present invention, preferably a compound represented by above general formula (3) or (4) or a salt thereof, for example, a sodium salt thereof can be obtained by salting out by adding a common salt to the reaction solution, and then filtration. Thus obtained sodium salt is further dissolved in water, added with an acid to be crystallized under an acidic condition and filtered to obtain a cake of a dye compound in a free acid form. Thus obtained dye compound in a free acid form is then dissolved or suspended in water and added and dissolved with a base corresponding to an objective salt, for example, amines or an alkali metal compound other than sodium, to obtain a solution of each salt. From thus obtained solution, by precipitating, filtering and drying in ordinary methods, each salt other than the sodium salt can be obtained.

Next, a water-based black ink composition of the present invention will be described in detail.

In a water-based black ink composition of the present invention, the content ratio (by weight) of a water-soluble black dye (A) (hereinafter, also referred to as a water-soluble dye (A) for simplicity) and a DNSDS-AB condensate compound (B) or a reduction product (C) thereof is as follows;

Based on the total amount (by weight) of both components contained in said ink, the content ratio of the condensate compound (B) or the reduction product (C) thereof is usually 0.1% to 50%, preferably 5% to 40% and the content ratio of the water-soluble dye (A) is usually 50% to 99.9%, preferably 60% to 95%.

An azo compound represented by the general Formula (3) and/or an azo compound represented by the general Formula (4) is suitably used as a water-soluble dye (A). In the ink composition, only any one of these compounds may be used but it is preferable that usually both compounds are used together. When both compounds are used together, the content (by weight) of an azo compound represented by the general Formula (3) is preferably in the range of 10% to 80%, more preferably in the range of 15% to 70%, based on the total amount (by weight) of a water-soluble dye (A). On the other hand, the content (by weight) of an azo compound represented by the general Formula (4) is preferably in the range of 20% to 90%, more preferably in the range of 30% to 80%, based on the total amount (by weight) of a water-soluble dye (A). The ratio of these dye compounds is the ratio converted to the weight of powder after desalting treatment.

Into the ink composition, other colorants may further be added for fine hue control.

The ink composition is a composition, wherein water is a major solvent containing usually 0.1 to 20% by weight, preferably 1 to 10% by weight and more preferably, 2 to 8% by weight of these dye compounds in total, based on the total amount of the ink composition. The ink composition may further contain a water-soluble organic solvent of, for example, 0 to 30% by weight and an ink modifier of, for example, 0 to 5% by weight. The remainder other than the above is water. The ink composition has preferably pH of 5 to 11, more preferably pH of 7 to 10 to improve storage stability. The colored composition has surface tension of preferably 25 to 70 mN/m, more preferably 25 to 60 mN/m. The colored composition has viscosity of preferably not higher than 30 mPa·s, more preferably not higher than 20 mPa·s.

When the ink composition is used as an ink for an ink-jet printer, it is preferable to prepare an ink composition containing less inorganic materials such as a chloride and a sulfate of a metal cation. Therefore, it is preferable to use a dye containing less inorganic materials, for example, not more than about 0.1% by weight (based on the total dye). To produce the dye compound having less inorganic materials, for example, desalting treatment methods are adopted such as an ordinary reverse osmosis method and a method by which a dried material or a wet cake of a dye compound is stirred in a mixed solvent of an alcohol such as methanol and water, filtered and dried.

A water-soluble organic solvent that can be used to prepare the ink composition includes, for example, a (C1 to C4) alkanol such as methanol, ethanol, propanol, isopropanol, butanol, isobutanol, sec-butanol and tert-butanol; a carboxyamide such as N,N-dimethylformamide and N,N-dimethylacetamide; a lactam such as 2-pyrrolidone and N-methylpyrrolidine-2-one; a cyclic ureas such as 1,3- dimethylimidazolidine-2-one and 1,3-dimethylhexahydropyrimide-2-one; a ketone or a ketoalcohol such as acetone, methyl ethyl ketone and 2-methyl-2-hydroxypentane-4-one; a cyclic ether such as tetrahydrofuran and dioxane; a mono-, oligo- or polyalkylene glycol or thio glycol having (C2 to C6) alkylene units such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thio diglycol and dithio diglycol; a polyol (triol) such as glycerin, and hexane-1,2,6-triol; a (C1 to C4) alkyl ether of a polyhydric alcohol such as ethylene glycol monomethyl ether, ethylene glycol monoethyl ether, diethylene glycol monomethyl ether, diethylene glycol monoethyl ether, triethylene glycol monomethyl ether and triethylene glycol monoethyl ether; γ-butylolactone; and dimethylsulfoxide. These organic solvents may be used alone or in a combination of two or more kinds thereof.

In preparing the above ink composition, an ink modifier to be used as needed includes, for example, an antiseptic and fungicide, a pH controller, a chelate agent, an antirust agent, a water-soluble ultraviolet absorber, a water-soluble polymer, a dye-dissolving agent, an antioxidant and a surfactant.

The above fungicide includes sodium dehydroacetate, sodium benzoate, sodium pyridinethione-1-oxide, p-hydroxyethyl benzoate, 1,2-benzisothiazoline-3-one and a salt thereof. These fungicides of 0.02 to 1.00% by weight are preferably used in a colored composition.

The antiseptic includes, a compound of, for example, an organic sulfur base, an organic nitrogen sulfur base, an organic halogen base, a haloallylsulfone base, an iodopropargyl base, an N-haloalkylthio base, a benzothiazole base, a nitrile base, a pyridine base, an 8-oxyquinoline base, an isothiazoline base, a dithiol base, a pyridineoxide base, a nitropropane base, an organostannum base, a phenol base, a quaternary ammonium salt base, a triazine base, a thiazine base, an anilide base, an adamantane base, a dithiocarbamate base, a brominated indanone base, a benzilbromacetate base and an inorganic salt base. The compounds of an organic halogen base, a pyridineoxide base and an inorganic salt base include, for example, sodium pentachlorophenol, 2-pyridinethiol-1-oxide sodium and sodium acetic anhydride, respectively. The compound of an isothiazoline base includes, for example, 1,2-benzisothiazoline-3-one, 2-n-octyl-4-isothiazoline-3-one, 5-chloro-2-methyl-4-isothiazoline-3-one, 5-chloro-2-methyl-4-isothiazoline-3-one magnesium chloride, 5-chloro-2-methyl-4-isothiazoline-3-one calcium chloride and 2-methyl-4-isothiazoline-3-one calcium chloride. Other antiseptic and fungicide include sodium sorbate, sodium benzoate and the like.

As a pH controller, any substance can be used as long as it can control pH of an ink in the range of, for example, 5 to 11, without impairing the ink to be formulated. An example of the pH controller includes an alkanolamine such as diethanolamine, triethanolamine and N-methyldiethanolamine; a hydroxide of an alkali metal such as lithium hydroxide, sodium hydroxide and potassium hydroxide; ammonium hydroxide (ammonia); a carbonate of an alkali metal such as lithium carbonate, sodium carbonate, sodium hydrogencarbonate and potassium carbonate; potassium acetate; and an inorganic base such as sodium silicate and disodium phosphate.

The chelate agent includes, for example, sodium ethylenediamine tetraacetate, sodium nitrilo triacetate, sodium hydroxyethylethylenediamine triacetate, sodium diethylenetriamine pentaacetate and sodium uracil diacetate.

The antirust agent includes, for example, an acid sulfite, sodium thiosulfate, ammonium thioglycolate, diisopropyl ammonium nitrite, pentaerythritol tetranitrate and dicyclohexyl ammonium nitrite.

The water-soluble ultraviolet absorber includes, for example, a sulfonated benzophenone-based compound, a benzotriazole-based compound, a salicyclic-acid-based compound, a cinnamic-acid-based compound and a triazine-based compound.

The water-soluble polymer includes polyvinyl alcohol, a cellulose derivative, a polyamine, a polyimine, and the like.

The dye-dissolving agent includes, for example, ε-caprolactam, ethylene carbonate and urea.

As the antioxidant, for example, various organic or metal-complex-based fading inhibitors can be used. The above organic fading inhibitors include hydroquinones, alkoxyphenols, dialkoxyphenols, phenols, anilines, amines, indans, chromans, alkoxyanilines, heterocycles, and the like.

The surfactant includes known surfactants such as an anionic, cationic and nonionic surfactant. The anionic surfactant includes an alkyl sulfonic acid, alkyl carboxylate, α-olefin sulfonate, polyoxyethylene alkyl ether acetate, N-acylamino acid and a salt thereof, N-acylmethyltaurine salt, alkylsulfate polyoxyalkyl ether sulfate, alkylsulfate polyoxyethylene alkyl ether phosphate, rosin acid soap, caster oil sulfuric acid ester salt, lauryl alcohol sulfuric acid ester salt, alkylphenol-type phosphate, alkyl-type phosphate, alkylallyl sulfonate, diethylsulfo succinate, diethylhexylsulfo succinic acid dioctylsulfo succinate and the like. The cationic surfactant includes a 2-vinylpyridine derivative, a poly 4-vinylpyridine derivative and the like. The ampholytic surfactant includes betaine lauryidimethylamino acetate, 2-alkyl-N-carboxymethyl-N-hydroxyethylimidazolynium betaine, betaine coconut fatty acid amide propyldimethylamino acetate, polyoctylpolyaminoethylglycine, an imidazoline derivative, and the like. The nonionic surfactant includes ethers such as polyoxyethylene nonyl phenyl ether, polyoxyethylene octyl phenyl ether, polyoxyethylene dodecyl phenyl ether, polyoxyethylene oleyl ether, polyoxyethylene lauryl ether, polyoxyethylene alkyl ether and polyoxyallylkyl alkyl ether; esters such as polyoxyethylene oleic acid, polyoxyethylene oleate, polyoxyethylene distearate, sorbitan laurate, sorbitan monostearate, sorbitan monooleate, sorbitan sesquiorate, polyoxyethylene monooleate and polyoxyethylene stearate; and acetylene glycols such as 2,4,7,9-tetramethyl-5-decyne-4,7-diol, 3,6-dimethyl-4-octyne-3,6-diol and 3,5-dimethyl-1-hexyne-3-ol (for example, Surfynol 104, 105, 82, 465, and Olfine STG from Nissin Chemical Industry Co., Ltd.). These ink modifiers are used alone or in mixture thereof.

The ink composition is obtained by mixing and stirring the above ingredients in arbitrary order. Thus obtained ink composition may be filtered with a membrane filter to remove impurities.

An ink composition of the present invention can be used in various fields, and is suitable for a water-base ink for writing, a water-base printing ink, an information recording ink, and the like, particularly preferably for an ink for ink-jet printing containing the ink composition. Consequently, an ink for ink-jet printing of the present invention is characterized by containing an ink composition of the present invention and suitably used in an ink-jet recording method of the present invention to be described later.

Next, an ink-jet recording method of the present invention will be described. The ink-jet recording method of the present invention is characterized by using an ink for ink-jet recording containing the above ink composition. In the ink-jet recording method of the present invention, an ink for ink-jet recording containing the above ink composition is used for recording on an image receiving material and an ink nozzle, and the like to be used in this case are not especially limited and can be selected as appropriate according to the purpose.

The above image receiving material is not especially limited, and includes a known recording material such as a Plain Paper, a resin-coated paper, a paper for exclusive ink-jet use, a film, a Plain Paper for electrophotography, cloth, glass, metal and ceramics.

In the ink-jet recording method of the present invention, among the above image receiving materials, the following recording paper and recording film called, for example, paper for exclusive ink-jet use, glossy paper for exclusive ink-jet use, and film for exclusive ink-jet use are particularly preferable.

In the above recording paper and recording film, a support substrate and an image receiving layer are laminated and other layers such as a back coat layer are also laminated as needed. Each layer such as the image receiving layer may be a single layer or multiple layers.

The above support substrate is consisted of chemical pulp such as LBKP and NBKP, mechanical pulp such as GP, PGW, RMP, TMP, CTMP, CMP and CGP and waste paper pulp such as DIP, and added and mixed as needed with a known pigment, a binder, a sizing agent, a fixing agent, a cation agent, a paper reinforcing agent, and the like. Paper produced by various machines such as a Fourdrinier paper machine and a cylinder paper machine as well as synthetic paper and plastic film sheet may also be used.

The above support substrate preferably has thickness of about 10 to 250 µm and basis weight of 10 to 250 g/m$^2$.

The above support substrate may be added with the above image receiving layer or further with the above back coat layer, or added with the above recording layer and the above back coat layer after a size press coating or an anchor coating of starch or polyvinyl alcohol. The above support substrate may also be subjected to flattening treatment by a calender such as a machine calender, a TG calender and a soft calender.

Among the above support substrates, a paper laminated with polyolefin (polyethylene, polystyrene, polyethylene terephthalate, polybutene and a copolymer thereof) on both sides, and a plastic film are preferably used.

The above recording layer may contain a pigment, a water-based binder, a mordant, a water fastness improving agent, a light fastness improving agent, a surfactant and other additives.

The above pigment is preferably a white pigment, which suitably includes, for example, an inorganic white pigment such as calcium carbonate, kaolin, talc, clay, diatom earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate; an organic pigment such as a styrene-based pigment, an acrylic-resin-based pigment, a urea resin and a melamine resin. Among these white pigments, a porous inorganic pigment is preferable.

The above water-based binder includes, for example, a water-soluble polymer such as polyvinyl alcohol, silanol-modified polyvinyl alcohol, starch, cationized starch, casein, gelatin, carboxymethyl cellulose, hydroxyethyl cellulose, polyvinyl pyrrolidone, polyalkylene oxide and a polyalkylene oxide derivative; and a water-dispersible polymer such as styrene-butadiene latex and acrylic emulsion. These water-based binders may be used alone or in combination of two or more kinds.

As the above mordant, a polymer mordant is preferably used.

The above water fastness improving agent is effective for improving water fastness of an image and suitably includes a cationic resin, which includes, for example, polyamide polyamine epichlorohydrin, polyethylene imine, polyamine sulfone, dimethyldiallylanmonium chloride polymer, cationic polyacrylamide and colloidal silica.

The above light fastness improving agent includes, for example, zinc sulfate, zinc oxide, a hindered-amine-based antioxidant and a benzophenone-based or benzotriazole-based ultraviolet absorber.

The above surfactant functions as an auxiliary agent for coating, a peel improving agent, a slip improving agent or an antistatic agent. Instead of the above surfactant, an organofluoro compound may be used. The above organofluoro compound includes, for example, a fluorine-based surfactant, an oily fluoro compound (for example, fuluorcarbon oil) and a solid fluoro compound resin (for example, tetrafluoroethylene resin).

The above other additives include, for example, a pigment dispersing agent, a thickening agent, an antifoaming agent, a dye, a fluorescent whitening agent, an antiseptic, a pH controller, a matting agent and a hardener.

The above back coat layer may contain a white pigment, a water-based binder and other ingredients.

The above white pigment includes, for example, an inorganic white pigment such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudboehmite, aluminum hydroxide, alumina, lithopone, zeolite, aqueous halloysite, magnesium carbonate and magnesium hydroxide, and an organic pigment such as a styrene-based plastic pigment, an acrylic-resin-based pigment, polyethylene, a microcapsule, a urea resin and a melamine resin.

The above water-based binder includes a water-soluble polymer such as a styrene/maleate copolymer, a styrene/acrylate copolymer, polyvinyl alcohol, silanol-modified polyvinyl alcohol, starch, cationized starch, casein, gelatin, carboxymethyl cellulose, hydroxyethyl cellulose, polyvinyl pyrrolidone, and a water-dispersible polymer such as styrene-butadiene latex and acrylic emulsion.

As the above other ingredients include an antifoaming agent, a foam inhibitor, a dye, a fluorescent whitening agent, an antiseptic, a water fastness improving agent, and the like.

Layers (including a back coat layer) composing the above recording paper and recording film may be added with polymer latex. The above polymer latex is used for the purpose of improving film properties such as stabilizing dimension, preventing curling, preventing adherence and preventing film cracking. By the addition of polymer latex of low glass transition temperature (not higher than 40° C.) to a layer containing the above mordant, cracking and curling of the layer can be prevented. Also by the addition of polymer latex of high glass transition temperature to the above back coat layer, curling of the layer can be prevented.

An ink-jet recording method of the present invention is not especially limited and may include any known method such as an electric charge controlling method to discharge ink utilizing static induction force, a drop-on-demand method (pressure pulse method) to make use of vibration pressure of piezoelectric elements, an acoustic ink-jet method to discharge ink by radiation pressure of acoustic beams converted from electric signals and by irradiation of ink, and a thermal ink-jet method (Bubble Jet (registered trademark)) to make use of pressure of bubbles generated by heating ink. The above ink-jet recording method also includes a method for injecting a number of tiny droplets of a low concentration ink called a photo ink, a method for improving image quality using multiple inks having substantially the same hue and different concentration, and a method for using a colorless and transparent ink.

EXAMPLES

Hereinafter, the present invention is more specifically explained by Examples, but the present invention should not be limited thereto. In this connection, "part" and "%" in the specification are based on mass unless otherwise specified. Compounds are represented as a free acid form.

Example 1-1

Into 200 parts of water, 20.42 parts of a compound of Formula (111) as shown below was dissolved while adjusting pH at 5.5 to 8.0 with sodium hydroxide. Next, temperature of said solution was set to 5 to 10° C., and a diazo reaction was conducted by the addition of 52.2 parts of a 35% hydrochloric acid solution and 28.0 parts of a 40% aqueous solution of sodium nitrite thereto.

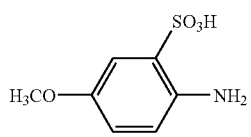
(111)

This diazo suspension was added dropwise into an aqueous alkaline solution containing 24.7 parts of 7-amino-1-hydroxynaphthalene-3-sulfonic acid in 200 parts of water at 15 to 30° C. During the dropwise addition, pH value of the solution was retained at 8.5 to 9.5 with sodium carbonate. After the end of the dropwise addition, further stirring was conducted for 3 hours at pH of 8.5 to 9.5, at 15 to 30° C., to complete a coupling reaction and to obtain a reaction solution containing a compound of Formula (112) as shown below. Thereafter, salting out thereof was conducted by the addition of sodium chloride, followed by filtration and drying to obtain 26.3 parts of a monoazo compound of Formula (112) as shown below.

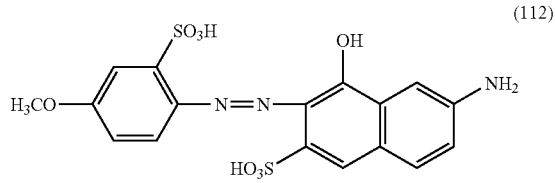
(112)

Next, into 1000 parts of water, 26.3 parts of a compound of Formula (112) obtained as described above was dissolved while adjusting pH at 5.5 to 8.0 with sodium hydroxide, and thereafter, by the addition of 20.1 parts of a 35% hydrochloric acid solution and adding 16.2 parts of a 40% aqueous solution of sodium nitrite thereto at temperature of 10 to 15° C., a diazo reaction was conducted. To the diazo suspension obtained, 22.5 parts of 8-amino-1-hydroxynaphthalene-3,6-disulfonic acid was added. After the addition, said solution was stirred overnight at 15 to 30° C. while retaining pH at 2.0 to 3.0 with sodium carbonate to obtain a reaction solution containing a compound of Formula (113) as shown below.

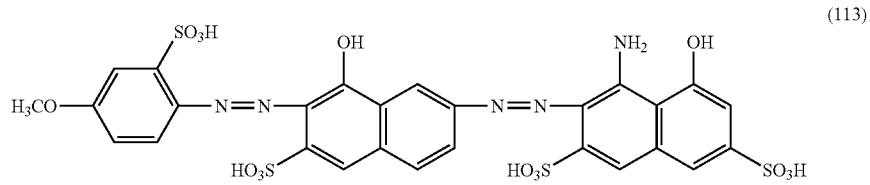
(113)

Next, into 400 parts of water, 26.3 parts of a compound of Formula (114) as shown below was dissolved while adjusting pH at 5.5 to 8.0 with sodium hydroxide, and thereafter, diazotized by adding 20.1 parts of a 35% hydrochloric acid solution and, at 15 to 20° C., 16.2 parts of 40% aqueous solution of sodium nitrite thereto.

(114)

The diazo suspension obtained was added dropwise at 15 to 30° C. into a reaction solution containing the compound of Formula (113) obtained as described above. During the dropwise addition, pH value of the solution was retained at 8.5 to 9.5 with sodium carbonate. After the end of the dropwise addition, said aqueous solution at pH of 8.5 to 9.5 was further stirred at 15 to 30° C. for 3 hours, to complete a coupling reaction and to obtain a reaction solution containing a compound of Formula (115) as shown below. After pH value was lowered to 2.0 to 5.0 with a 35% hydrochloric acid solution, an insoluble portion was removed by filtration, and salting out was conducted by the addition of sodium chloride, followed by filtration. The total amount of a cake obtained was dissolved in 500 parts of water, and then 500 parts of methanol was added thereto to precipitate crystals and desalt by filtration. Then, 25.4 parts of an azo compound of Formula (115) as shown below (a compound of No. 2-1 in Table 3) were obtained by drying. The maximum absorption wavelength in water ($\lambda$max) of this compound was 647 nm, and solubility in water was about 100 g/l.

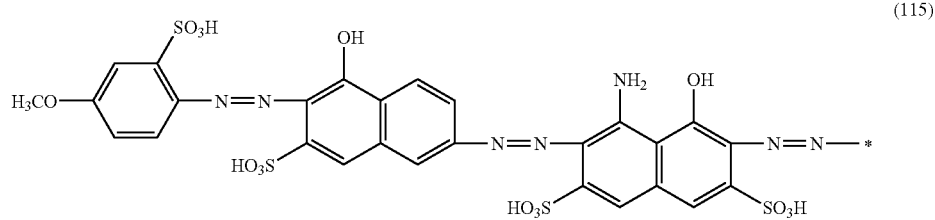

(115)

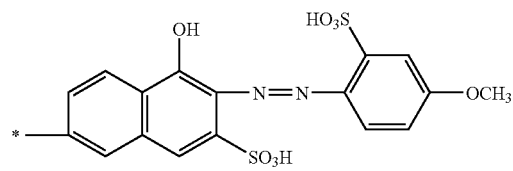

In this connection, a compound of Formula (114) used as described above was produced by a similar method to that for a compound of Formula (112) except that 6-amino-1-hydroxynaphthalene-3-sulfonic acid was used instead of the above-described 7-amino-1-hydroxynaphthalene-3-sulfonic acid.

Example 1-2

The same method as in Example 1-1 was conducted except that 42.0 parts of 7-amino-1-hydroxynaphthalene-3,6-disulfonic acid was used instead of 24.7 parts of 7-amino-1-hydroxynaphthalene-3-sulfonic acid of Example 1-1, to obtain 20.2 parts of an azo compound of Formula (121) as shown below (a compound of No. 2-2 in Table 3). The maximum absorption wavelength in water of this compound was 657 nm, and solubility in water was 100 g/l or more.

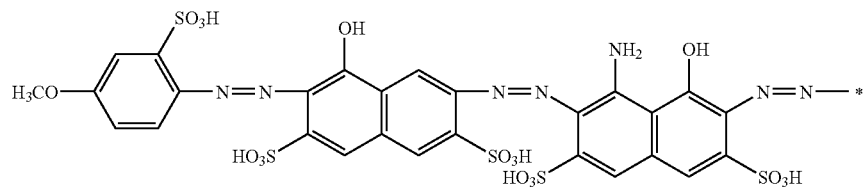

(121)

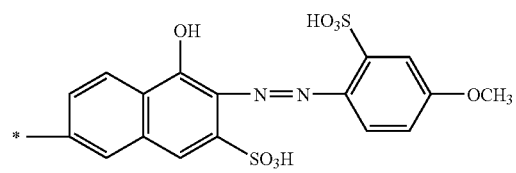

Example 1-3

The same method as in Example 1-1 was conducted except that 17.86 parts of 1-amino-2-benzenesulfonic acid was used instead of 20.42 parts of the compound of Formula (111) of Example 1-1, to obtain 18.2 parts of an azo compound of Formula (131) as shown below (a compound of No. 2-3 in Table 3). The maximum absorption wavelength in water of this compound was 650 nm, and solubility in water was 100 g/l or more.

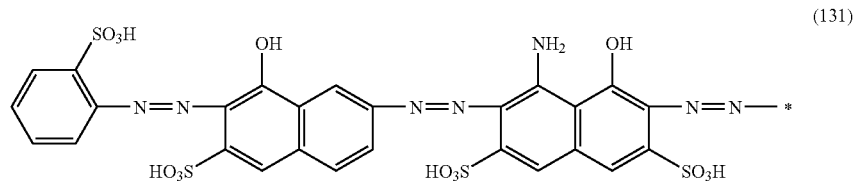

(131)

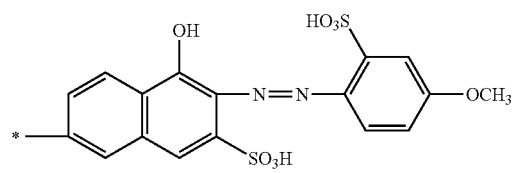

Example 1-4

The same method as in Example 1-1 was conducted except that 42.0 parts of 6-amino-1-hydroxynaphthalene-3,5-disulfonic acid instead of 24.7 parts of 7-amino-1-hydroxynaphthalene-3-sulfonic acid of Example 1-1, and 30.9 parts of a compound of Formula (141) as shown below instead of 26.3 parts of a compound of Formula (114) were used, to obtain 20.2 parts of an azo compound of Formula (142) as shown below (a compound of No. 2-4 in Table 3) were used. The maximum absorption wavelength in water of this compound was 559 nm, and solubility in water was 100 g/l or more.

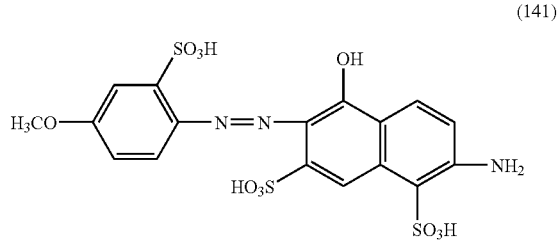

(141)

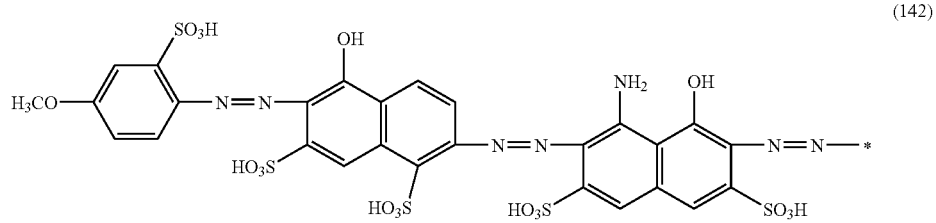

(142)

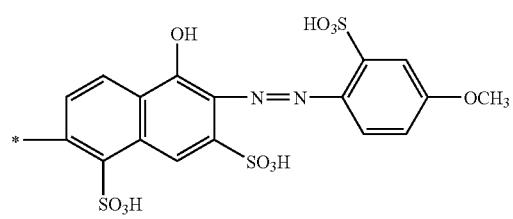

Example 1-5

The same method as in Example 1-1 was conducted except that 21.92 parts of 1-amino-4-nitro-2-benzenesulfonic acid was used instead of 20.42 parts of a compound of Formula (111) of Example 1-1, to obtain 19.2 parts of an azo compound of Formula (151) as shown below (a compound of No. 2-5 in Table 3). The maximum absorption wavelength in water of this compound was 652 nm, and solubility in water was 100 g/l or more.

Example 1-7

The same method as in Example 1-1 was conducted except that 17.86 parts of 1-amino-2-benzenesulfonic acid instead of 20.42 parts of the compound of Formula (111) of Example 1-1, and 24.8 parts of a compound of Formula (171) instead of 26.3 parts of a compound of Formula (114) were used, to obtain 18.2 parts of an azo compound of Formula (172) as shown below (a compound of No. 2-11 in Table 4). The maximum absorption wavelength in water of this compound was 660 nm, and solubility in water was 100 g/l or more.

(151)

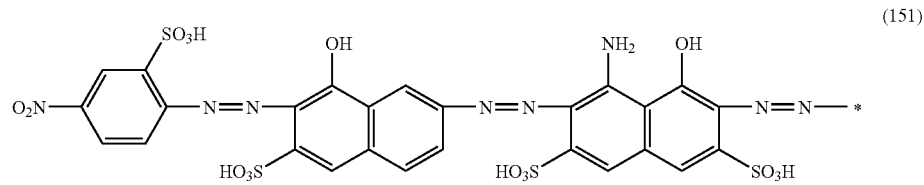

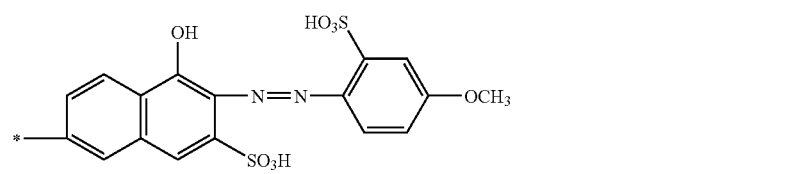

(171)

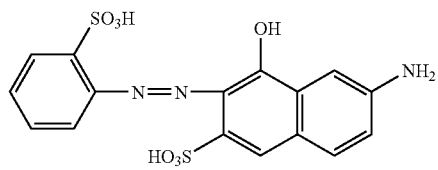

Example 1-6

The same method as in Example 1-1 was conducted except that 25.44 parts of 1-amino-2,5-benzenedisulfonic acid was used instead of 20.42 parts of a compound of Formula (111) of Example 1-1, to obtain 19.5 parts of an azo compound of Formula (161) as shown below (a compound of No. 2-29 in Table 6). The maximum absorption wavelength in water of this compound was 646 nm, and solubility in water was 100 g/l or more.

(161)

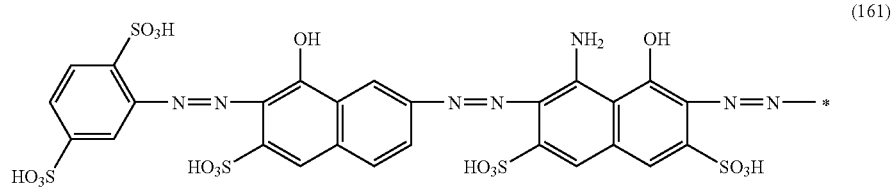

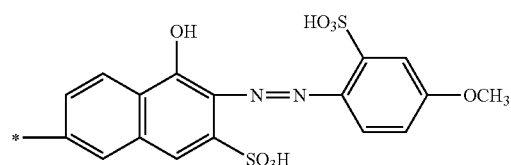

(172)

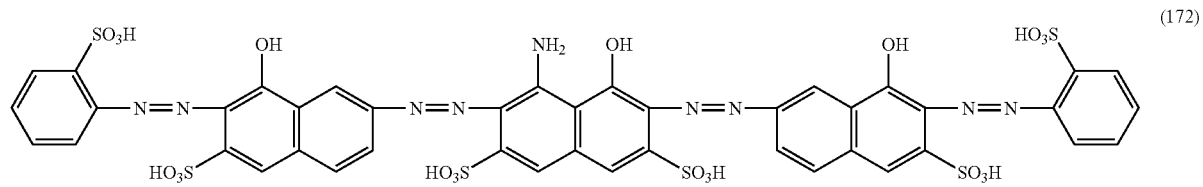

Example 1-15

The First Step:

Into 200 parts of water, 37.8 parts of a compound of Formula (1151) as shown below was dissolved while adjusting pH at 5.5 to 8.0 with sodium hydroxide, and then diazotized by adding 29.2 parts of a 35% hydrochloric acid solution and 14.1 parts of a 40% aqueous solution of sodium nitrite thereto at not higher than 5° C.

(1151)

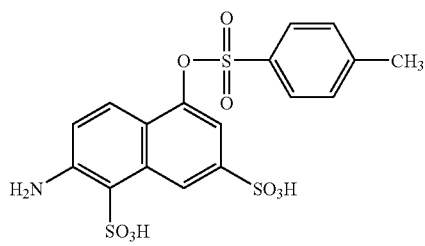

Next, to the diazo suspension obtained, 25.5 parts of 8-amino-1-hydroxynaphthalene-3,6-disulfonic acid (an H acid) was added. After the addition, the solution obtained was stirred at 10 to 15° C. for 6 hours while retaining pH at 2.0 to 3.0 with sodium carbonate, to obtain a reaction solution containing a compound of Formula (1152) as shown below.

(1152)

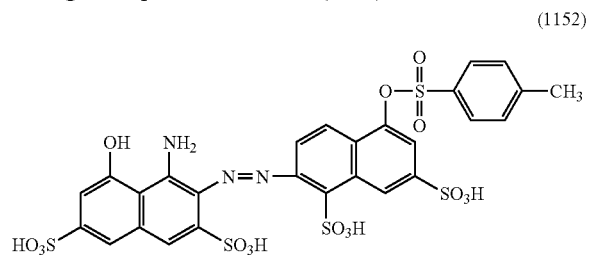

The Second Step:

The same method as in Example 1-1 was conducted except that 17.8 parts of 2-aminobenzenesulfonic acid was used instead of 20.42 parts of the compound of Formula (111) of Example 1-1, to obtain 36.2 parts of a monoazo compound of Formula (1153) as shown below. Next, 33.8 parts of a compound of Formula (1153) was dissolved into 500 parts of water while adjusting pH at 7.0 to 8.0 with sodium hydroxide, and thereafter, diazotized by adding 33.3 parts of 35% hydrochloric acid solution and then, at 15 to 20° C., 15.2 parts of a 40% aqueous solution of sodium nitrite thereto.

(1153)

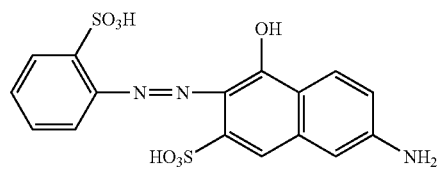

Next, this diazo suspension was added dropwise into the reaction solution containing the compound of Formula (1152) obtained as described above at 15 to 25° C. During the dropwise addition, pH value of the solution was retained at 8.0 to 9.5 with sodium carbonate. After the dropwise addition, further the reaction solution was stirred for 3 hours at 15 to 25° C. and at pH of 8.0 to 9.0, to complete a coupling reaction and to obtain a reaction solution containing a compound of Formula (1154). Then, salting out was conducted by the addition of sodium chloride, and it was filtrated to obtain 300 parts of a wet cake of Formula (1154).

(1154)

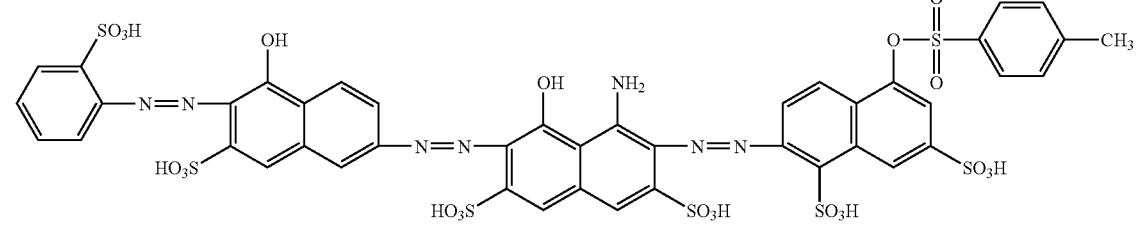

After the total amount of the wet cake obtained was dissolved in 800 parts of water, a reaction was conducted for 2 hours at 70 to 75° C. and at pH of 10.5 to 11.0, to obtain a reaction solution containing a compound of Formula (1155).

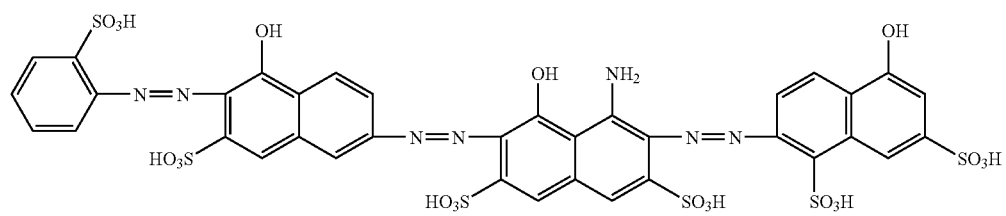

(1155)

The Third Step:

Into 200 parts of water, 16.3 parts of the compound of Formula (111) was dispersed, and after adding 16.7 parts of a 35% hydrochloric acid solution, it was cooled to 5 to 10° C. At the same temperature, a diazo reaction was conducted by the addition of 14.5 parts of a 40% aqueous solution of sodium nitrite thereto.

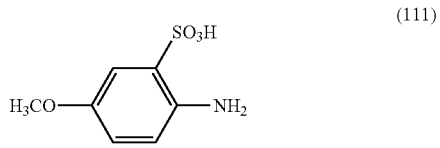

(111)

Next, thus obtained diazo suspension was added at 15 to 20° C. into a reaction solution containing the compound of Formula (1155) obtained in the second step, and thereafter pH value was gradually made to 7.5 to 9.0 with sodium carbonate for neutralization. After the neutralization, said reaction solution was further stirred for 3 hours at 15 to 25° C. and pH of 8.0 to 9.0, to complete a coupling reaction and to obtain a reaction solution containing a compound of Formula (1156). Thereafter, salting out thereof was conducted by the addition of sodium chloride, followed by filtration and drying to obtain 62.5 parts of a tetrakisazo compound of Formula (1156).

A Desalting Step:

After the compound of Formula (1156) obtained in the third step was dissolved in 500 parts of water, and then added 700 parts of methanol thereto for desalting by crystallization and filtration, and then, by drying, 56.2 parts of a sodium salt of an azo compound of Formula (1156) as shown below (a compound of No. 2-28 in Table 6) were obtained. The maximum absorption wavelength in water ($\lambda$max) of this colorant was 645 nm, and solubility in water was about 100 g/l.

Examples 1-8 to 1-14, and 1-16

(A) Preparation of an ink

A composition for an ink was prepared by mixing the following components, and, by filtration with a 0.45 μm membrane filter, a water-based ink composition for an ink-jet was obtained.

TABLE 6

| | |
|---|---|
| Each compound obtained in the above Examples (one after desalting was used.) | 5.0 parts |
| Glycerin | 5.0 parts |
| Urea | 5.0 parts |
| N-methyl-2-pyrrolydone | 4.0 parts |
| Isopropyl alcohol | 3.0 parts |
| Butyl carbitol | 2.0 parts |
| Surfactant (Surfinol 105 manufactured by Nissin Chemical Co., Ltd.) | 0.1 part |
| Water + aqueous ammonium | 75.9 parts |
| Total | 100.0 parts |

In Table 6, "Each compound obtained in the above Examples" means respectively the compound of Formula (115) obtained in Example 1-1 for Example 1-8, the compound of Formula (121) obtained in Example 1-2 for Example 1-9, the compound of Formula (131) obtained in Example 1-3 for Example 1-10, the compound of Formula (142) obtained in Example 1-4 for Example 1-11, the compound of Formula (151) obtained in Example 1-5 for Example 1-12, the compound of Formula (161) obtained in Example 1-6 for Example 1-13, the compound of Formula (172) obtained in Example 1-7 for Example 1-14, and the compound of Formula (1155) obtained in Example 1-15 for Example 1-16. On preparing an ink, pH was adjusted to 8 to 10 with an aqueous ammonium. The water-based ink composition obtained did not cause precipitate separation during storage thereof, and did not generate changes in physical property even after storage for a long period of time.

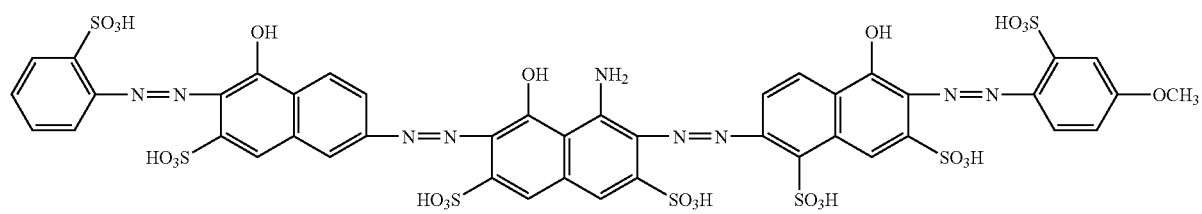

(1156)

(B) Ink-Jet Printing

Using each ink composition obtained above, by an ink-jet printer (Trade name BJ-S630 from Canon Inc.), ink-jet recording was conducted on three types of papers of a Plain Paper (Canon TLB5A4), Professional Glossy Paper A (Professional Photopaper PR-101 from Canon Inc.), and Professional Glossy Paper B (a paper for PM photograph (glossy), KA420PSK of Epson Co., Ltd.).

On printing, an image pattern was made so as to obtain gradations of several stages in reflection density, and a black colored print of half tone was obtained. As a gray scale mode is used on printing, at this pale colored part, each recording solution of yellow, cyan, and magenta is not used besides a black colored recording solution. Among testing methods described below, in evaluation of hue density which is an item to be evaluated using a calorimeter, on measuring reflection density, D value, of a print, the highest portion of this D value was used. Further, on measuring in a test of light fastness and a test of ozone gas fastness which are similarly items to be evaluated using a calorimeter, measurement was conducted using a portion of gradations wherein reflection density, D value, of a print before testing is closest to 1.0. Evaluations of hue, moisture fastness and color rendering properties were conducted by visual observation on a print as a whole.

(C) Evaluation of a Recorded Image

Concerning a recorded image according to a water-based ink composition of the present invention, evaluation was conducted on 6 items, that is, hue, hue density, change in hue after light fastness testing, change in hue after ozone gas fastness testing, bleeding degree during moisture fastness testing, and color rendering properties. In this connection, the ozone gas fastness test and the moisture fastness test were conducted using only Professional Glossy Papers A and B. The results are shown in Table 7. The testing methods are shown below.

(1) Evaluations of Hue and Hue Density

Hue of a recorded image was measured using Gretag Macbeth SpectroEye (from GRETAG Co., Ltd.), and hue density, D value, was calculated. Hue was evaluated by visual observation. Judgment of hue density was conducted on D value. Judgment criteria are shown below.

Evaluation of Hue:
○: a favorable black color with little toning
Δ: a black color with a slight hue deviation
x: no black color Evaluation of Hue Density:
○: a Plain Paper: 1.2≦D, a Glossy Paper: 2.0≦D
Δ: a Plain Paper: 1.0≦D<1.2, a Glossy Paper: 1.9≦D<2.0
x: a Plain Paper: D<1.0, a Glossy Paper: D<1.9

(2) Light Fastness Test

Using a xenon weatherometer (Ci4000 from ATLAS Co., Ltd.), a print sample was irradiated for 50 hours at illuminance of 0.36 W/m². After the test, colorimetry was conducted as described above, and color difference (ΔE) before and after the test and residual ratio of hue density were determined. Judgment criteria are shown below.

Evaluation of Hue:
○: ΔE is lower than 10, and residual ratio is 80% or more
Δ: either one of ΔE or residual ratio does not satisfy the above conditions for ○
x: ΔE is not lower than 10, and residual ratio is lower than 80%

(3) Ozone Gas Fastness Test

Using an ozone weatherometer (from Suga Ttesting Machine Co., Ltd.), a print sample was left for one hour under ozone concentration of 12 ppm, humidity of 60% RH and temperature of 24° C. After the test, colorimetry was conducted as described above, and color difference (ΔE) before and after the test and residual ratio of hue density were measured. Judgment criteria are shown below.
○: ΔE is lower than 15, and residual ratio is 80% or more
Δ: either one of ΔE or residual ratio does not satisfy the above conditions for ○
x: ΔE is not lower than 15, and residual ratio is lower than 80%

(4) Moisture Fastness Test

A print sample was left for 7 days at 50° C. and 90% RH, using a thermo-hygrostat (from Ouyogiken-Sangyo Co., Ltd.). Bleeding of a dye before and after the test was judged by visual observation:
○: little bleeding of a dye observed
Δ: a slight bleeding of a dye observed
x: large bleeding of a dye observed (5) Color Rendering Properties Test Based on hue under a standard light source, degree of change in color seen under a tungsten light was judged by visual observation:
○: small change in hue
Δ: relatively large change in hue
x: large change in hue Comparative Example 1-1

Using, for comparison, C. I. FoodBlack 2 (Formula (CP111) as shown below), an azo colorant which is used as a black colorant for a water-soluble ink-jet, an ink composition having the same ink composition as in Example 1-8 was prepared. The evaluation results of hue, hue density, light fastness, ozone gas fastness, moisture fastness, and color rendering properties of a recorded image obtained are shown in Table 7.

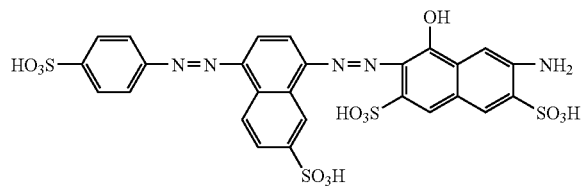

(CP111)

Comparative Example 1-2

Similarly, using, for comparison, a colorant as shown in Example 2 in the publication of WO 00/43451 (Formula (CP121) as shown below), as a colorant for a water-soluble ink-jet, an ink composition having the same composition as in Example 1-8 was prepared. The evaluation results of hue, hue density, light fastness, ozone gas fastness, moisture fastness, and color rendering properties of a recorded image obtained are shown in Table 7.

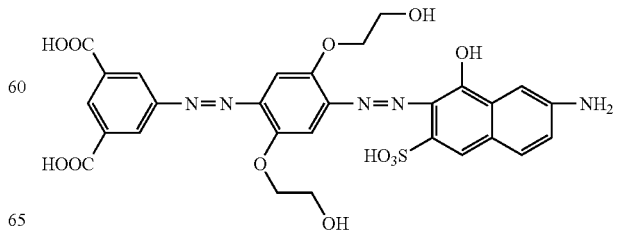

(CP121)

Comparative Example 1-3

Similarly, using, for comparison, a colorant as shown in Example 3 in the publication of WO 00/43453 (Formula (CP131) as shown below), as a colorant for a water-soluble ink-jet, an ink composition having the same composition as in Example 1-8 was prepared. The evaluation results of hue, hue density, light fastness, ozone gas fastness, moisture fastness, and color rendering properties of a recorded image obtained are shown in Table 7.

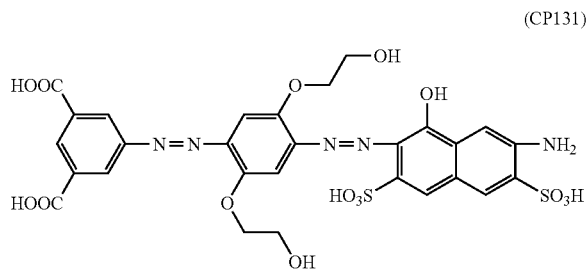

(CP131)

TABLE 7

| | Hue | Hue density | Light fastness | Ozone gas fastness | Moisture fastness | Color rendering properties |
|---|---|---|---|---|---|---|
| Example 1-8 (Formula (115)) | | | | | | |
| Plain Paper | ○ | ○ | ○ | — | — | ○ |
| Professional Glossy Paper A | ○ | ○ | ○ | ○ | ○ | ○ |
| Professional Glossy Paper B | ○ | ○ | ○ | ○ | ○ | ○ |
| Example 1-9 (Formula (121)) | | | | | | |
| Plain Paper | ○ | ○ | ○ | — | — | ○ |
| Professional Glossy Paper A | ○ | ○ | ○ | ○ | ○ | ○ |
| Professional Glossy paper B | ○ | ○ | ○ | ○ | ○ | ○ |
| Example 1-10 (Formula (131)) | | | | | | |
| Plain Paper | ○ | ○ | ○ | — | — | ○ |
| Professional Glossy Paper A | ○ | ○ | ○ | ○ | ○ | ○ |
| Professional Glossy Paper B | ○ | ○ | ○ | ○ | ○ | ○ |
| Example 1-11 (Formula (142)) | | | | | | |
| Plain Paper | ○ | ○ | ○ | — | — | ○ |
| Professional Glossy Paper A | ○ | ○ | ○ | ○ | ○ | ○ |
| Professional Glossy Paper B | ○ | ○ | ○ | ○ | ○ | ○ |
| Example 1-12 (Formula (151)) | | | | | | |
| Plain Paper | ○ | ○ | ○ | — | — | ○ |
| Professional Glossy Paper A | ○ | ○ | ○ | ○ | ○ | ○ |
| Professional Glossy Paper B | ○ | ○ | ○ | ○ | ○ | ○ |
| Example 1-13 (Formula (161)) | | | | | | |
| Plain Paper | ○ | ○ | ○ | — | — | ○ |
| Professional Glossy Paper A | ○ | ○ | ○ | ○ | ○ | ○ |
| Professional Glossy Paper B | ○ | ○ | ○ | ○ | ○ | ○ |
| Example 1-14 (Formula (172)) | | | | | | |
| Plain Paper | ○ | ○ | ○ | — | — | ○ |
| Professional Glossy Paper A | ○ | ○ | ○ | ○ | ○ | ○ |
| Professional Glossy Paper B | ○ | ○ | ○ | ○ | ○ | ○ |
| Example 1-16 (Formula (1156)) | | | | | | |
| Plain Paper | ○ | ○ | ○ | — | — | ○ |
| Professional Glossy Paper A | ○ | ○ | ○ | ○ | ○ | ○ |
| Professional Glossy Paper B | ○ | ○ | ○ | ○ | ○ | ○ |
| Comp. Ex. 1-1 (Formula (CP111)) | | | | | | |
| Plain Paper | ○ | ○ | ○ | — | — | x |
| Professional Glossy Paper A | ○ | Δ | ○ | x | x | x |
| Professional Glossy Paper B | ○ | Δ | ○ | x | x | x |
| Comp. Ex. 1-2 (Formula (CP121)) | | | | | | |
| Plain Paper | Δ | ○ | ○ | — | — | x |
| Professional Glossy Paper A | Δ | ○ | Δ | x | Δ | x |
| Professional Glossy Paper B | Δ | ○ | ○ | Δ | ○ | x |
| Comp. Ex. 1-3 (Formula (CP131)) | | | | | | |
| Plain Paper | ○ | ○ | ○ | — | — | x |
| Professional Glossy Paper A | ○ | ○ | ○ | x | ○ | x |
| Professional Glossy Paper B | ○ | ○ | ○ | Δ | ○ | x |

From Table 7, it is understood that an ink composition containing an azo compound according to the present invention has excellent hue, ozone gas fastness, light fastness, moisture fastness, and color rendering properties as compared with a conventional black colored compound (Comparative Examples).

Example 1-17

The First Step:

Into 200 parts of water, 20.42 parts of a compound of Formula (111) as shown below was dissolved while adjusting pH at 5.5 to 8.0 with sodium hydroxide, and then diazotized by adding 31.3 parts of a 35% hydrochloric acid solution and 18.1 parts of a 40% aqueous solution of sodium nitrite thereto after a solution temperature was set to 5 to 10° C.

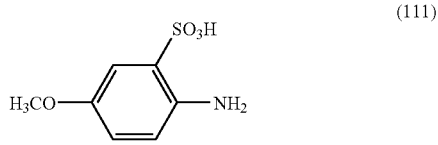
(111)

The diazo suspension obtained was added dropwise into an aqueous alkaline solution containing 23.9 parts of 7-amino-1-hydroxynaphthalene-3-sulfonic acid at 15 to 30° C. During the dropwise addition, pH value of the solution was retained at 8.5 to 9.5 with sodium carbonate. After the end of the dropwise addition, further stirring was conducted for 3 hours under pH of 8.5 to 9.5 and temperature of 15 to 30° C., to complete a coupling reaction. Thereafter, it was salted out by the addition of sodium chloride, and filtrated. A wet cake obtained was dried to obtain 36.3 parts of a monoazo compound of Formula (112).

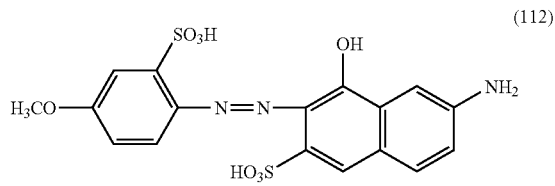
(112)

The Second Step:
Into 500 parts of water, 36.3 parts of a compound of Formula (112) was added and dissolved while adjusting pH at 5.5 to 8.0 with sodium hydroxide, and thereafter diazotized by adding 33.4 parts of a 35% hydrochloric acid solution and then at temperature of 15 to 20° C., 16.5 parts of a 40% aqueous solution of sodium nitrite thereto. To the diazo suspension obtained, 25.5 parts of 8-amino-1-hydroxynaphthalene-3,6-disulfonic acid (an H acid) was added. After the addition, the solution was stirred overnight while retaining temperature at 15 to 30° C. and pH at 2.0 to 3.0 (adjusted with sodium carbonate) to obtain a reaction solution containing a compound of Formula (113).

The Third Step:
Into 450 parts of water, 35.3 parts of a compound of Formula (114) was dissolved while adjusting pH at 5.5 to 8.0 with sodium hydroxide, and thereafter, diazotized by consecutively adding 32.1 parts of a 35% hydrochloric acid solution and 16.2 parts of a 40% aqueous solution of sodium nitrite thereto.

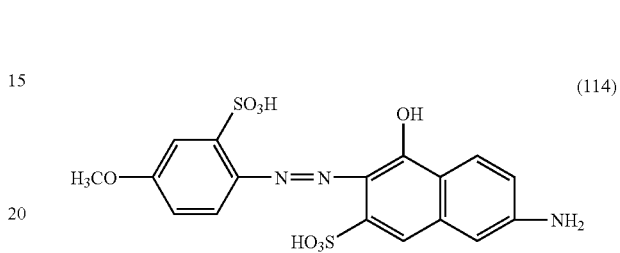
(114)

The diazo suspension obtained was added dropwise at 15 to 30° C. into an aqueous alkaline solution containing a compound of Formula (113) obtained in the second step (a reaction solution obtained in the second step and adjusted with base to pH 8.5 to 9.5). During the dropwise addition, pH value of the solution was retained at 8.5 to 9.5 with sodium carbonate. After the end of the dropwise addition, said solution was further stirred at 15 to 30° C. for 3 hours at pH of 8.5 to 9.5, to complete a coupling reaction and to obtain a reaction solution containing a compound of Formula (115). After pH value was set to 2.0 to 5.0 with a 35% hydrochloric acid solution, an insoluble matter was removed by filtration, and salting out was conducted by the addition of sodium chloride, followed by filtration. The total amount of a cake obtained was dissolved in 500 parts of water, and added 500 parts of methanol thereto to precipitate crystals, and then separated the crystals desalted by filtration. The crystal obtained was dried to obtain 77.8 parts of an azo compound of Formula (115) as shown below (a compound of No. 2-1 in Table 3). The maximum absorption wavelength in water (λmax) of this compound was 647 nm, and solubility in water was about 100 g/l.

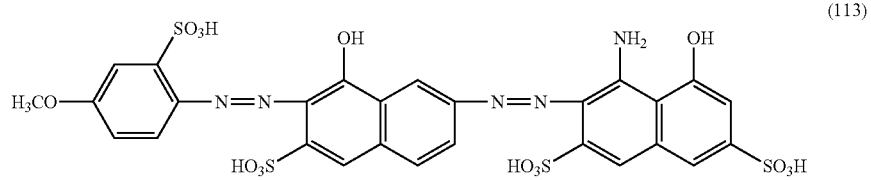
(113)

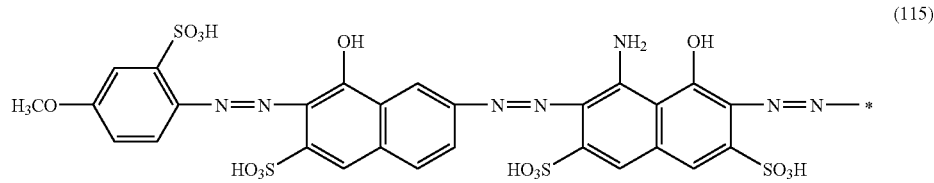

(115)

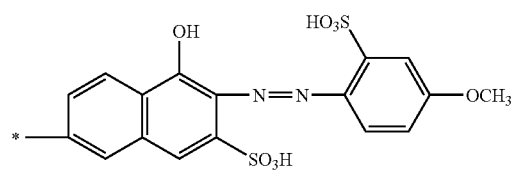

In this connection, a compound of Formula (114) used above was synthesized by a similar method to that for a compound of Formula (112) except that 6-amino-1-hydroxynaphthalene-3-sulfonic acid was used instead of the above-described 7-amino-1-hydroxynaphthalene-3-sulfonic acid.

Example 1-18

By the same method as in Example 1-17 except that 31.9 parts of 7-amino-1-hydroxynaphthalene-3,6-disulfonic acid was used instead of 23.9 parts of 7-amino-1-hydroxynaphthalene-3-sulfonic acid in the first step of Example 1-17, 65.0 parts of an azo compound of Formula (121) as shown below (a compound of No. 2-2 in Table 3) was obtained. The maximum absorption wavelength in water of this compound was 657 nm, and solubility in water was 100 g/l or more.

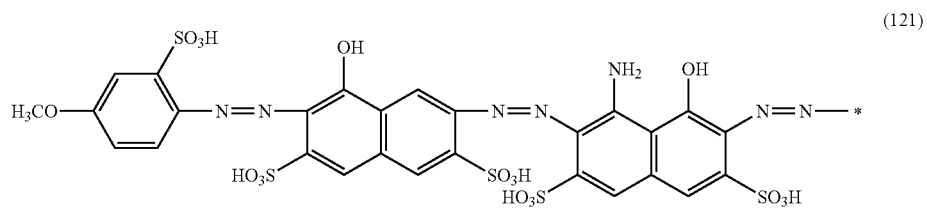

(121)

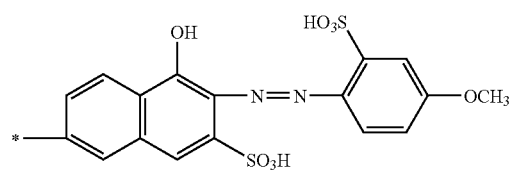

Example 1-19

By the same method as in Example 1-17 except that 17.8 parts of 2-aminobenzenesulfonic acid was used instead of 20.3 parts of a compound of Formula (111) of Example 1-17, 62.4 parts of an azo compound of Formula (131) as shown below (a compound of No. 2-3 in Table 3) was obtained. The maximum absorption wavelength in water of this compound was 650 nm, and solubility in water was 100 g/l or more.

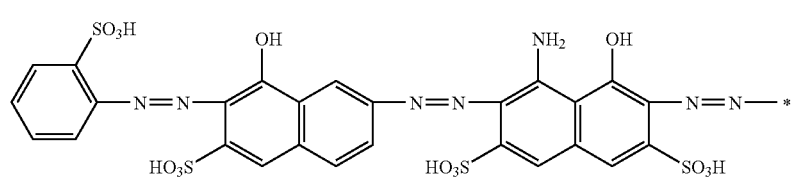

(131)

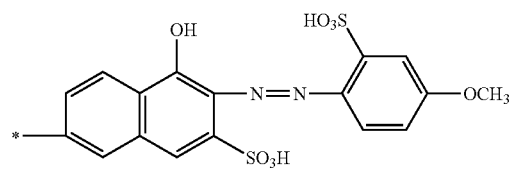

Example 1-20

By the same method as in Example 1-17 except that 31.9 parts of 6-amino-1-hydroxynaphthalene-3,5-disulfonic acid was used instead of 23.9 parts of 7-amino-1-hydroxynaphthalene-3-sulfonic acid in the first step of Example 1-17, 49.0 parts of a monoazo compound of Formula (141) was obtained.

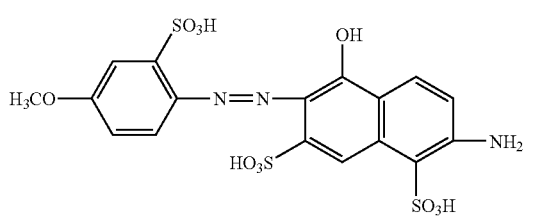

(141)

Then, the compound of Formula (141) was diazotized in the same method as in the second step of Example 1-17, and then after pH of the diazo suspension obtained was adjusted at 2.5, 13.9 parts of 8-amino-1-hydroxynaphthalene-3,6-disulfonic acid (an H acid) was added thereto at 10 to 15° C., and subsequently it was reacted for 8 hours at pH 3.0 to 3.5 and 10 to 20° C. At the same temperature, said reaction solution was gradually neutralized by the addition of sodium carbonate, and further a coupling reaction was conducted at pH of 8.0 to 9.0 to obtain a reaction solution containing a tetrakisazo compound of Formula (142). Salting out was conducted by the addition of sodium chloride to said reaction solution, and the crystal obtained was filtrated and dried to obtain 25.8 parts of an azo compound of Formula (142) as shown below (a compound of No. 2-4 in Table 3). The maximum absorption wavelength in water of this compound was 559 nm, and solubility in water was 100 g/l or more.

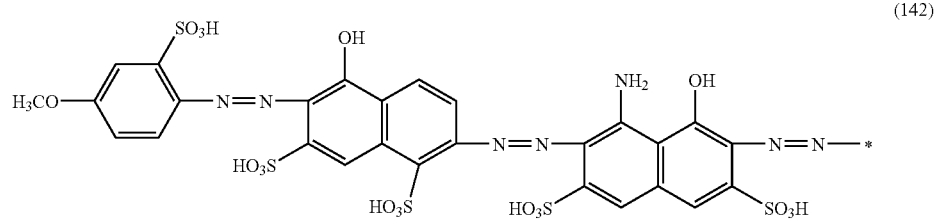

(142)

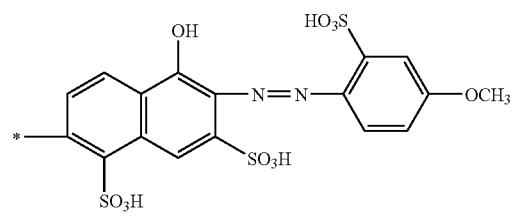

Example 1-21

By the same method as in Example 1-17 except that 21.8 parts of 2-amino-5-nitrobenzenesulfonic acid was used instead of 20.42 parts of the compound of Formula (111) in the first step of Example 1-17, 56.7 parts of an azo compound of Formula (151) as shown below (a compound of No. 2-5 in Table 3) was obtained. The maximum absorption wavelength in water of this compound was 652 nm, and solubility in water was 100 g/l or more.

Example 1-23

By the same method as in Example 1-17 except that 17.86 parts of 2-aminobenzenesulfonic acid instead of 20.42 parts of the compound of Formula (111) of Example 1-17 and 24.8 parts of a compound of Formula (1231) as shown below instead of 35.3 parts of the compound of Formula (114) were used, 18.2 parts of an azo compound of Formula (1232) as shown below (a compound of No. 2-11 in Table 4) was obtained. The maximum absorption wavelength in water of this compound was 660 nm, and solubility in water was 100 g/l or more.

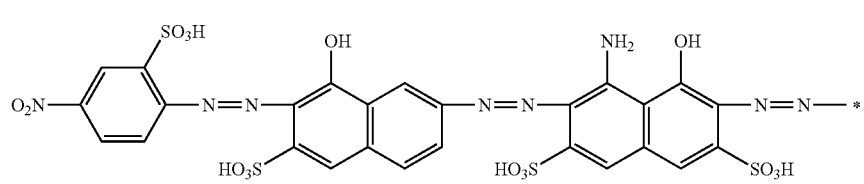
(151)

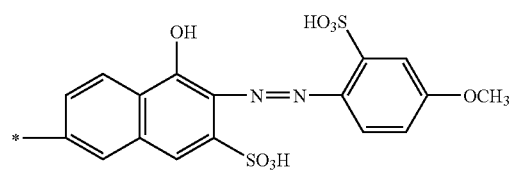

Example 1-22

By the same method as in Example 1-17 except that 25.3 parts of 2-amino-1,4-benzenedisulfonic acid was used instead of 20.42 parts of the compound of Formula (111) in the first step of Example 1-17, 52.0 parts of an azo compound of Formula (161) as shown below (a compound of No. 2-29 in Table 6) was obtained. The maximum absorption wavelength in water of this compound was 646 nm, and solubility in water was 100 g/l or more.

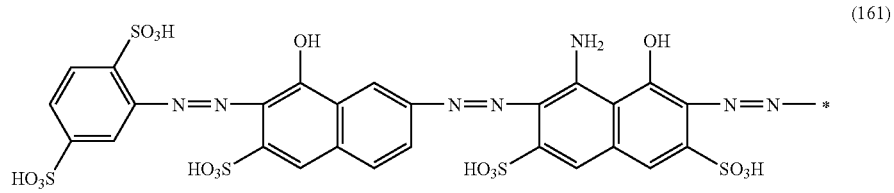
(161)

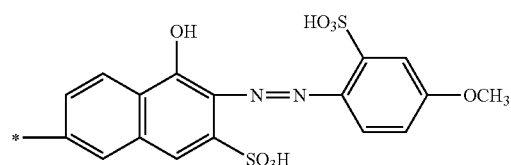

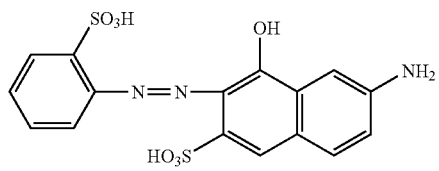
(1231)

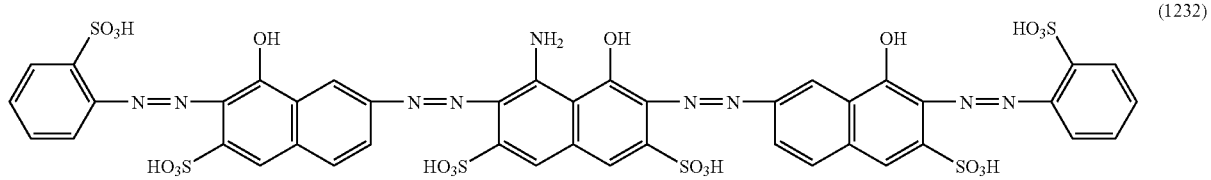
(1232)

Example 2-1

(1) Into 300 parts of water, 28.4 parts of a compound of Formula (211) as shown below was dissolved while adjusting pH at 6.0 to 8.0 with sodium carbonate, and after adding 18.7 parts of a 35% hydrochloric acid solution thereto, temperature was set to 0 to 5° C., and 10.7 parts of a 40% aqueous solution of sodium nitrite were added thereto to diazotize.

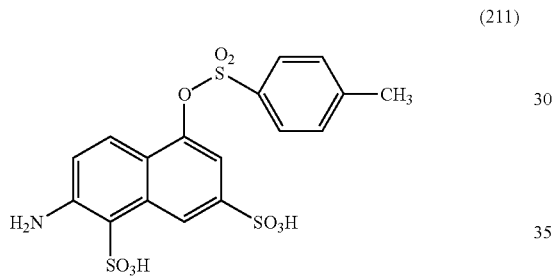
(211)

To this diazo suspension, a solution suspended with 18.1 parts of 6-phenylamino-1-hydroxynaphthalene-3-sulfonic acid in 200 parts of water was added, and thereafter it was stirred at 10 to 20° C. for 12 hours while retaining pH value of the solution at 2.0 to 2.7 with sodium carbonate. After the stirring, pH of the solution was raised to 7.0 to 8.5 with sodium carbonate for dissolution to obtain an aqueous solution containing a monoazo compound of Formula (212) as shown below.

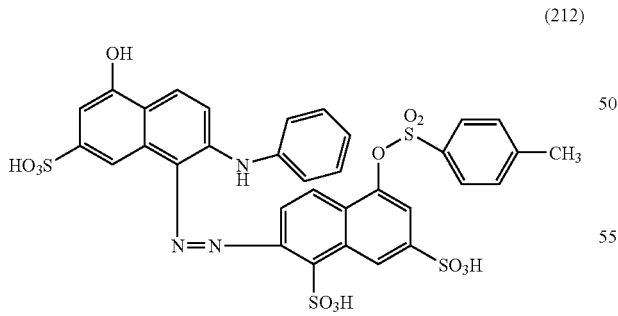
(212)

(2) Into 50 parts of water, 10.4 parts of 2-aminobenzene sulfonic acid was dissolved while adjusting pH at 3.5 to 5.5 with sodium hydroxide, and diazotized by adding 17.0 parts of a 35% hydrochloric acid solution and 10.5 parts of a 40% aqueous solution of sodium nitrite thereto at 0 to 10° C. Thereafter, into 70 parts of water, 14.3 parts of 6-amino-1-hydroxynaphthalene-3-sulfonic acid was dissolved while adjusting pH at 6.5 to 7.5 with sodium hydroxide, and by the addition of 6.2 parts of an acetic anhydride thereto at 25 to 35° C., acetylation was conducted. In this reaction solution, the above diazo suspension was added dropwise at 5 to 15° C. while retaining pH of the solution at 6.5 to 7.5 with sodium carbonate. After the end of dropwise addition, said solution was stirred for 2 hours at 15 to 30° C. at pH of 7.0 to 8.0, to complete a coupling reaction and to obtain a reaction solution containing a compound of Formula (213) as shown below.

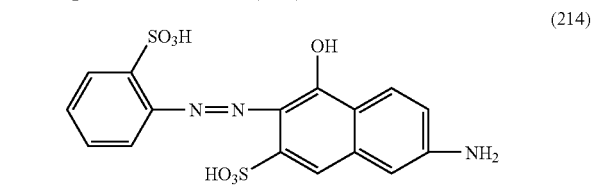
(213)

The reaction solution containing the compound of Formula (213) obtained as described above was heated to 90° C. After the heating, it was added with sodium hydroxide so as to make concentration of 2% by weight, and 90 to 95° C. was retained for about one hour. After it was cooled to room temperature, pH was set to 3.5 to 5.0 with a 35% hydrochloric acid solution, salting out was conducted by the addition of sodium chloride, and it was filtrated and dried to obtain 23.0 parts of a compound of Formula (214) as shown below.

(214)

(3) Into 200 parts of water, 23.0 parts of a compound of Formula (214) obtained in the above-described reaction was dissolved while adjusting pH at 6.0 to 7.5 with sodium hydroxide, and by the addition of 19.9 parts of a 35% hydrochloric acid solution thereto at 15 to 25° C. and thereafter adding 9.9 parts of a 40% aqueous solution of sodium nitrite, diazotization was conducted. The diazo suspension obtained was added dropwise into an aqueous solution containing a compound of Formula (212) obtained in the above-described reaction (1), at 15 to 25° C. over 30 min while retaining pH value of said aqueous solution at 7.5 to 8.5 with sodium carbonate. After the end of dropwise addition, it was stirred for 3 hours at 15 to 25° C. and at pH of 8.0 to 9.0, to complete a coupling reaction and to obtain a reaction solution containing a compound of Formula (215) as shown below.

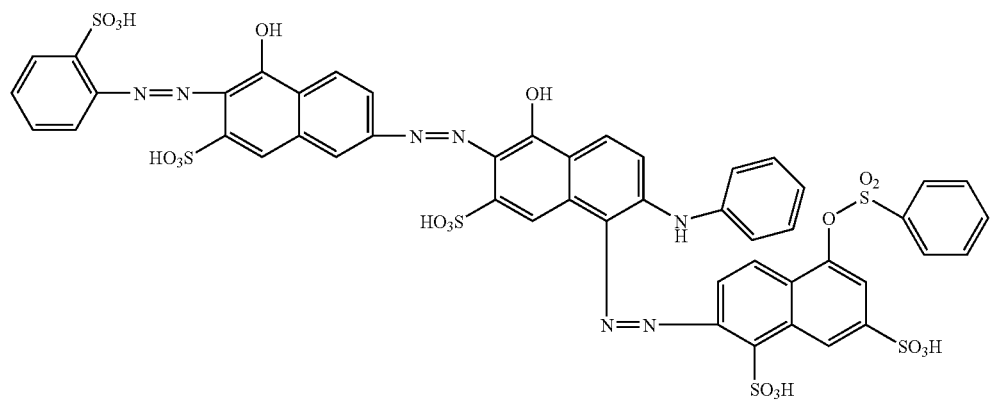

(215)

The above-described reaction solution was heated to 75° C., and reacted for one hour while retaining pH at 10.8 to 11.0 with sodium hydroxide. After the reaction, pH of said reaction solution was adjusted to 6.0 to 7.5 with a 35% hydrochloric acid solution, and salting out was conducted by the addition of sodium chloride, followed by filtration to obtain 46.5 parts of a compound of Formula (216) as shown below.

and thereafter it was transferred to an autoclave, into which 1.0 part of 50%-water-containing 5% palladium carbon was added. After hydrogen gas was charged thereto, a reaction was conducted at 55 to 65° C. for 2 hours to obtain a solution containing 56.8 parts of a compound of Formula (217) as shown below.

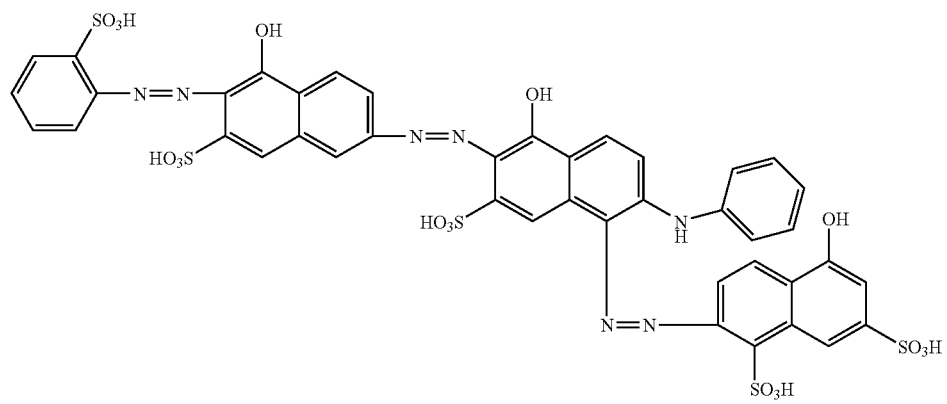

(216)

(4) To 100 parts of N,N'-dimethylformamide, 51.0 parts of 2-nitro-4-cresol, 50.0 parts of toluene, and 19.5 parts of potassium hydroxide were added, and a solution obtained was heated to 120 to 125° C., and stirred for one hour, then water generated as an azeotrope with toluene was distilled off. After temperature of the solution was raised to 130 to 135° C., 44.8 parts of propanesultone diluted with 50 parts of N,N'-dimethylformamide was added dropwise thereto over about 30 min. After reaction at the same temperature for one hour, it was cooled to room temperature, and after the addition of 150 parts of water, pH thereof was made to 7.5 to 8.5 with an aqueous solution of sodium hydroxide. This solution was concentrated with a rotary evaporator,

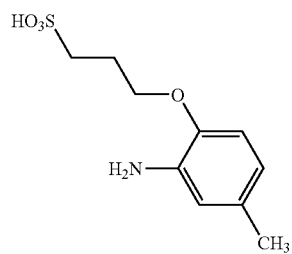

(217)

(5) Into 900 parts of water, 74.3 parts of a compound of Formula (218) was dissolved while adjusting pH at 1.0 to 3.0 with a hydrochloric acid, and thereafter, diazotized by adding 53.2 parts of a 35% hydrochloric acid solution and 27.0 parts of a 40% aqueous solution of sodium nitrite thereto at 5 to 10° C.

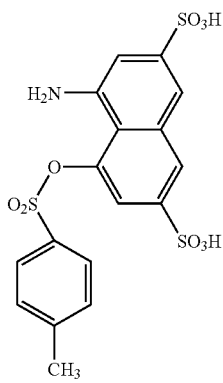

(218)

Then, to the diazo suspension of the compound of Formula (218) obtained, a solution containing 36.8 parts of the compound of Formula (217) obtained by the above-described reaction was slowly added dropwise at temperature of 0 to 10° C. After the end of the dropwise addition, pH thereof was set to 3.0 to 4.0 by the addition of an aqueous solution of sodium hydroxide. While maintaining the pH, the solution was stirred for one hour at 5 to 10° C. and for 2 hours at 15 to 25° C., and then pH was set to 7.0 to 8.0 by the addition of an aqueous solution of sodium hydroxide to complete a coupling reaction and to obtain a reaction solution containing a compound of Formula (219) as shown below.

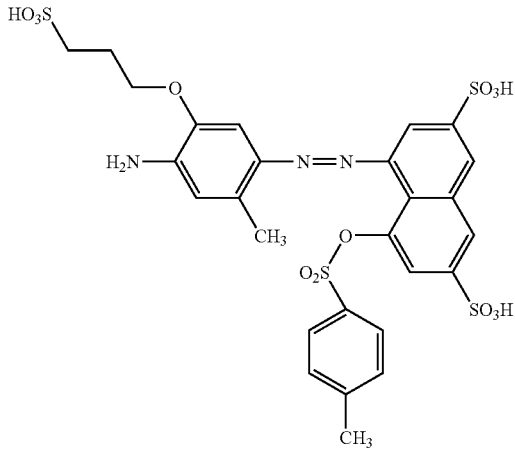

(219)

(6) Into a 1/6 portion of the reaction solution containing the compound of Formula (219) obtained, 16.5 parts of a 35% hydrochloric acid solution and then, 8.7 parts of a 40% aqueous solution of sodium nitrite were added to execute a diazo reaction. The diazo solution obtained was added dropwise into a solution obtained by dissolving 46.5 parts of a compound of Formula (216) into 1000 parts of water and adjusted pH value thereof to 8.5 to 9.5 with sodium carbonate, at 15 to 30° C. over 30 min while retaining said pH. After the end of dropwise addition, it was stirred for 3 hours while retaining said temperature and said pH, to complete a coupling reaction and to obtain a reaction solution containing a compound of Formula (2110) as shown below.

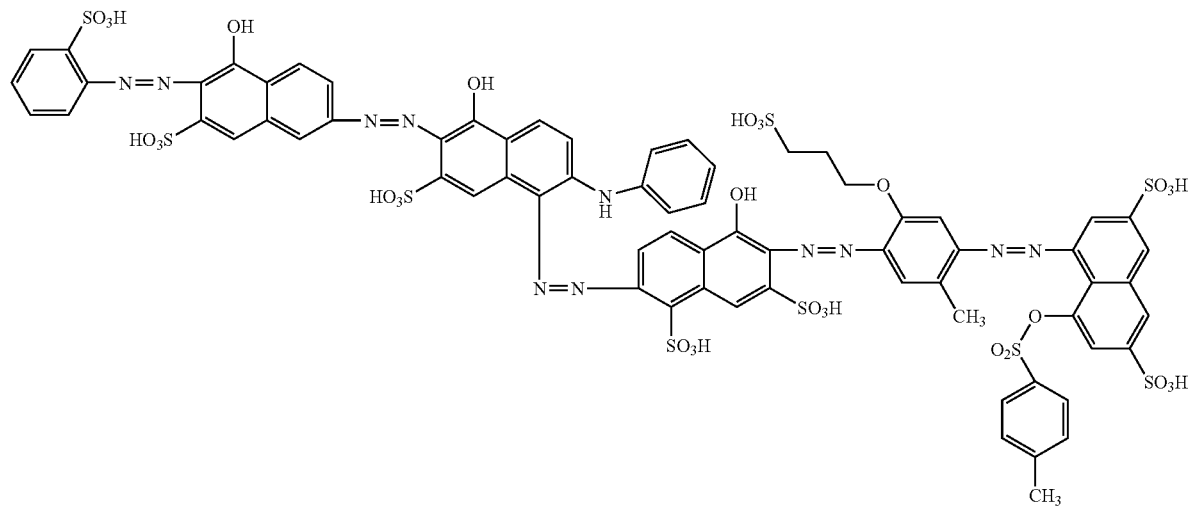

(2110)

(7) The above-described reaction solution was heated to 75° C., and reacted for one hour while retaining pH at 10.8 to 11.0 with sodium hydroxide. After the reaction, pH was adjusted to 6.0 to 7.5 with a 35% hydrochloric acid solution, and salting out was conducted by the addition of sodium chloride, and filtration was conducted. The total amount of a cake obtained was dissolved in 500 parts of water, and thereto added 500 parts of methanol to precipitate crystals, and then filtrated to separate the crystals and thereby, desalted. Then, the crystals were dried to obtain 55.1 parts of a compound of Formula (2111) as shown below (a compound of No. 3-14 in Table 9). The maximum absorption wavelength in water (λmax) of this compound was 570 nm, and solubility in water was 100 g/l or more.

Example 2-2

By the same method as in Example 2-1 except that 23.6 parts of the compound of Formula (221) instead of 28.4 parts of the compound of Formula (211) was used, 50.2 parts of a compound of Formula (222) as shown below (a compound of No. 3-8 in Table 8) was obtained. The maximum absorption wavelength in water of this compound was 578 nm, and solubility in water was 100 g/l or more.

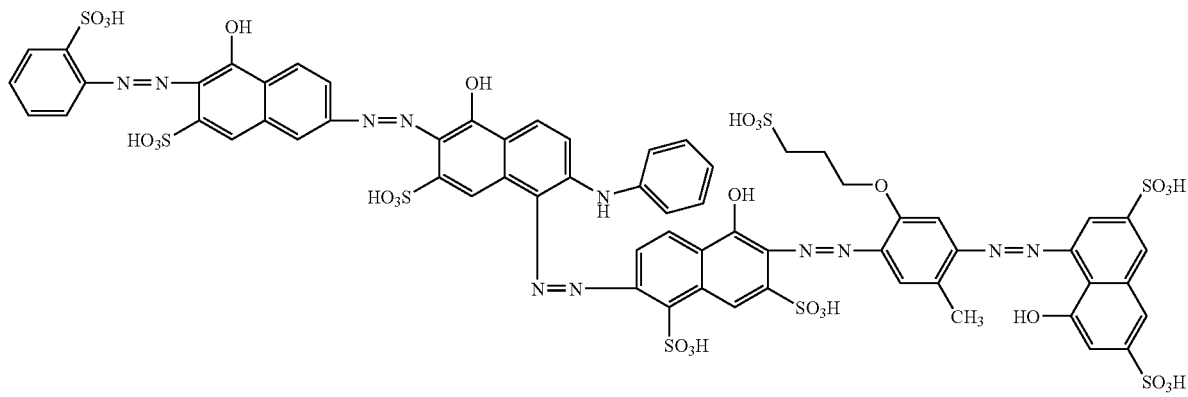

(2111)

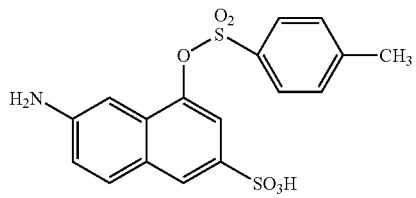

(221)

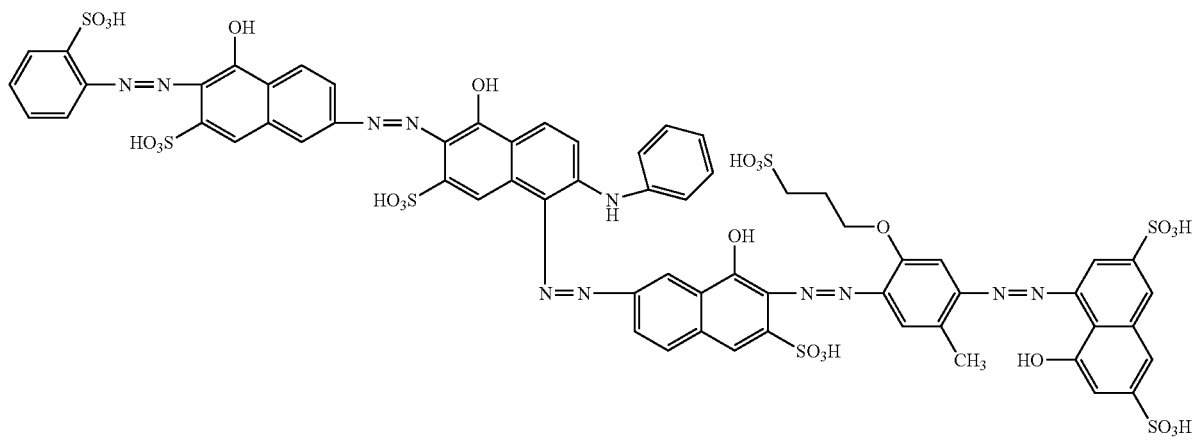

(222)

Examples 2-3 to 2-4

(A) Preparation of an Ink

A composition for an ink was prepared by mixing components as shown below, and by filtration with a 0.45 μm membrane filter, a water-based ink composition for an ink-jet was obtained.

TABLE 11

| | |
|---|---|
| Each compound obtained in Examples described above (after desalting) | 5.0 parts |
| Glycerin | 5.0 parts |
| Urea | 5.0 parts |
| N-methyl-2-pyrrolydone | 4.0 parts |
| Isopropyl alcohol | 3.0 parts |
| Butyl carbitol | 2.0 parts |
| Surfactant (Surfinol 105, manufactured by Nissin Chemical Co., Ltd.) | 0.1 part |
| Water + aqueous solution | 75.9 parts |
| of lithium hydroxide | |
| Total | 100.0 parts |

In Table 11, each of the compounds obtained in Examples described above means a compound of Formula (2111) obtained in Example 2-1 for Example 2-3, and a compound of Formula (222) obtained in Example 2-2 for Example 2-4 respectively. On preparing an ink, pH was adjusted to 8 to 10 with an aqueous ammonium. This water-based ink composition did not appear precipitate during storage, and did not show change in physical property even after storage for a long period of time.

(B) Ink-Jet Printing

Using each ink compositions obtained above, and by an ink-jet printer (Trade name BJ-S630, by Canon Inc.), ink-jet recording was conducted on three types of papers of a Plain Paper (Canon TLB5A4), Professional Glossy Paper A (Professional Photopaper PR-101, by Canon Inc.), and Professional Glossy Paper B (a paper for PM photograph (luster), KA420PSK by Epson Co., Ltd.).

On printing, an image pattern was made so as to obtain gradations of several stages in reflection density, and a black colored print of half tone was obtained. As a gray scale mode is used on printing, at this pale colored part, each recording solution of yellow, cyan, and magenta is not used together other than a black colored recording solution. Among testing methods described below, in evaluation of hue density which is an evaluation item using a calorimeter, on measuring reflection density, D value, of a print, the highest portion of this D value was used. Further, on measuring light fastness and ozone gas fastness which are similarly evaluation items using a calorimeter, measurement was conducted using a portion of gradations wherein reflection density, D value, of a print before the test is closest to 1.0. Evaluations of hue, moisture fastness, and color rendering properties were conducted by visual observation on a print as a whole.

(C) Evaluation of a Recorded Image

Concerning a recorded image according to a water-based ink composition of the present invention, evaluations were conducted on 6 items, that is, hue, hue density, change in hue after light fastness test, change in hue after ozone gas fastness test, bleeding degree due to moisture fastness test, and color rendering properties. In this connection, ozone gas fastness test and moisture fastness test were conducted using only Professional Glossy Papers A and B. The results are shown in Table 12. The testing methods are shown below.

(1) Evaluation of Hue Density

Hue density of a recorded image was measured using Gretag Macbeth SpectroEye (from GRETAG Co., Ltd.), and hue density, D value, was calculated. Standards of the judgment were shown below:

Evaluation of Hue Density:
○: Plain Paper: $1.2 \leq D$, Glossy Paper: $2.2 \leq D$
Δ: Plain Paper: $1.0 \leq D < 1.2$, Glossy Paper: $1.9 \leq D < 2.2$
x: Plain Paper: $D < 1.0$, Glossy Paper: $D < 1.2$ (2) Test of Light Fastness Using a xenon weatherometer (Ci4000, by ATLAS Co., Ltd.), a print sample was irradiated for 50 hours at illuminance of $0.36 \text{ W/m}^2$. After the end of the test, colorimetry was conducted as described above, and a color difference (ΔE) before and after the testing and a residual ratio of hue density were measured. Judgment was conducted by the standards below:

○: ΔE: lower than 10, and a residual ratio is 80% or more;
Δ: either one of ΔE or a residual ratio does not satisfy the condition of ○; and
x: ΔE: not lower than 10, and a residual ratio is lower than 80%.

(3) Test of Ozone Gas Fastness

Using an ozone weatherometer (manufactured by Suga testing machine Co., Ltd.), a print sample was left for one hour at an ozone concentration of 12 ppm, at humidity of 60% RH, and at temperature of 24° C. After the end of the test, colorimetry was conducted as described above, and a color difference (ΔE) before and after the testing and a residual ratio of hue density were measured. Judgment criteria are shown below.

○: ΔE is lower than 15, and residual ratio is 80% or more
Δ: either one of ΔE or residual ratio does not satisfy the above condition for ○
x: ΔE is 15 or more, and residual ratio is lower than 80%

(4) Moisture Fastness Test

A print sample was left for 7 days at temperature of 50° C. and at humidity of 90% RH, using a thermo-hygrostat (from Ouyogiken-Sangyo Co., Ltd.). Bleeding of a dye before and after the test was judged by visual observation:

○: little bleeding of a dye observed
Δ: a little bleeding of a dye observed
x: large bleeding of a dye observed.

(5) Color Rendering Properties Test

Based on hue under a standard light source, color change degree seen under a tungsten light was judged by visual observation:

○: small change in hue
Δ: relatively large change in hue
x: large change in hue

Comparative Example 2-1

Using, for comparison, compounds of Formulae (CP111), (CP121) and (CP131) used in Comparative Examples 1-1 to 1-3, ink compositions having the same ink composition as in Example 2-3 were prepared, and ink-jet printing was conducted. The evaluation results of hue, hue density, light fastness, ozone gas fastness, moisture fastness, and color rendering properties of a recorded image obtained are shown in Table 12. A test conducted using the compound of Formula (CP111) is named as Comparative Example 2-1, a test conducted using the compound of Formula (CP121) is named as Comparative Example 2-2, and a test conducted using the compound of Formula (CP131) is named as Comparative Example 2-3.

TABLE 12

|  | Hue density | Light fastness | Ozone gas fastness | Moisture fastness | color rendering properties |
|---|---|---|---|---|---|
| Example 2-3 (Formula (2111)) | | | | | |
| Plain Paper | ○ | ○ | — | — | ○ |
| Professional Glossy Paper A | ○ | ○ | ○ | ○ | ○ |
| Professional Glossy Paper B | ○ | ○ | ○ | ○ | ○ |
| Example 2-4 (Formula (222)) | | | | | |
| Plain Paper n | ○ | ○ | — | — | ○ |
| Professional Glossy Paper A | ○ | ○ | ○ | ○ | ○ |
| Professional Glossy Paper B | ○ | ○ | ○ | ○ | ○ |
| Comparative Example 1 (Formula (CP111)) | | | | | |
| Plain Paper | ○ | ○ | — | — | x |
| Professional Glossy Paper A | Δ | ○ | x | x | x |
| Professional Glossy Paper B | Δ | ○ | x | x | x |
| Comparative Example 2 (Formula (CP121)) | | | | | |
| Plain Paper | ○ | ○ | — | — | x |
| Professional Glossy Paper A | ○ | Δ | x | Δ | x |
| Professional Glossy Paper B | ○ | ○ | Δ | ○ | x |
| Comparative Example 3 (Formula (CP131)) | | | | | |
| Plain Paper | ○ | ○ | — | — | x |
| Professional Glossy Paper A | ○ | ○ | x | ○ | x |
| Professional Glossy Paper B | ○ | ○ | Δ | ○ | x |

From Table 12, it is understood that an ink composition containing an azo compound according to the present invention has excellent hue, ozone gas fastness, light fastness, moisture fastness, and color rendering properties as compared with a conventional black colored compound (Comparative Examples).

Reference Example

Production of a reduced product (C) of a condensed compound (B) of 4,4'-dinitrostilbene-2,2'-disulfonic acid with aminobenzenes Into 675 parts of water, 115 parts of a compound of Formula (S1) as shown below, 98 parts of a compound of Formula (S2) as shown below, 61 parts of an aqueous solution of 48% sodium hydroxide, and 11 parts of ethylene glycol were added, and they were stirred at 98° C. for 10 hours, to complete a condensation reaction.

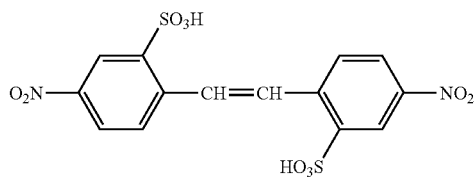

(S1)

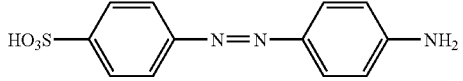

(S2)

To the reaction solution obtained, 280 parts of water was added, and temperature of the solution was adjusted at 85 to 88° C., and it was stirred for 2 hours after being added with 12 parts of glucose, to complete a reduction reaction. Then, pH was adjusted to 9.0 to 9.5 with a 35% hydrochloric acid solution, and the reaction product was salted out by the addition of sodium chloride, and filtrated. The total amount of a cake obtained was dissolved in 2000 parts of water, and added 2000 parts of methanol thereto to precipitate crystals and filtrated to separate the crystals, and thereby desalted. Then the crystal obtained was dried to obtain 192 parts of an orange-colored dye compound. The maximum absorption wavelength in water ($\lambda$max) of this compound was 413 nm, and solubility in water was 100 g/l or more.

(A) Preparation of an Ink

Hereinafter, all colorants compounds were used after desalting.

Example 3-1

A composition for an ink was prepared by mixing components in Table 18 as shown below, and by filtration with a 0.45 μm membrane filter, a water-based ink composition for an ink-jet was obtained.

TABLE 18

| Compound obtained in Reference Example | 1.4 parts |
|---|---|
| Compound obtained in Example 1-3 | 1.8 parts |
| Compound obtained in Example 2-2 | 1.8 parts |
| Glycerin | 5.0 parts |
| Urea | 5.0 parts |
| N-methyl-2-pyrrolydone | 4.0 parts |
| Isopropyl alcohol | 3.0 parts |
| Butyl carbitol | 2.0 parts |
| Surfactant (Surfinol 105 from Nissin Chemical Co., Ltd.) | 0.1 part |
| Water + aqueous solution of lithium hydroxide | 75.9 parts |
| Total | 100.0 parts |

Example 3-2

A composition for an ink was prepared by mixing components in Table 14 as shown below, and by filtration with a 0.45 μm membrane filter, a water-based ink composition for an ink-jet was obtained.

TABLE 14

| Compound obtained in Reference Example | 1.4 parts |
|---|---|
| Compound obtained in Example 1-15 | 1.2 parts |
| Compound obtained in Example 2-1 | 2.4 parts |
| Glycerin | 5.0 parts |
| Urea | 5.0 parts |
| N-methyl-2-pyrrolydone | 4.0 parts |
| Isopropyl alcohol | 3.0 parts |
| Butyl carbitol | 2.0 parts |
| Surfactant (Surfinol 105, by Nissin Chemical Co., Ltd.) | 0.1 part |
| Water + aqueous solution of lithium hydroxide | 75.9 parts |
| Total | 100.0 parts |

Example 3-3

A composition for an ink was prepared by mixing components in Table 15 as shown below, and by filtration with a 0.45 μm membrane filter, a water-based ink composition for an ink-jet was obtained.

TABLE 15

| | |
|---|---|
| Compound obtained in Reference Example | 1.4 parts |
| Compound obtained in Example 1-3 | 1.8 parts |
| Compound obtained in Example 2-1 | 1.8 parts |
| Glycerin | 5.0 parts |
| Urea | 5.0 parts |
| N-methyl-2-pyrrolydone | 4.0 parts |
| Isopropyl alcohol | 3.0 parts |
| Butyl carbitol | 2.0 parts |
| Surfactant | 0.1 part |
| (Surfinol 105, by Nissin Chemical Co., Ltd.) | |
| Water + aqueous solution | 75.9 parts |
| of lithium hydroxide | |
| Total | 100.0 parts |

Example 3-4

A composition for an ink was prepared by mixing components in Table 16 as shown below, and by filtration with a 0.45 μm membrane filter, a water-based ink composition for an ink-jet was obtained.

TABLE 16

| | |
|---|---|
| Compound obtained in Reference Example | 1.5 parts |
| Compound obtained in Example 2-1 | 3.5 parts |
| Glycerin | 5.0 parts |
| Urea | 5.0 parts |
| N-methyl-2-pyrrolydone | 4.0 parts |
| Isopropyl alcohol | 3.0 parts |
| Butyl carbitol | 2.0 parts |
| Surfactant | 0.1 part |
| (Surfinol 105, by Nissin Chemical Co., Ltd.) | |
| Water + aqueous solution | 75.9 parts |
| of lithium hydroxide | |
| Total | 100.0 parts |

(B) Ink-Jet Printing

Using each of ink compositions obtained above, and by an ink-jet printer (Trade name BJ-S630 by Canon Inc.), ink-jet recording was conducted on three types of papers of a Plain Paper (Canon TLB5A4), Professional Glossy Paper A (Professional Photopaper PR-101 by Canon Inc.), and Professional Glossy Paper B (Super Photopaper for SP-101 from Canon Inc.).

On printing, an image pattern was made so as to obtain gradations of several stages in reflection density, and a black colored print of half tone was obtained. As a gray scale mode is used on printing, at this pale colored part, each recording solution of yellow, cyan, and magenta other than a black colored recording solution was not used. Among testing methods described below, in evaluation of hue which is an evaluation item using a calorimeter, on measuring a* value and a b* value of a print, the highest portion of this D value was used. On measuring light fastness and ozone gas fastness wherein a colorimeter is used similarly, measurement was conducted using a portion of gradations wherein reflection density, D value, of a print before the test is closest to 1.0. Evaluations of hue, moisture fastness, and color rendering properties were conducted by visual observation on a print as a whole.

(C) Evaluation of a Recorded Image

Concerning a recorded image according to a water-based ink composition of the present invention, evaluation was conducted on 5 items, that is, hue, change in hue after light fastness test, change in hue after ozone gas fastness test, bleeding degree due to moisture fastness test, and color rendering properties. In this connection, tests of ozone gas fastness and moisture fastness were conducted using only Professional Glossy Papers A and B. The results are shown in Table 22. The test methods are shown below.

(1) Evaluation of Hue

As for evaluation of hue of a recorded image (numerical data), evaluations by visual observation and a calorimeter were used together. In evaluation by a colorimeter, a* value and b* value were measured using Gretag Macbeth Spectro-Eye (from GRETAG Co., Ltd.), and C* value was calculated. A calculation formula of C* value is: $C^*=\{(a^*)^2+(b^*)^2\}^{1/2}$. Judgment criteria are shown below:
○: a favorable black color with no toning by visual observation, and $C^*<5.0$ in colorimetry
Δ: a favorable black color with no toning by visual observation, but $5.0 \leq C^* \leq 10$ in colorimetry
x: with toning, or a black color without toning by visual observation but $10<C^*$ in colorimetry (2) Evaluation of Hue Density:

Hue density, D value, was calculated using Gretag Macbeth SpectroEye (from GRETAG Co., Ltd.). Judgment criteria are shown below:
○: a Plain Paper: $1.2 \leq D$, a Luster Paper: $2.0 \leq D$
Δ: a Plain Paper: $1.0 \leq D<1.2$, a Luster Paper: $1.9 \leq D<2.0$
x: a Plain Paper: $D<1.0$, a Luster Paper: $D<1.9$ (3) Light Fastness Test Using a xenon weatherometer (Ci4000 from ATLAS Co., Ltd.), a print sample was irradiated for 50 hours at illuminance of 0.36 W/m². After the end of the test, colorimetry was conducted as described above, and color difference (ΔE) before and after the test and residual ratio of hue density were measured. Judgment criteria are shown below:
○: ΔE is lower than 10, and residual ratio is 80% or more
Δ: either one of ΔE or residual ratio does not satisfy the above condition for ○
x: ΔE is 10 or more, and residual ratio is lower than 80%.

(4) Ozone Fastness Test

Using an ozone weatherometer (from Suga Testing Machine Co., Ltd.), a print sample was left for one hour under conditions of ozone gas concentration of 12 ppm, humidity of 60% RH, and temperature of 24° C. After the end of the test, using the above-described calorimetric system, color difference (ΔE) before and after the test and reduction ratio of hue density were measured. Judgment criteria are shown below:
○: ΔE is lower than 15, and residual ratio is 80% or more
Δ: either one of ΔE or residual ratio does not satisfy the above conditions for ○
x: ΔE is 15 or more, and residual ratio is lower than 80%

(5) Moisture Fastness Test

A print sample was left for 3 days at temperature of 50° C. and at humidity of 90% RH, using a thermo-hygrostat (from Ouyogiken-Sangyo Co., Ltd.). Bleeding of a dye before and after the test was judged by visual observation:
○: little bleeding of a dye observed
Δ: slight bleeding of a dye observed
x: large bleeding of a dye observed.

(6) Test of Color Rendering Properties

Based on hue under a standard light source, color change degree seen under a tungsten light was judged by visual observation:

○: small change in hue
Δ: relatively large change in hue
x: large change in hue

Example 3-5

By using only the compound obtained in Example 1-15, as a colorant, an ink composition having an ink composition in Table 19 below, was prepared. The evaluation results of hue, hue density, light fastness, ozone gas fastness, moisture fastness, and color rendering properties of a recorded image obtained are shown in Table 22.

TABLE 19

| | |
|---|---|
| Compound obtained in Example 1-15 | 5.0 parts |
| Glycerin | 5.0 parts |
| Urea | 5.0 parts |
| N-methyl-2-pyrrolydone | 4.0 parts |
| Isopropyl alcohol | 3.0 parts |
| Butyl carbitol | 2.0 parts |
| Surfactant (Surfinol 105, by Nissin Chemical Co., Ltd.) | 0.1 part |
| Water + aqueous solution of lithium hydroxide | 75.9 parts |
| Total | 100.0 parts |

Example 3-6

By using only the compound as obtained in Example 2-1, as a colorant, an ink composition having an ink composition in Table 20 below, was prepared. The evaluation results of hue, hue density, light fastness, ozone gas fastness, moisture fastness, and color rendering properties of a recorded image obtained are shown in Table 22.

TABLE 20

| | |
|---|---|
| Compound obtained in Example 2-1 | 5.0 parts |
| Glycerin | 5.0 parts |
| Urea | 5.0 parts |
| N-methyl-2-pyrrolydone | 4.0 parts |
| Isopropyl alcohol | 3.0 parts |
| Butyl carbitol | 2.0 parts |
| Surfactant (Surfinol 105 from Nissin Chemical Co., Ltd.) | 0.1 part |
| Water + aqueous solution of lithium hydroxide | 75.9 parts |
| Total | 100.0 parts |

Comparative Example 3

For comparison, by using only a compound as obtained in Reference Example, as a colorant, an ink composition having an ink composition in Table 21 below, was prepared. Since hue is not a black color, as evaluation of a recorded image obtained, only evaluations of light fastness, ozone gas fastness, and moisture fastness are shown in Table 22.

TABLE 21

| | |
|---|---|
| Compound obtained in Reference Example | 5.0 parts |
| Glycerin | 5.0 parts |
| Urea | 5.0 parts |
| N-methyl-2-pyrrolydone | 4.0 parts |
| Isopropyl alcohol | 3.0 parts |
| Butyl carbitol | 2.0 parts |
| Surfactant (Surfinol 105 from Nissin Chemical Co., Ltd.) | 0.1 part |
| Water + aqueous solution of lithium hydroxide | 75.9 parts |
| Total | 100.0 parts |

TABLE 22

| | Hue | Hue Density | Light fastness | Ozone fastness | Moisture fastness | color rendering Properties |
|---|---|---|---|---|---|---|
| Example 3-1 | | | | | | |
| Plain Paper | ○ | ○ | ○ | — | — | ○ |
| Professional Glossy Paper A | ○ | ○ | ○ | ○ | ○ | ○ |
| Professional Glossy Paper B | ○ | ○ | ○ | ○ | ○ | ○ |
| Example 3-2 | | | | | | |
| Plain Paper | ○ | ○ | ○ | — | — | ○ |
| Professional Glossy Paper A | ○ | ○ | ○ | ○ | ○ | ○ |
| Professional Glossy Paper B | ○ | ○ | ○ | ○ | ○ | ○ |
| Example 3-3 | | | | | | |
| Plain Paper | ○ | ○ | ○ | — | — | ○ |
| Professional Glossy paper A | ○ | ○ | ○ | ○ | ○ | ○ |
| Professional Glossy Paper B | ○ | ○ | ○ | ○ | ○ | ○ |
| Example 3-4 | | | | | | |
| Plain Paper | ○ | ○ | ○ | — | — | ○ |
| Professional Glossy Paper A | Δ | ○ | ○ | ○ | ○ | ○ |
| Professional Glossy Paper B | ○ | ○ | ○ | ○ | ○ | Δ |
| Example 3-5 | | | | | | |
| Plain Paper | ○ | ○ | ○ | — | — | ○ |
| Professional Glossy Paper A | Δ | ○ | ○ | ○ | ○ | ○ |
| Professional Glossy Paper B | Δ | ○ | ○ | ○ | ○ | ○ |
| Example 3-6 | | | | | | |
| Plain Paper | ○ | ○ | ○ | — | — | ○ |
| Professional Glossy Paper A | Δ | ○ | ○ | ○ | ○ | ○ |
| Professional Glossy Paper B | Δ | ○ | ○ | ○ | ○ | ○ |
| Comp. Ex. 3 | | | | | | |
| Plain Paper | — | — | Δ | — | — | — |
| Professional Glossy Paper A | — | — | Δ | x | ○ | — |
| Professional Glossy Paper B | — | — | Δ | x | ○ | — |

From Table 22, an ink composition according to the present invention provides neutral black colored prints wherein C* value is close to 0, and color density of the prints is very high. Moreover, the prints have excellent durability such as light fastness, ozone fastness and moisture fastness.

Further, an ink composition (Comparative Example 3) using only a compound of Reference Example exhibits low performance such as light fastness and ozone gas fastness, but when the compound is formulated in a black colored ink composition, performance such as light fastness and ozone gas fastness of the black colored ink composition is not impaired.

INDUSTRIAL APPLICABILITY

An ink composition according to the present invention does not exhibit crystal deposition, change in physical property, nor color change after storage for a long period of time, and exhibits favorable storage stability. And an ink composition according to the present invention is used for ink-jet recording, and for writing tools, and when a recording image is made on a Plain Paper and a paper Exclusive use to ink-jet, hue thereof is neutral, and printing density is high, and further it has excellent light fastness, ozone fastness, moisture fastness, and color rendering properties. By using it together with a magenta, cyan, and yellow dye, full-colored ink-jet recording exhibiting excellent light fastness and water fastness is possible. Therefore, an ink composition according to the present invention is extremely useful as a black ink for inkjet recording. Moreover, a new azo compound used according to the present invention has excellent water-solubility, and therefore a filtration property with a membrane filter during production steps of an ink composition is favorable, and it exhibits excellent stability on storage of a recording solution and jetting stability. Consequently, it is suitable for a black coloring dye for a black ink for ink-jet recording.

The invention claimed is:

1. A water-based black ink composition comprising a water-soluble dye for black color (A) with ozone fastness and a condensed compound (B) of 4,4'-dinitrostilbene-2,2'-disulfonic acid or a salt thereof with aminobenzenes, or a reduced product (C) thereof, wherein the water-soluble dye for black color (A) is a dye for black color comprising at least one selected from the group consisting of an azo compound represented by the general Formula (3) as shown below:

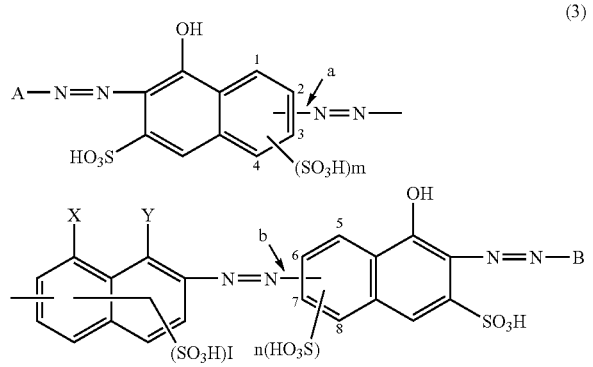

(3)

wherein, each of A and B independently represents a phenyl group or a naphthyl group which may be substituted, and each component of A and B contains at least one sulfo group; each of "a" and "b" represents a single bond, and a bonded position of the "a" bond is at the 2-position or 3-position, and a bonded position of the "b" bond is at the 6-position or 7-position; one of X and Y represents a hydroxyl group and the other an amino group; and "l" represents 1 or 2; each of m and n independently represents 0 or 1; and a counter ion of a sulfo group or a carboxyl group contained in a molecule is a hydrogen ion, an alkaline metal ion, a cation of an organic amine, or an ammonium ion, and an azo compound represented by the general Formula (4) as shown below:

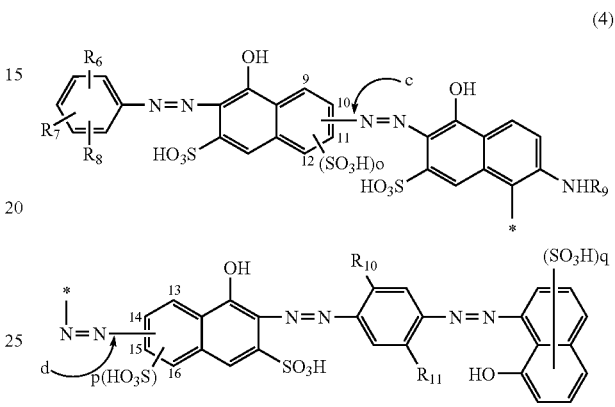

(4)

wherein, $R_6$ to $R_{11}$ represent substituents, and each of "c" and "d" represents a single bond, and a bonded position of the "c" bond is at the 10-position or 11-position, and a bonded position of the "d" bond is at the 14-position or 15-position; and "o" and "p" are 0 or 1; "q" is 1 or 2; and a counter ion of a sulfo group or a carboxyl group contained in a molecule is a hydrogen ion, an alkaline metal ion, a cation of an organic amine, or an ammonium ion.

2. The water-based black ink composition according to claim 1, wherein composition ratio of a water-soluble dye for black color (A) and a condensed compound (B) of 4,4'-dinitrostilbene-2,2'-disulfonic acid or a salt thereof with aminobenzenes, or a reduced product (C) thereof, is 50 to 99.9% by weight of a water-soluble black colorant (A) and 0.1 to 50% by weight of the above-described condensed compound (B) or a reduced product (C) thereof, based on the total amount of both.

3. The water-based black ink composition according to claim 1 or 2, wherein the water-soluble dye for black color (A) has a maximum absorption wavelength in the range of from 550 nm to 700 nm in water.

4. The water-based black ink composition according to any one of claims 1 or 2, wherein the water-soluble dye for black color (A) is a dye for black color comprising at least one kind of a water-soluble azo compound having 5 or more sulfo groups and 4 or more azo groups in one molecule thereof.

5. The water-based black ink composition according to claim 1, wherein in the general Formula (3), each of substituents in A and B is a halogen atom; a hydroxyl group; an amino group; a carboxyl group; a sulfo group; a nitro group; a (C1 to C4) alkyl group; a (C1 to C4) alkoxyl group; an acyl group; a phenyl group; a ureide group; a (C1 to C4) alkyl group substituted with a hydroxyl group, a (C1 to C4) alkoxyl group, a sulfo group or a carboxyl group; a (C1 to C4) alkoxyl group substituted with a hydroxyl group, a (C1 to C4) alkoxyl group, a sulfo group or a carboxyl group; an amino group substituted with a phenyl group which may further be substituted with a carboxyl group or a sulfo group, a (C1 to C4)

alkyl group or an acyl group, and in the general formula (4), $R_6$ to $R_8$ are a hydrogen atom; a halogen atom; a cyano group; a hydroxyl group; an amino group; a carboxyl group; a sulfo group; a sulfamoyl group which may be substituted with a (C1 to C4) alkyl group or a phenyl group; a phospho group; a nitro group; an acyl group; a phenyl group; a ureide group; a (C1 to C4) alkyl group which may be substituted with a hydroxyl group or a (C1 to C4) alkoxyl group; a (C1 to C4) alkoxyl group which may be substituted with a hydroxyl group, a (C1 to C4) alkoxyl group, a sulfo group or a carboxyl group; an amino group substituted with a phenyl group (the phenyl group may further be substituted with a carboxyl group or a sulfo group); and an amino group which is substituted with an alkyl group or an acyl group; $R_9$ is a hydrogen atom; a (C1 to C4) alkyl group which may be substituted with a hydroxyl group, a (C1 to C4) alkoxyl group, a sulfo group or a carboxyl group; and a phenyl group which may be substituted with an amino group, an alkyl group, an alkoxyl group, a carboxyl group, or a sulfo group; and $R_{10}$ and $R_{11}$ are a hydrogen atom; a sulfo group; an acetyl amino group; a (C1 to C4) alkyl group which may be substituted with a hydroxyl group or a (C1 to C4) alkoxyl group; and a (C1 to C4) alkoxyl group which may be substituted with a hydroxyl group, a (C1 to C4) alkoxyl group, a sulfo group or a carboxyl group.

6. The water-based black ink composition according to claim 1, comprising an azo compound represented by Formula (3) and an azo compound represented by Formula (4), as the water-soluble compound for black color (A).

7. The water-based black ink composition according to claim 6, wherein the ratio of an azo compound represented by Formula (3) and an azo compound represented by Formula (4) is 10 to 80% by weight of an azo compound represented by Formula (3) and 20 to 90% by weight of an azo compound represented by Formula (4), based on the total amount of both.

8. The water-based black ink composition according to any one of claims 1, 2, 5 and 6, wherein aminobenzenes in a condensed compound of 4,4'-dinitrostilbene-2,2'-disulfonic acid or a salt thereof with aminobenzenes, is an azo compound represented by Formula (2) as shown below:

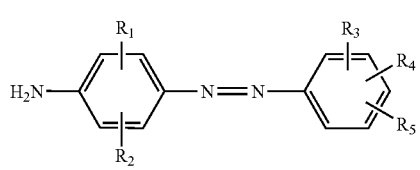

(2)

wherein, each of $R_1$ to $R_5$ independently represents a hydrogen atom, a halogen atom; a hydroxyl group; a sulfo group; a carboxyl group; a (C1 to C4) alkyl group; and a (C1 to C4) alkoxyl group.

9. An azo compound represented by Formula (3) as shown below or a salt thereof:

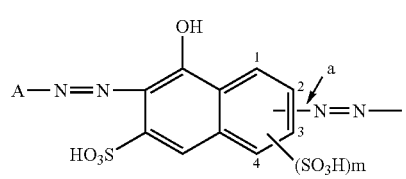

(3)

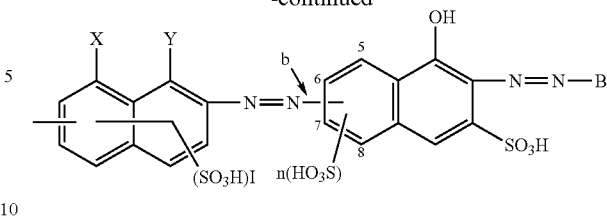

wherein, each of A and B independently represents a phenyl group or a naphthyl group which may be substituted, and each component of A or B comprises at least one sulfo group; each of "a" and "b" represents a single bond, and a bonded position of the "a" bond is at the 2-position or 3-position, and a bonded position of the "b" bond is at the 6-position or 7-position; one of X and Y represents a hydroxyl group and the other an amino group; and "1" represents 1 or 2; and each of m and n independently represents 0 or 1.

10. The azo compound or the salt thereof according to claim 9, wherein in the general Formula (3), each of substituents in A and B is a halogen atom; a hydroxyl group; an amino group; a carboxyl group; a sulfo group; a nitro group; a (C1 to C4) alkyl group; a (C1 to C4) alkoxyl group; an acyl group; a phenyl group; a ureide group; a (C1 to C4) alkyl group substituted with a hydroxyl group, a (C1 to C4) alkoxyl group, a sulfo group or a carboxyl group; a (C1 to C4) alkoxyl group substituted with a hydroxyl group, a (C1 to C4) alkoxyl group, a sulfo group or a carboxyl group; or an amino group substituted with a phenyl group which may be substituted with a carboxyl group or a sulfo group, a (C1 to C4) alkyl group or an acyl group.

11. The azo compound or the salt thereof according to claim 9 or 10, wherein in the general Formula (3), a bonded position of the "a" bond is at the 3-position and "m" is 0; a bonded position of the "b" bond is at the 7-position and "n" is 1; or a bonded position of the "a" bond is at the 2-position and n is 0.

12. An azo compound represented by Formula (4) as shown below or a salt thereof:

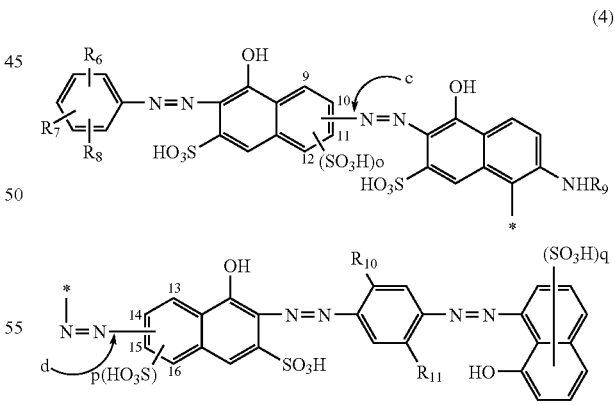

(4)

wherein, $R_6$ to $R_8$ are a hydrogen atom; a halogen atom; a cyano group; a hydroxyl group; an amino group; a carboxyl group; a sulfo group; a sulfamoyl group which may be substituted with a (C1 to C4) alkyl group or a phenyl group; a phospho group; a nitro group; an acyl group; a phenyl group; a ureide group; a (C1 to C4) alkyl group which may be substituted with a hydroxyl group, or a (C1 to C4) alkoxyl group; a (C1 to C4) alkoxyl group which may be substituted with a hydroxyl group, a (C1 to C4) alkoxyl group, a sulfo group or a carboxyl group; an amino group substituted with a phenyl group (the phenyl group may be further substituted with a carboxyl group or a sulfo group); an amino group substituted with an alkyl group or an acyl group; $R_9$ is a hydrogen atom; a (C1 to C4) alkyl group which may be substituted with a hydroxyl group, a (C1 to C4) alkoxyl group, a sulfo group or a carboxyl group; and a phenyl group which may be substituted with an amino group, an alkyl group, an alkoxyl group, a carboxyl group, or a sulfo group; $R_{10}$ and $R_{11}$ are a hydrogen atom; a sulfo group; an acetyl amino group; a (C1 to C4) alkyl group which may be substituted with a hydroxyl group or a (C1 to C4) alkoxyl group; a (C1 to C4) alkoxyl group which may be substituted with a hydroxyl group, a (C1 to C4) alkoxyl group, a sulfo group or a carboxyl group; each of "c" and "d" represents a single bond, and a bonded position of the "c" bond is at the 10-position or 11-position, and a bonded position of the "d" bond is at the 14-position or 15-position; "o" and "p" are 0 or 1; and "q" is 1 or 2; a substituted position of $(SO_3H)_o$ is at the 11- or 12-position; and a substituted position of $(SO_3H)_p$ is at the 15-position or 16-position.

13. An ink-jet printer loaded with the water-based black ink composition according to claim 1.

14. A colored product colored by an ink-jet printer according to claim 13.

15. A water-based black ink composition, which comprises at least one kind of a water-soluble compound for black color (A) having a maximum absorption wavelength in the range of from 550 nm to 700 nm in water and at least one kind of a condensed compound (B) of 4,4'-dinitrostilbene-2,2'-disulfonic acid or an alkali metal salt thereof with the azo compound represented by Formula (2) as shown below:

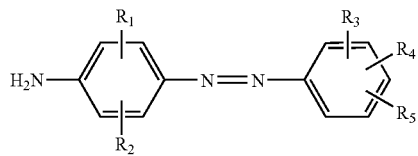
(2)

wherein, each of $R_1$ to $R_5$ independently represents a hydrogen atom; a halogen atom; a hydroxyl group; a sulfo group; a carboxyl group; a (C1 to C4) alkyl group; and a (C1 to C4) alkoxyl group, or a reduced product (C) thereof, wherein a counter ion of the compound after the condensation or the reduction is a hydrogen ion, an alkaline metal ion, a cation of an organic amine, or an ammonium ion, wherein the water-soluble dye for black color (A) is a dye for black color comprising at least one selected from the group consisting of an azo compound represented by the general Formula (3) as shown below:

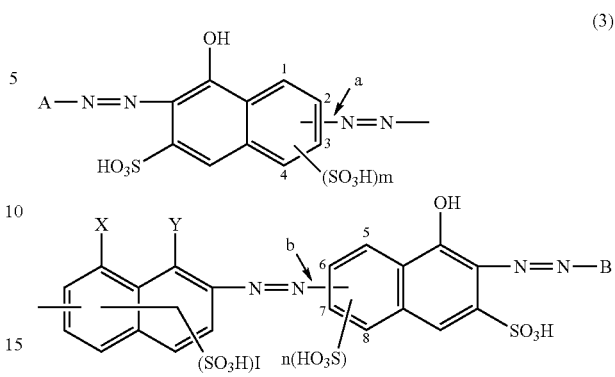
(3)

wherein, each of A and B independently represents a phenyl group or a naphthyl group which may be substituted, and each component of A and B contains at least one sulfo group; each of "a" and "b" represents a single bond, and a bonded position of the "a" bond is at the 2-position or 3-position, and a bonded position of the "b" bond is at the 6-position or 7-position; one of X and Y represents a hydroxyl group and the other an amino group; and "l" represents 1 or 2; each of m and n independently represents 0 or 1; and a counter ion of a sulfo group or a carboxyl group contained in a molecule is a hydrogen ion, an alkaline metal ion, a cation of an organic amine, or an ammonium ion, and an azo compound represented by the general Formula (4) as shown below:

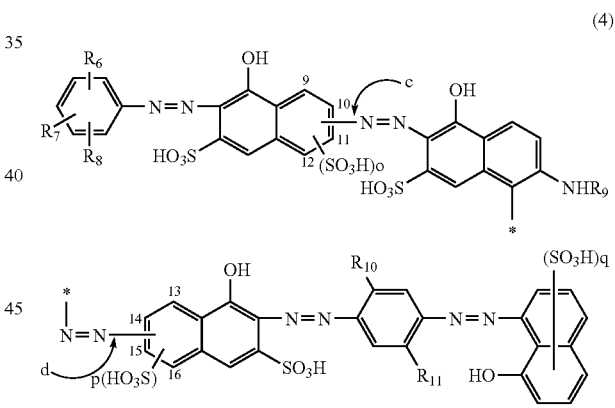
(4)

wherein, $R_6$ to $R_{11}$ represent substituents, and each of "c" and "d" represents a single bond, and a bonded position of the "c" bond is at the 10-position or 11-position, and a bonded position of the "d" bond is at the 14-position or 15-position; and "o" and "p" are 0 or 1; "q" is 1 or 2; and a counter ion of a sulfo group or a carboxyl group contained in a molecule is a hydrogen ion, an alkaline metal ion, a cation of an organic amine, or an ammonium ion.

* * * * *